US012645481B2

(12) United States Patent
Babarjung et al.

(10) Patent No.: US 12,645,481 B2
(45) Date of Patent: Jun. 2, 2026

(54) SYSTEMS, METHODS, AND APPARATUS FOR STATE CONVERGENCE ASSOCIATED WITH HIGH AVAILABILITY APPLICATION MIGRATION IN A VIRTUALIZED ENVIRONMENT

(71) Applicant: VMware LLC, Palo Alto, CA (US)

(72) Inventors: Deepak Babarjung, San Ramon, CA (US); Brian Masao Oki, San Jose, CA (US); Maarten Wiggers, San Francisco, CA (US); Ivaylo Radoslavov Radev, Sofia (BG); Sandeep Sinha, Bangalore (IN)

(73) Assignee: VMware LLC, Palo Alto, CA (US)

( * ) Notice: Subject to any disclaimer, the term of this patent is extended or adjusted under 35 U.S.C. 154(b) by 867 days.

(21) Appl. No.: 17/989,853

(22) Filed: Nov. 18, 2022

(65) Prior Publication Data

US 2024/0004687 A1     Jan. 4, 2024

(30) Foreign Application Priority Data

Jun. 29, 2022     (IN) .............................. 202241037300

(51) Int. Cl.
*G06F 11/20*          (2006.01)
*G06F 9/455*          (2018.01)

(52) U.S. Cl.
CPC ...... *G06F 9/45558* (2013.01); *G06F 11/2023* (2013.01); *G06F 2009/4557* (2013.01); *G06F 2009/45595* (2013.01)

(58) Field of Classification Search
CPC ......... G06F 11/2023; G06F 2009/4557; G06F 2009/45595; G06F 9/45558
See application file for complete search history.

(56) References Cited

U.S. PATENT DOCUMENTS

| | | | | | |
|---|---|---|---|---|---|
| 8,874,954 | B1 * | 10/2014 | Gupte | ................. | G06F 11/2033 |
| | | | | | 714/4.11 |
| 9,218,140 | B2 * | 12/2015 | Antony | ............... | G06F 9/45545 |
| 9,223,606 | B1 * | 12/2015 | Vaidya | ................ | G06F 9/45558 |
| 9,513,946 | B2 * | 12/2016 | Sevigny | .............. | G06F 9/45558 |

(Continued)

FOREIGN PATENT DOCUMENTS

| | | | | | | |
|---|---|---|---|---|---|---|
| CN | | 104081348 | A | * | 10/2014 | ......... G06F 9/45558 |
| CN | | 104253865 | A | * | 12/2014 | |

*Primary Examiner* — Joseph O Schell
(74) *Attorney, Agent, or Firm* — Quarles & Brady LLP

(57) ABSTRACT

Methods, apparatus, systems, and articles of manufacture are disclosed for state convergence associated with high availability application migration in a virtualized environment. An example apparatus includes at least one memory, machine readable instructions, and processor circuitry to at least one of execute or instantiate the machine readable instructions to identify a high availability slot in a virtual server rack including a first virtual machine (VM) associated with first configuration data that identifies the first VM as a protected VM, transmit second configuration data to a second VM that identifies the first VM as a nonprotected VM and the second VM as the protected VM, after a determination that a network partition is identified based on a failure of a request to retrieve the second configuration data from the second VM, and transfer data from the first VM to the second VM after causing the removal of the network partition.

21 Claims, 23 Drawing Sheets

(56) References Cited

U.S. PATENT DOCUMENTS

| | | | |
|---|---|---|---|
| 11,385,972 B2* | 7/2022 | K ........................ | G06F 11/3433 |
| 2015/0263983 A1* | 9/2015 | Brennan ................ | H04L 47/70 |
| | | | 709/226 |
| 2017/0060608 A1* | 3/2017 | Raghunathan .......... | G06F 11/30 |
| 2017/0060671 A1* | 3/2017 | Chai ................... | G06F 11/0793 |
| 2021/0326165 A1* | 10/2021 | Shibayama .......... | G06F 3/0644 |

* cited by examiner

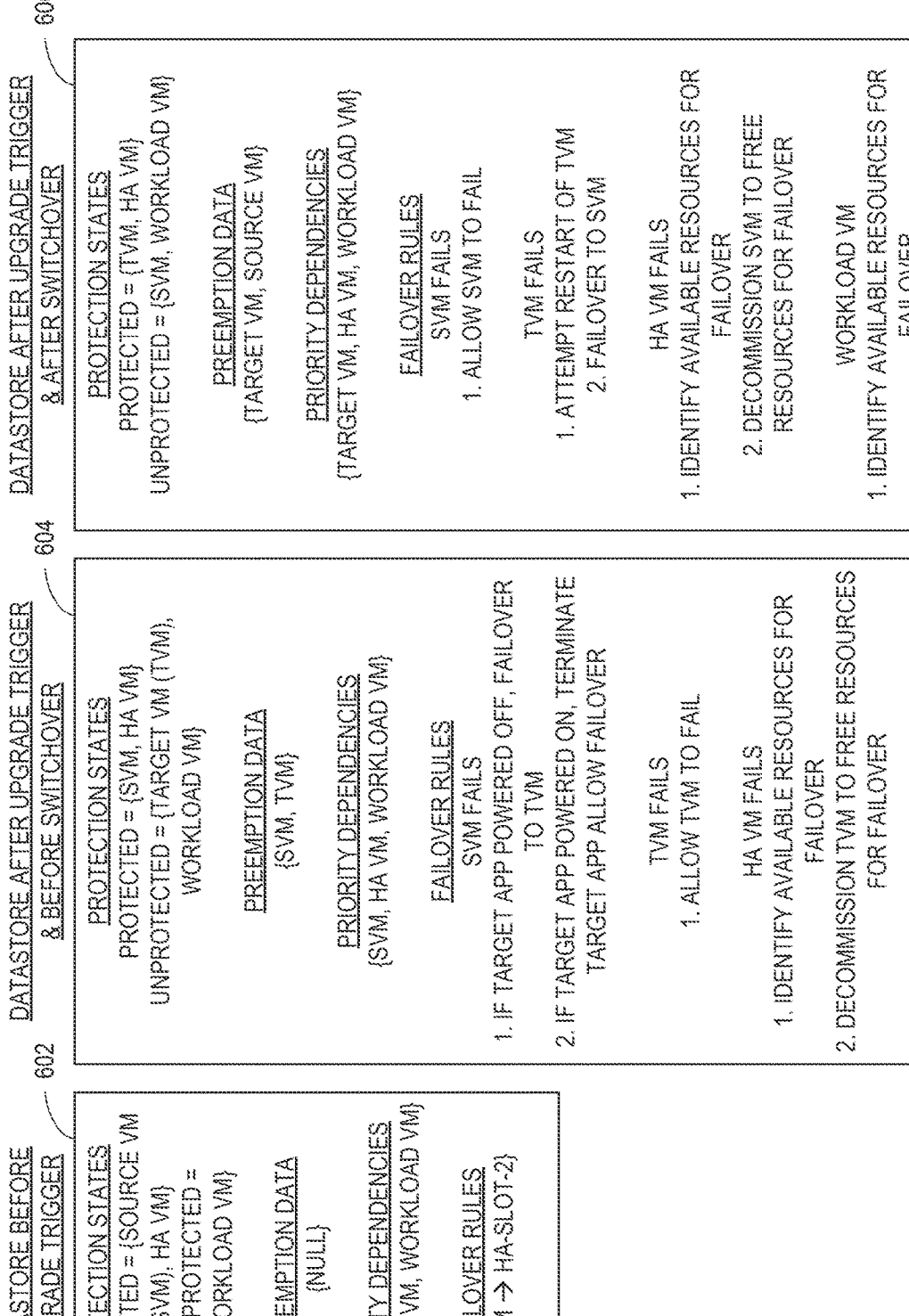

DATASTORE BEFORE UPGRADE TRIGGER — 602

PROTECTION STATES
PROTECTED = {SOURCE VM (SVM), HA VM}
UNPROTECTED = {WORKLOAD VM}

PREEMPTION DATA
{NULL}

PRIORITY DEPENDENCIES
{SVM, HA VM, WORKLOAD VM}

FAILOVER RULES
{SVM → HA-SLOT-2}

DATASTORE AFTER UPGRADE TRIGGER & BEFORE SWITCHOVER — 604

PROTECTION STATES
PROTECTED = {SVM, HA VM}
UNPROTECTED = {TARGET VM (TVM), WORKLOAD VM}

PREEMPTION DATA
{SVM, TVM}

PRIORITY DEPENDENCIES
{SVM, HA VM, WORKLOAD VM}

FAILOVER RULES
SVM FAILS
1. IF TARGET APP POWERED OFF, FAILOVER TO TVM
2. IF TARGET APP POWERED ON, TERMINATE TARGET APP ALLOW FAILOVER

TVM FAILS
1. ALLOW TVM TO FAIL

HA VM FAILS
1. IDENTIFY AVAILABLE RESOURCES FOR FAILOVER
2. DECOMMISSION TVM TO FREE RESOURCES FOR FAILOVER

WORKLOAD VM
1. IDENTIFY AVAILABLE RESOURCES FOR FAILOVER
2. IF NOT, ADD RESOURCES

DATASTORE AFTER UPGRADE TRIGGER & AFTER SWITCHOVER — 606

PROTECTION STATES
PROTECTED = {TVM, HA VM}
UNPROTECTED = {SVM, WORKLOAD VM}

PREEMPTION DATA
{TARGET VM, SOURCE VM}

PRIORITY DEPENDENCIES
{TARGET VM, HA VM, WORKLOAD VM}

FAILOVER RULES
SVM FAILS
1. ALLOW SVM TO FAIL

TVM FAILS
1. ATTEMPT RESTART OF TVM
2. FAILOVER TO SVM

HA VM FAILS
1. IDENTIFY AVAILABLE RESOURCES FOR FAILOVER
2. DECOMMISSION SVM TO FREE RESOURCES FOR FAILOVER

WORKLOAD VM
1. IDENTIFY AVAILABLE RESOURCES FOR FAILOVER
2. IF NOT, ADD RESOURCES

FIG. 6

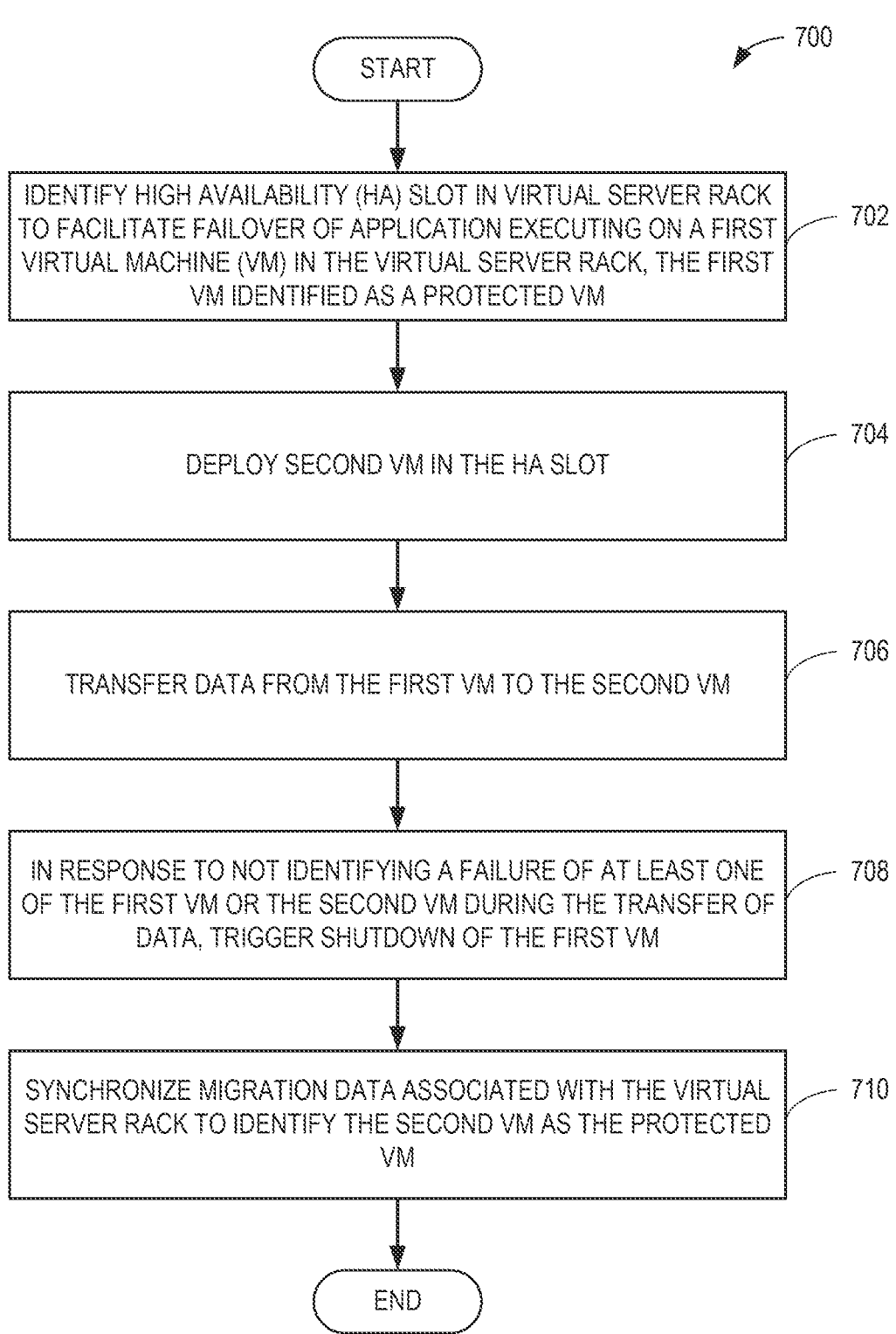

700

START

IDENTIFY HIGH AVAILABILITY (HA) SLOT IN VIRTUAL SERVER RACK TO FACILITATE FAILOVER OF APPLICATION EXECUTING ON A FIRST VIRTUAL MACHINE (VM) IN THE VIRTUAL SERVER RACK, THE FIRST VM IDENTIFIED AS A PROTECTED VM — 702

DEPLOY SECOND VM IN THE HA SLOT — 704

TRANSFER DATA FROM THE FIRST VM TO THE SECOND VM — 706

IN RESPONSE TO NOT IDENTIFYING A FAILURE OF AT LEAST ONE OF THE FIRST VM OR THE SECOND VM DURING THE TRANSFER OF DATA, TRIGGER SHUTDOWN OF THE FIRST VM — 708

SYNCHRONIZE MIGRATION DATA ASSOCIATED WITH THE VIRTUAL SERVER RACK TO IDENTIFY THE SECOND VM AS THE PROTECTED VM — 710

END

START

IDENTIFY A HIGH AVAILABILITY SLOT IN A VIRTUAL SERVER RACK — 1002

TRANSMIT SECOND CONFIGURATION DATA TO A SECOND VIRTUAL MACHINE — 1004

CAUSE REMOVAL OF THE NETWORK PARTITION — 1006

TRANSFER DATA FROM THE FIRST VIRTUAL MACHINE TO THE SECOND VIRTUAL MACHINE — 1008

END

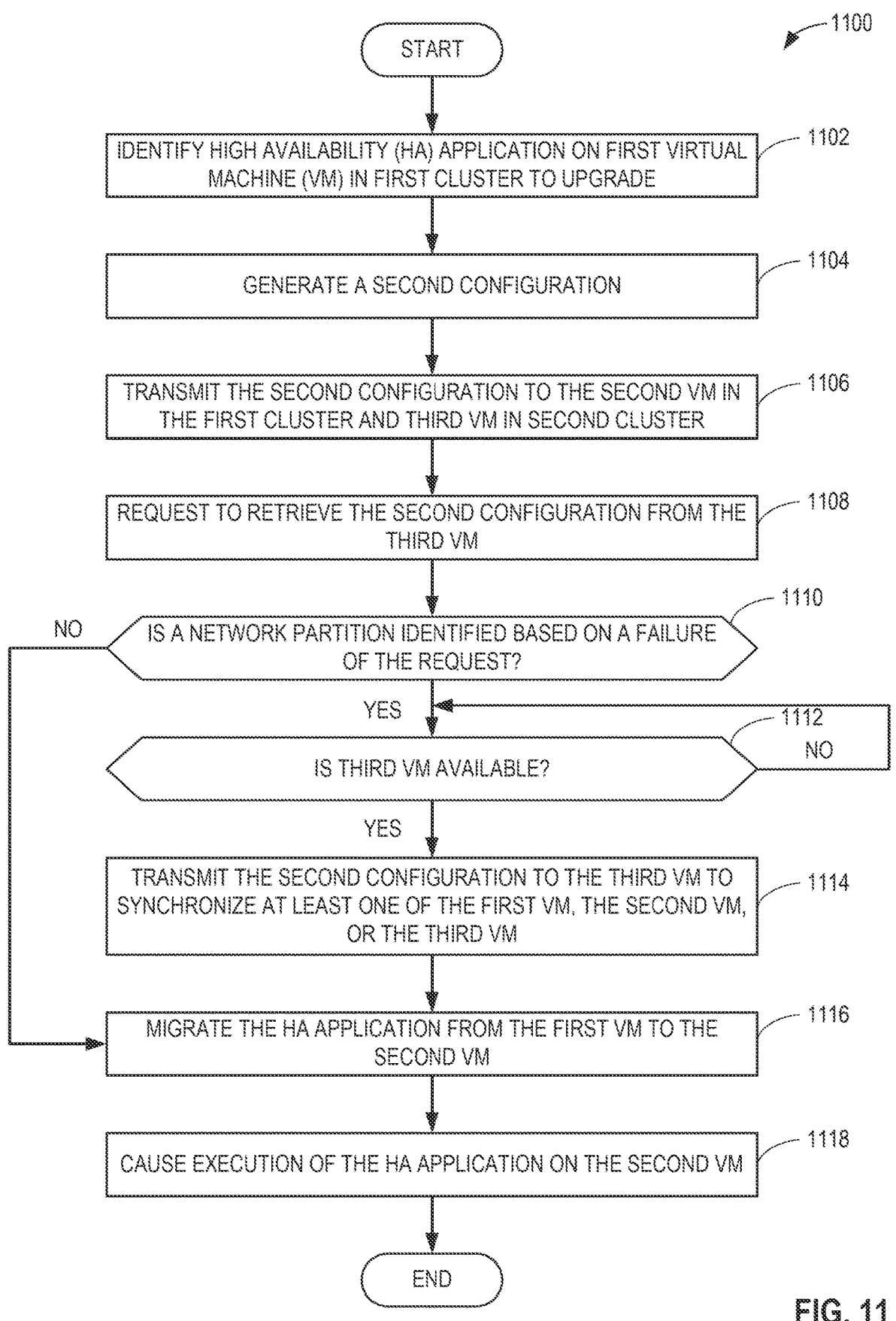

1100

START

IDENTIFY HIGH AVAILABILITY (HA) APPLICATION ON FIRST VIRTUAL MACHINE (VM) IN FIRST CLUSTER TO UPGRADE — 1102

GENERATE A SECOND CONFIGURATION — 1104

TRANSMIT THE SECOND CONFIGURATION TO THE SECOND VM IN THE FIRST CLUSTER AND THIRD VM IN SECOND CLUSTER — 1106

REQUEST TO RETRIEVE THE SECOND CONFIGURATION FROM THE THIRD VM — 1108

NO ← IS A NETWORK PARTITION IDENTIFIED BASED ON A FAILURE OF THE REQUEST? — 1110

YES

IS THIRD VM AVAILABLE? — 1112 NO

YES

TRANSMIT THE SECOND CONFIGURATION TO THE THIRD VM TO SYNCHRONIZE AT LEAST ONE OF THE FIRST VM, THE SECOND VM, OR THE THIRD VM — 1114

MIGRATE THE HA APPLICATION FROM THE FIRST VM TO THE SECOND VM — 1116

CAUSE EXECUTION OF THE HA APPLICATION ON THE SECOND VM — 1118

END

FIG. 11

SYSTEMS, METHODS, AND APPARATUS FOR STATE CONVERGENCE ASSOCIATED WITH HIGH AVAILABILITY APPLICATION MIGRATION IN A VIRTUALIZED ENVIRONMENT

RELATED APPLICATIONS

Benefit is claimed under 35 U.S.C. 119(a)-(d) to Foreign Application Serial No. 202241037300 filed in India entitled "SYSTEMS, METHODS, AND APPARATUS FOR STATE CONVERGENCE ASSOCIATED WITH HIGH AVAILABILITY APPLICATION MIGRATION IN A VIRTUALIZED ENVIRONMENT", on Jun. 29, 2022, by VMware, Inc., which is herein incorporated in its entirety by reference for all purposes.

FIELD OF THE DISCLOSURE

This disclosure relates generally to cloud computing and, more particularly, to systems, methods, and apparatus for state convergence associated with high availability application migration in a virtualized environment.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and network resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, network devices (e.g., routers, switches, etc.), etc.

BRIEF DESCRIPTION OF THE DRAWINGS

FIG. 6 is an example implementation of the example datastore of FIG. 3.

FIG. 7A is a flowchart representative of example machine readable instructions and/or example operations that may be executed and/or instantiated by example processor circuitry to achieve high availability virtual resource migration.

FIG. 11 is a flowchart representative of example machine readable instructions and/or example operations that may be executed and/or instantiated by example processor circuitry to migrate an application after a removal of a network partition.

The figures are not to scale. In general, the same reference numbers will be used throughout the drawing(s) and accompanying written description to refer to the same or like parts.

DETAILED DESCRIPTION

Figure 1:
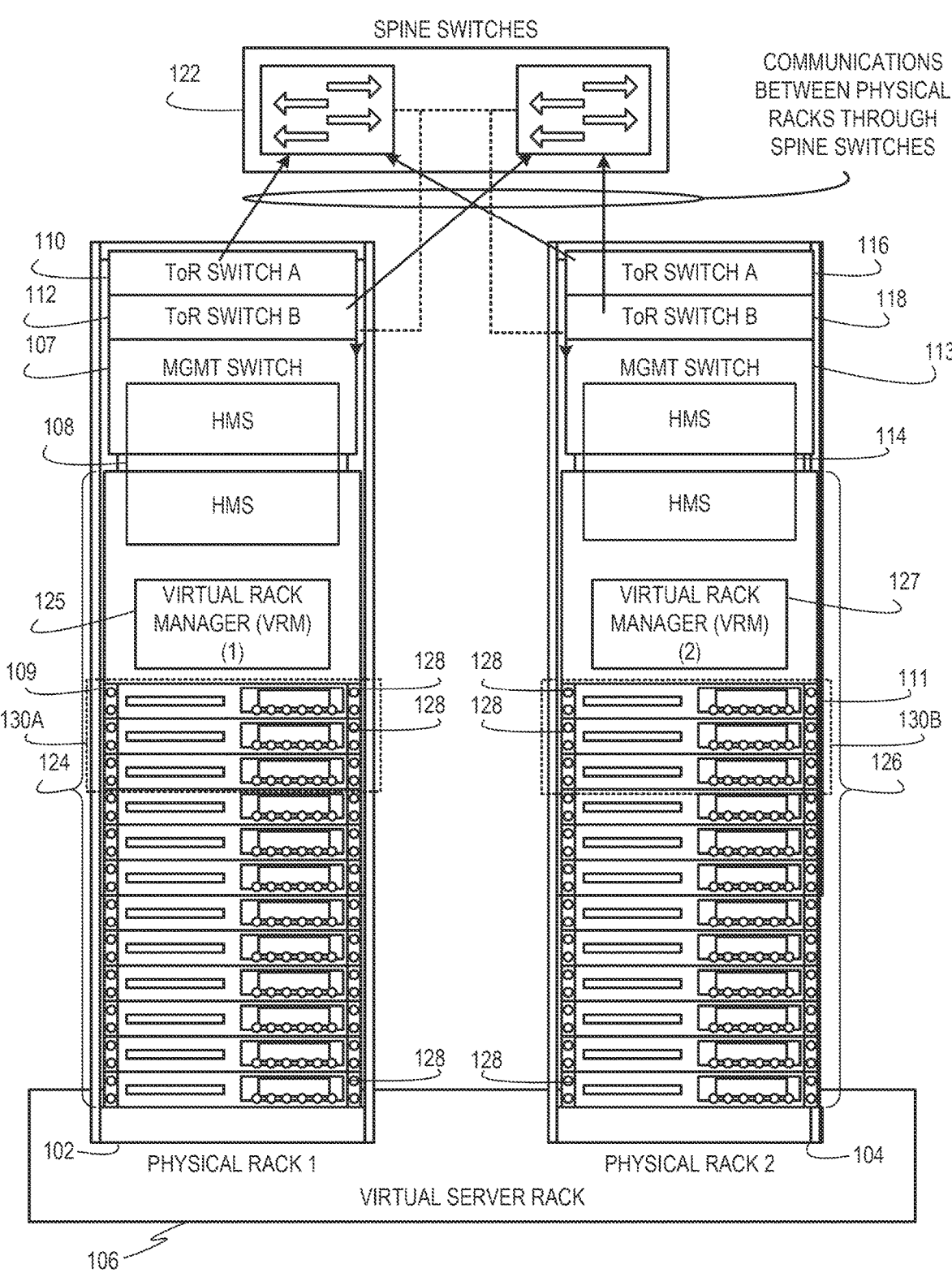
FIG. 1 illustrates example physical racks in an example virtual server rack deployment.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Cloud computing is based on the deployment of many physical resources across a network, virtualizing the physical resources into virtual resources, and provisioning the virtual resources in software defined data centers (SDDCs) for use across cloud computing services and applications. Examples described herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI© hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, VMWARE® ESXi® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCl-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™ and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples described herein provide HCl-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

When starting up a cloud computing environment or adding resources to an already established cloud computing environment, data center operators struggle to offer cost-effective services while making resources of the infrastructure (e.g., storage hardware, computing hardware, and networking hardware) work together to achieve simplified installation/operation and optimize the resources for improved performance. Prior techniques for establishing and maintaining data centers to provide cloud computing services often require customers to understand details and configurations of hardware resources to establish workload domains in which to execute customer services. As used herein, the term "workload domain" refers to virtual hardware policies or subsets of virtual resources of a VM mapped to physical hardware resources to execute a user application.

In examples described herein, workload domains are mapped to a management domain deployment (e.g., a cluster of hosts managed by a vSphere management product developed and provided by VMware, Inc.) in a single rack deployment in a manner that is relatively easier to understand and operate by users (e.g., clients, customers, etc.) than prior techniques. In this manner, as additional racks are added to a system, cross-rack clusters become an option. This enables creating more complex configurations for workload domains as there are more options for deployment as well as additional management domain capabilities that can be leveraged. Examples described herein facilitate making workload domain configuration and management easier than prior techniques.

A management domain is a group of physical machines and VMs that host core cloud infrastructure components necessary for managing a SDDC in a cloud computing environment that supports customer services. Cloud computing allows ubiquitous, convenient, on-demand network access to a shared pool of configurable computing resources (e.g., a pool of hardware resources, etc.). A cloud computing customer can request allocations of such resources to support services required by those customers. For example, when a customer requests to run one or more services in the cloud computing environment, one or more workload domains may be created based on resources in the shared pool of configurable computing resources. Examples described herein enable customers to define different domain types, security, machine learning, capacity, availability, and performance requirements for establishing workload domains in server rack deployments without requiring the users to have in-depth knowledge of server rack hardware and/or configurations.

As used herein, availability refers to the level of redundancy required to provide continuous operation expected for the workload domain. For example, availability may refer to a level of redundancy that is implemented by allocating or reserving one or more backup resources (e.g., hardware resources, virtual resources, etc.) for one or more respective operational resources (e.g., resources executing application(s)). As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD), etc.), and/or power capabilities of a workload domain. As used herein, capacity refers to the aggregate number of resources (e.g., aggregate storage, aggregate CPU, aggregate respective hardware accelerators (e.g., field programmable gate arrays (FPGAs), graphic processor units (GPUs)), etc.) across all servers associated with a cluster and/or a workload domain. In examples described herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options). In some examples, resources are computing devices with set amounts of storage, memory, CPUs, etc. In some examples, resources are individual devices (e.g., hard drives, processors, memory chips, etc.).

An application in a virtualized environment may be deployed as a VM or a container. In some examples, an application may be distributed across multiple VMs and/or containers. During a lifecycle of the application, the application may be upgraded using either an in-place upgrade or a migration-based upgrade. As used herein, an in-place upgrade of an application refers to an installation of a new version of the application without removing an older version of the application and/or without saving any data associated with the application beyond normal precautions. However, in-place upgrades of applications may cause failures, especially if the new version of the application is very different from the old version.

As used herein, a migration-based upgrade of an application refers to an installation of a new version of the application by installing the new version of the application, migrating and/or otherwise moving data from an old version of the application to the new version, and removing the old version upon a successful migration of the data. Advantageously, migration-based upgrades may facilitate recovery easier than in-place upgrades by re-instantiating the old version of the application (e.g., the VM, the container, etc., utilized to execute the application). However, migration-based upgrades require extra resources (e.g., CPU, memory, storage, etc.) to be temporarily provided during the upgrade process. For example, a cluster of hosts may require twice the number of CPU resources to be temporarily used for the migration-based upgrade.

In some virtualized environments, an application may be executed in a high availability (HA) (also referred to as highly available) mode configuration. For example, an application may be run on a cluster of three server host nodes to which a first one of the three server host nodes executes the application and a second and third one of the three server host nodes are idle. In some such examples, in response to a failure of the first server host node, the application may failover to the second server host node. As used herein, a failover refers to restarting an application that failed on a first resource (e.g., a VM, a container, etc.) on a second resource. Advantageously, a failover may mitigate a failure of an underlying hardware resource of the first virtual resource.

In some examples, operating an application in a HA mode configuration may require at least twice the number of resources. For example, an application may require 50 CPU GHz to execute and 50 CPU GHz in reserve to facilitate a failover in response to a failure of the application. In some such examples, executing a migration-based upgrade for an HA application may require additional CPU GHz. For example, the HA application may require 100 CPU GHz (e.g., 50 CPU GHz to run the application and 50 CPU GHz in reserve) to operate and an additional 100 CPU GHz to facilitate the migration-based upgrade. At scale, reserving additional resources to facilitate migration-based upgrades of larger and more complex applications may result in a substantially inefficient utilization of resources, which may be instead utilized to execute other workloads.

Examples disclosed herein include HA virtual resource migration in virtualized environments (e.g., virtual computing environments, cloud computing environments, etc.). In some disclosed examples, VM(s) (or container(s)) may execute HA application(s) in first slot(s) and the HA application(s) utilize one or more reserved (e.g., pre-reserved) slots to accommodate a failover of an application executing on the VM(s) (or the container(s)). For example, a first VM (or a first container) may execute an HA application in a first slot and, in response to a failure of the first slot (e.g., resources associated with the first slot), the first VM may be restarted in one(s) of the reserved slots.

As used herein, a slot (e.g., a resource slot, a virtual server rack slot, a virtual slot, etc.) refers to a minimum level of resources (e.g., CPU, memory, storage, etc.) required to instantiate a single virtual resource (e.g., a VM, a container, a virtual appliance, etc.). For example, a host may have a first quantity of CPU resources and a first quantity of memory resources. In some such examples, the host may include and/or otherwise be configured to implement a plurality of slots with one(s) of the plurality of the slots having a second quantity of CPU resources less than the first quantity of CPU resources and/or a second quantity of memory resources less than the first quantity of memory resources.

In some disclosed examples, an application upgrader can identify a slot reserved and/or otherwise allocated for failover of an HA application. The example application upgrader can utilize the identified slot for an application migration-based upgrade. Advantageously, the example application upgrader can utilize the reserved slot for the application migration-based upgrade instead of allocating additional resources (e.g., additional slot(s)) for the application migration-based upgrade.

In some disclosed examples, the application upgrader achieves the HA virtual resource migration by identifying a source VM (or other virtual resource such as a virtual appliance or container) and a target VM as a pair (e.g., a protected pair including a protected virtual machine and an unprotected virtual machine) with a protected primary and an unprotected secondary. For example, in response to triggering the migration, the application upgrader can identify the source VM, which may be executing the HA application, as the protected primary and the target VM, which may be spun up, launched, and/or otherwise instantiated in a reserved slot. For example, the HA application executing on the source VM can failover to another slot, such as the reserved slot, when the source VM is identified as the protected primary. In some such examples, the target VM can be allowed to fail and/or otherwise be decommissioned when the target VM is identified as the unprotected secondary. In some disclosed examples, in response to a successful upgrade, migration, etc., the application upgrader can switch the roles of the source and target VMs by identifying the target VM as the protected primary and the source VM as the unprotected secondary. In some such disclosed examples, in response to the switching of the roles, the application upgrader can spin down, shutdown, and/or otherwise decommission the source VM and invoke the target VM to execute the HA application. Advantageously, the example application upgrader can achieve HA virtual resource migration with reduced resources compared to prior HA virtual resource migrations.

In some disclosed examples, the application upgrader achieves the HA virtual resource migration after an identification of a network partition. As used herein, a network partition refers to a separation between resources of a virtual server rack and/or portion(s) of a physical server rack that implement(s) the virtual server rack. In some disclosed examples, the network partition can be a physical network partition. By way of example, assume a first VM is in communication with a second VM via a switch (e.g., a ToR switch, a spine switch, etc.). In some disclosed examples, a failure or non-responsiveness of the switch can occur due to the switch physically failing (e.g., a component of the switch has burned out or is damaged) or virtually failing (e.g., an occurrence of a software or firmware runtime error). In some disclosed examples, the failure or non-responsiveness of the switch can cause a physical network partition to occur because the switch cannot facilitate communication between the first VM and the second VM due to a physical infeasibility.

In some disclosed examples, the network partition can be a virtual network partition. By way of the above example, assume the switch is configured with an erroneous or incompatible configuration (e.g., a configuration including an incorrect range of Internet Protocol (IP) addresses, an incorrect subnet mask, etc.). In some disclosed examples, the incorrect configuration of the switch can cause a virtual network partition to occur because the switch, although physically operable and/or loaded with operable firmware and/or software, cannot facilitate communication between the first VM and the second VM.

In some disclosed examples, the application upgrader can halt, pause, etc., a migration-based upgrade of an application from a first VM to a second VM based on a determination that a network partition is identified to exist between the first and second VMs. In some disclosed examples, after the network partition is identified, the application updater can cause a removal of the network partition. For example, the application upgrader can cause the switch to be rebooted to resolve a firmware and/or software error. In some disclosed examples, the application upgrader can cause a reinstallation of firmware and/or software of the switch to resolve a firmware and/or software error. In some disclosed examples, the application upgrader can generate an alert to a user to cause the user to replace a first switch with a second switch to resolve a physical failure of the first switch. In some disclosed examples, the application upgrader can resume the migration-based upgrade of the application after the removal of the network partition between the first and second VMs.

In some disclosed examples, the application upgrader can identify another virtual resource, such as a VM, to effectuate a migration-based upgrade of an application after an identification of a network partition. By way of example, assume an HA application is to be migrated from a first VM in a first cluster to a second VM in a second cluster. In some disclosed examples, the first VM can be separated from the second VM via a network partition. In some disclosed examples, the application upgrader can identify a third VM in the first cluster to complete the migration-based upgrade. For example, the application upgrader can migrate the HA application from the first VM to the second VM to effectuate the migration-based upgrade after the identification of the network partition.

Advantageously, in some disclosed examples, the application upgrader achieves state convergence associated with high availability application migration in a virtualized environment. For example, in response to triggering a migration-based upgrade, a first virtual resource in the virtualized environment can have a first state represented by a first configuration that is different from second states of second virtual resources in the virtualized environment. In some disclosed examples, a network partition may prevent convergence of the second states to the first state. Advantageously, examples disclosed herein illustrate coordination between virtual resources of the virtualized environment to resolve the network partition and achieve convergence of the second states to the first state.

FIG. 1 depicts example physical racks 102, 104 in an example deployment of the virtual server rack 106. The virtual server rack 106 of the illustrated example enables abstracting hardware resources (e.g., physical hardware resources 124, 126). In some examples, the virtual server rack 106 includes a set of physical units (e.g., one or more racks) with each unit including hardware such as server nodes (e.g., compute+storage+network links), network switches, and, optionally, separate storage units. From a user perspective, the example virtual server rack 106 is an aggregated pool of logic resources exposed as one or more VMWARE® ESXI™ clusters (e.g., example clusters 130A, 130B) along with a logical storage pool and network connectivity. In examples disclosed herein, a cluster is a server group in a virtual environment. For example, a VMWARE® ESXI™ cluster (e.g., example clusters 130A, 130B) is a group of physical servers in the physical hardware resources that run ESXI™ hypervisors to virtualize processor, memory, storage, and network resources into logical resources to run multiple VMs that run OSs and applications as if those OSs and applications were running on physical hardware without an intermediate virtualization layer.

In the illustrated example, the first physical rack 102 has an example top-of-rack (ToR) switch A 110, an example ToR switch B 112, an example management switch 107 (identified as MGMT SWITCH), and an example server host node(0) 109. In the illustrated example, the management switch 107 and the server host node(0) 109 run a hardware management system (HMS) 108 for the first physical rack 102. The second physical rack 104 of the illustrated example is also provided with an example ToR switch A 116, an example ToR switch B 118, an example management switch 113, and an example server host node(0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC)), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private Internet Protocol (IP) management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management. In examples disclosed herein, the ToR switches 110, 112, 116, 118 connect to server network interface card (NIC) ports (e.g., using 10 Gbps links) of example server hosts 128 (e.g., including the server host node(0) 109, 111 of the physical racks 102, 104) in the physical racks 102, 104 for downlink communications and to the spine switch(es) 122 (e.g., using 30 Gbps links) for uplink communications. In the illustrated example, the management switch 107, 113 is also connected to the ToR switches 110, 112, 116, 118 (e.g., using a 10 Gbps link) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126) of the physical rack 102, 104. In the illustrated example, the IB connection interfaces to physical hardware resources 124, 126 via an OS running on the server nodes using an OS-specific application programming interfaces (API) such as VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical resources 124, 126 and to keep server objects and switch objects up to date. Example IB operations performed by the HMS 108, 114 include controlling power state, accessing temperature sensors, controlling BIOS (Basic Input/Output System) inventory of hardware (e.g., central processing units (CPUs), memory, disks, etc.), event monitoring, and logging events.

The HMSs 108, 114 of the corresponding physical racks 102, 104 interface with example virtual rack managers (VRMs) 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the VRM 125 of the first physical rack 102 runs on the example cluster 130A of three server host nodes from the example hosts 128 of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the VRM 127 of the second physical rack 104 runs on the example cluster 130B of three server host nodes from the example hosts 128 of the second physical rack 104, one of which is the server host node(0) 111. In the illustrated example, the VRMs 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The VRM 125 of the first physical rack 102 runs on the example cluster 130A of three server host nodes from the example hosts 128 of the first physical rack 102 using a high availability (HA) mode configuration. In addition, the VRM 127 of the second physical rack 104 runs on the example cluster 130B of three server host nodes from the example hosts 128 of the second physical rack 104 using the HA mode configuration. Using the HA mode in this manner, enables fault tolerant operation of the VRM 125, 127 in the event that one of the three server host nodes 128 of one or more of the example cluster 130A, 130B for the VRM 125, 127 fails. Upon failure of a server host node 128 executing the VRM 125, 127, the VRM 125, 127 can be restarted to execute on another one of the hosts 128 in the cluster 130A, 130B. Therefore, the VRM 125, 127 continues to be available even in the event of a failure of one of the server host nodes 128 in the cluster 130A, 130B.

In examples disclosed herein, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112,

116, 118 (e.g., Link states, Packet Stats, Availability, etc.). There is also a configuration buffer as part of the switch object that stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113) in the physical rack 102, 104. However, any other programming language and any other OS may be used to implement the HMS 108, 114.

In some examples, a network partition can arise in connection with one(s) of the physical racks 102, 104. For example, the server host node(0) 109 in the first cluster 130A can be in communication with the server host node(0) 111 in the second cluster 130B via one(s) of the spine switches 122. For example, a first one of the spine switches 122 can fail due to damaged component(s) within the first one of the spine switches 122. In some examples, a network partition can arise between the server host node(0) 109 in the first cluster 130A and the server host node(0) 111 in the second cluster 130B in response to the failure of the first one of the spine switches 122.

In some examples, a network partition can arise in connection with one(s) of the ToR switches 110, 112, 116, 118. For example, the server host node(0) 109 in the first cluster 130A can be in communication with the server host node(0) 111 in the second cluster 130B via one(s) of the ToR switches 110, 112, 116, 118. For example, a first one of the ToR switches 110 can fail due to damaged component(s) within the first one of the ToR switches 110.

In some examples, a network partition can arise in connection with one(s) of the management switches 107, 113. For example, the server host node(0) 109 in the first cluster 130A can be in communication with the server host node(0) 111 in the second cluster 130B via one(s) of the spine switches 122 and one(s) of the management switches 107, 113. For example, a first one of the management switches 107, 113 can fail due to damaged component(s), a firmware or software runtime error, etc., associated with the first one of the management switches 107, 113. In some examples, a network partition can arise between the server host node(0) 109 in the first cluster 130A and the server host node(0) 111 in the second cluster 130B in response to the failure of the first one of the management switches 107, 113. In some examples, a first one of the server host nodes 128 in the first cluster 130A can be separated (e.g., communicatively separated, physically separated, etc.) from a second one of the server host nodes 128 in the first cluster 130A after the failure of the first one of the management switches 107, 113.

Figure 2:
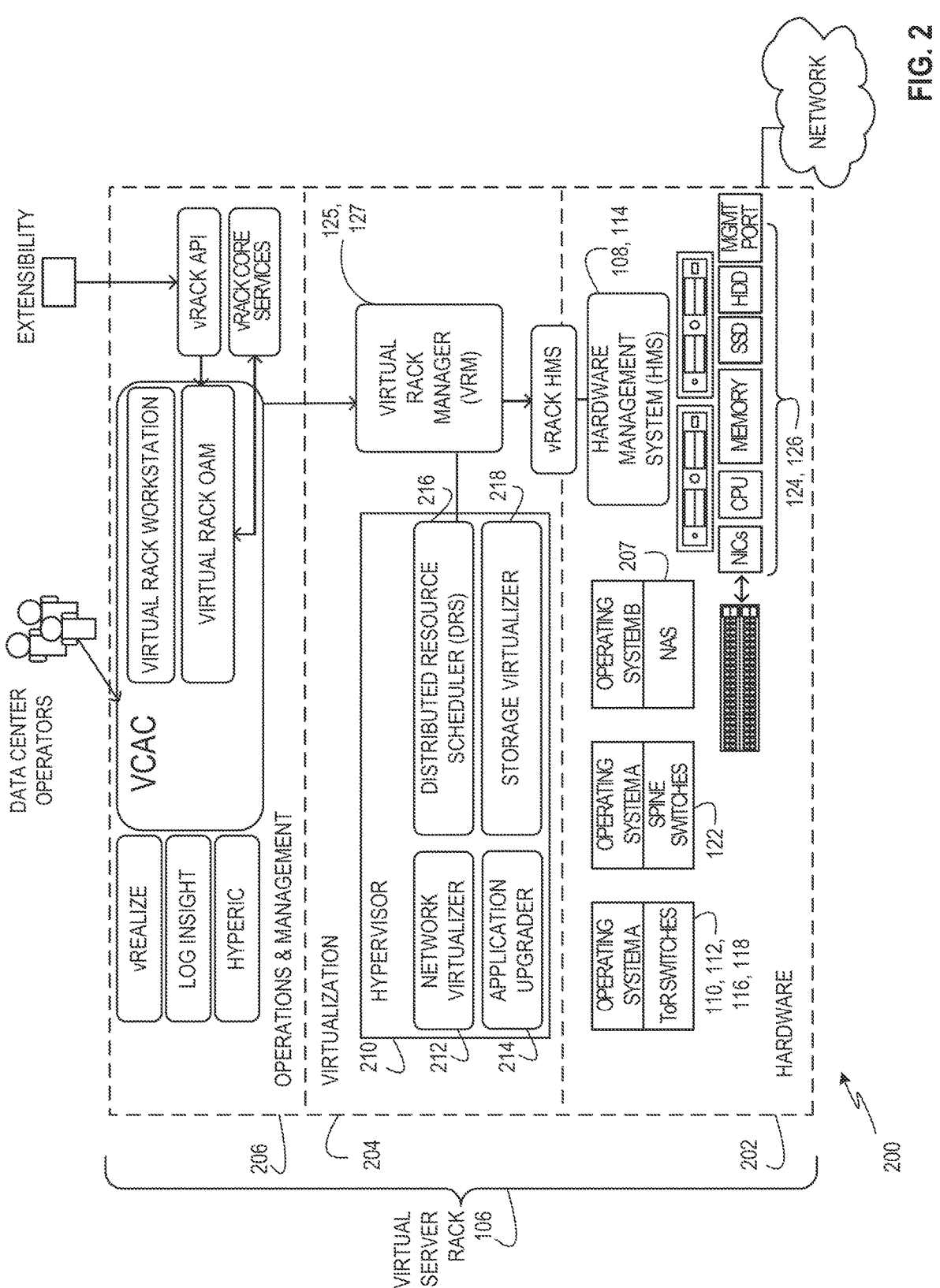
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes an example hardware layer 202, an example virtualization layer 204, and an example operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126 of FIG. 1, virtualizes the physical hardware resources 124, 126 into virtual resources, provisions one(s) of the virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host node(0) 109, 111, and/or, more generally, the server host nodes 128 of FIG. 1, and the ToR switches 110, 112, 116, 118. In the illustrated example, one instance of the HMS 108, 114 runs per physical rack 102, 104. For example, the HMS 108, 114 may run on the management switch 107, 113 and the server host node(0) 109, 111 installed in the example physical rack 102, 104 of FIG. 1. In the illustrated example of FIG. 1, both of the HMSs 108, 114 are provided in corresponding management switches 107, 113 and the corresponding server host node(0) 109, 111 as a redundancy feature in which one of the HMSs 108, 114 is a primary HMS, while the other one of the HMSs 108, 114 is a secondary HMS. In this manner, one of the HMSs 108, 114 may take over as a primary HMS in the event of a failure of the hardware management switch 107, 113 and/or a failure of the server host node(0) 109, 111 on which the other HMS 108, 114 executes. In some examples, to achieve seamless failover, two instances of an HMS 108, 114 run in a single physical rack 102, 104. In some such examples, the physical rack 102, 104 is provided with two management switches, and each of the two management switches runs a separate instance of the HMS 108, 114. In some such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes (0). In this manner, for example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 includes the VRM 125, 127. The example VRM 125, 127 communicates with the HMS 108, 114 to manage the physical hardware resources 124, 126. The example VRM 125, 127 creates the example virtual server rack 106 out of underlying physical hardware resources 124, 126 that may span one or more physical racks (or smaller units such as a hyper-appliance or half rack) and handles physical management of those resources. The example VRM 125, 127 uses the virtual server rack 106 as a basis of aggregation to create and provide operational views, handle fault domains, and scale to accommodate workload profiles. The example VRM 125, 127 keeps track of available capacity in the virtual server rack 106, maintains a view of a logical pool of virtual resources throughout the SDDC life-cycle, and translates logical resource provisioning to allocation of physical hardware resources 124, 126. The example VRM 125, 127 interfaces with an example hypervisor 210 of the virtualization layer 204. The example hypervisor 210 is installed and runs on the example server hosts 128 in the example physical resources 124, 126 to enable the server hosts 128 to be partitioned into multiple logical servers to create VMs. In some examples, the hypervisor 210 may be implemented using a VMWARE® ESXI™ hypervisor available as a component of a VMWARE® VSPHERE® virtualization suite developed and provided by VMWARE®, Inc. The VMWARE® VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example application upgrader 214, an example distributed resource scheduler 216, an example storage virtualizer 218. In the illustrated example, the VRM 125, 127 communicates with these components to manage and present the logical view of underlying resources such as the hosts 128 and the clusters 130A, 130B. The example VRM 125, 127 also uses the logical view for orchestration and provisioning of workloads.

The example network virtualizer 212 virtualizes network resources such as physical hardware switches (e.g., the management switches 107, 113 of FIG. 1, the ToR switches 110, 112, 116, 118, and/or the spine switches 122) to provide software-based virtual networks. The example network virtualizer 212 enables treating physical network resources (e.g., switches) as a pool of transport capacity. In some examples, the network virtualizer 212 also provides network and security services to VMs with a policy driven approach. The network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on one of the server hosts 128. In some examples, the network virtualizer 212 may be implemented using a VMWARE® NSX™ network virtualization platform that includes a number of components including a VMWARE® NSX™ network virtualization manager.

The example application upgrader 214 is executed, instantiated, and/or otherwise provided to implement an upgrade of an application (e.g., an HA application). Additionally or alternatively, the application upgrader 214 may be executed, instantiated, and/or otherwise provided to implement an upgrade of a virtual resource. For example, the application upgrader 214 can execute a migration-based upgrade of a first VM (or a first container) by transferring an application, application data associated with the application, etc., to a second VM (or a second container). In some such examples, the application upgrader 214 can upgrade a software and/or firmware version of the first VM and transfer the application, the application data, etc., back to the first VM (after the upgrade) from the second VM. In some examples, the application upgrader 214 can facilitate an upgrade of hardware, software, and/or firmware of underlying physical hardware resources utilized to implement the first VM by transferring the application, the application data, etc., to the second VM. In some such examples, after the upgrade, the application upgrader 214 can transfer the application, the application data, etc., back to the first VM from the second VM. In some examples, the application upgrader 214 can effectuate the upgrade after an identification of a network partition as disclosed herein. For example, the application upgrader 214 can identify a network partition between two virtual resources and cause completion of an upgrade associated with one(s) of the two virtual resources after the identification of the network partition.

In some examples, the application upgrader 214 moves or migrates virtual resources (e.g., containers, VMs, virtual appliances, etc.) between different hosts 128 without losing state during such migrations to implement the application upgrade. For example, the application upgrader 214 can allow moving an entire running VM from one physical server to another with substantially little or no downtime of an application executed by the VM. The migrating VM retains its network identity and connections, which results in a substantially seamless migration process. The example application upgrader 214 can enable transferring of the VM's active memory and precise execution state over a high-speed network, which can allow the VM to switch from running on a source server host to running on a destination server host. In some examples, the application upgrader 214 effectuates the migration of the virtual resource(s) to achieve upgrade(s) and/or otherwise improved operation of the application.

The example distributed resource scheduler (DRS) 216 is provided to monitor resource utilization across resource pools, to manage resource allocations to different VMs, to deploy additional storage capacity to VM clusters 130A, 130B with substantially little or no service disruptions, and to work with the application upgrader 214 to automatically migrate virtual resources during maintenance with substantially little or no service disruptions to application(s).

The example storage virtualizer 218 is software-defined storage for use in connection with virtualized environments. The example storage virtualizer 218 clusters server-attached hard disk drives (HDDs) and solid state drives (SSDs) to create a shared datastore for use as virtual storage resources in virtual environments. In some examples, the storage virtualizer 218 may be implemented using a VMWARE® VIRTUAL SAN™ network data storage virtualization component developed and provided by VMWARE®, Inc.

The virtualization layer 204 of the illustrated example, and its associated components are configured to run virtual resources such as VMs. However, in other examples, the virtualization layer 204 may additionally or alternatively be configured to run containers. For example, the virtualization layer 204 may be used to deploy a VM as a data computer node with its own guest OS on a host 128 using resources of the host 128. Additionally or alternatively, the virtualization layer 204 may be used to deploy a container as a data computer node that runs on top of a host OS without the need for a hypervisor or separate OS.

In the illustrated example, the OAM layer 206 is an extension of a VMWARE® VCLOUD® AUTOMATION CENTER™ (VCAC) that relies on the VCAC functionality and also leverages utilities such as VREALIZE™, Log Insight™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMWARE®, Inc. Alternatively, some or all of such components may alternatively be supplied by components with the same or similar features developed and provided by other virtualization component developers.

Figure 3:
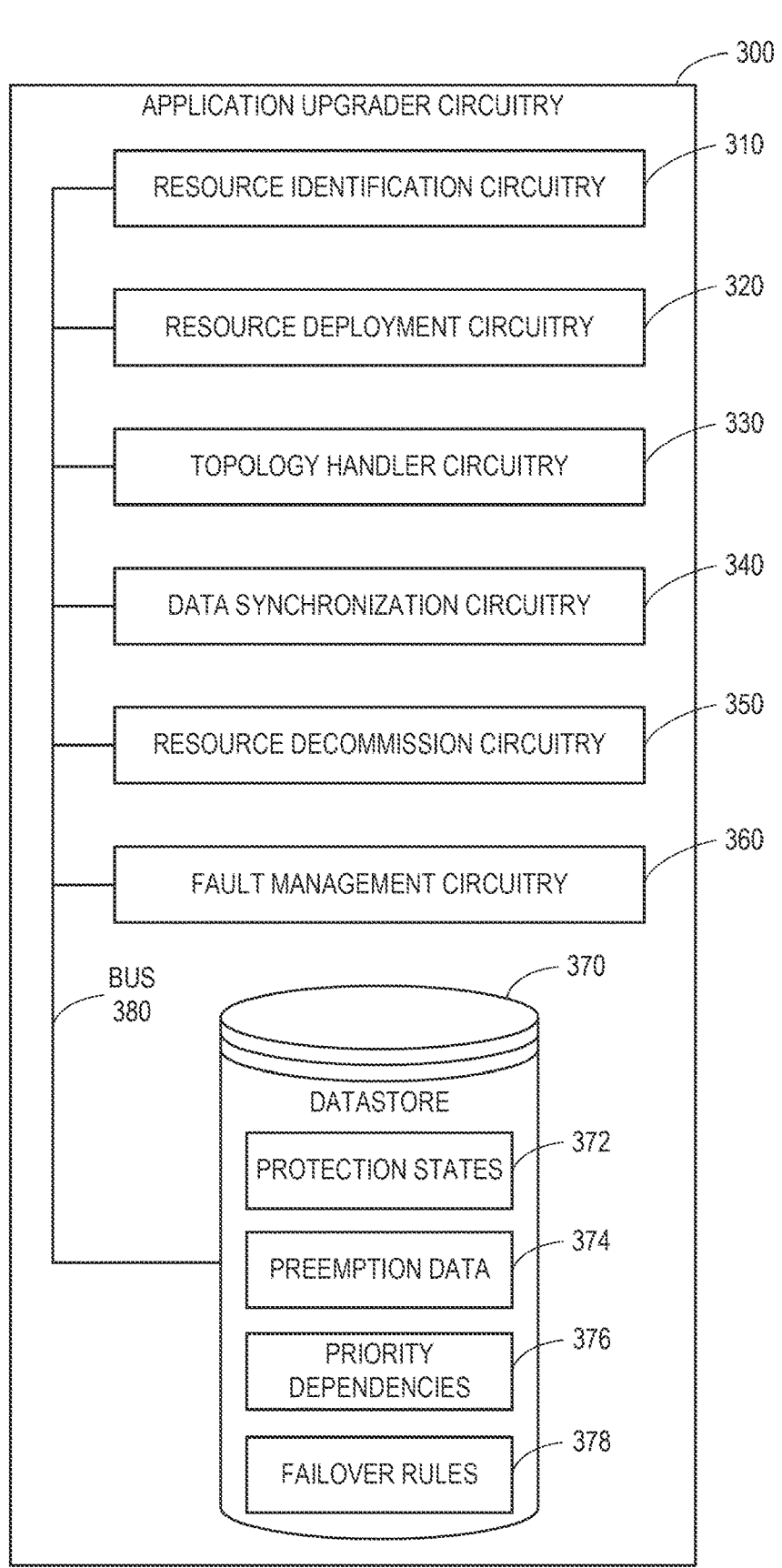
FIG. 3 is a block diagram of an example implementation of the example application upgrader of FIG. 2 including an example datastore.

FIG. 3 is a block diagram of example application upgrader circuitry 300. In some examples, the application upgrader 214 of FIG. 2 can be implemented by the application upgrader circuitry 300 of FIG. 3. For example, the application upgrader circuitry 300 can effectuate and/or implement a migration-based upgrade of an application, such as an HA application. In some such examples, the application upgrader circuitry 300 can identify a source resource, such as a source VM, executing an HA application. The application upgrader circuitry 300 can identify a reserved slot associated with the HA application. The application upgrader circuitry 300 can spin up a target VM in the reserved slot and achieve the migration-based upgrade without allocating additional resources to the migration-based upgrade. In some examples, the application upgrader circuitry 300 can effectuate and/or implement a migration-based upgrade of firmware, software, and/or hardware of a virtual resource (or underlying physical hardware resources utilized to implement the virtual resource) utilizing examples disclosed herein.

The example application upgrader circuitry 300 of FIG. 3 may be instantiated (e.g., creating an instance of, bring into being for any length of time, materialize, implement, etc.) by processor circuitry such as a central processing unit executing instructions. Additionally or alternatively, the example application upgrader circuitry 214 of FIG. 3 may be instantiated (e.g., creating an instance of, bring into being for any length of time, materialize, implement, etc.) by an ASIC or an FPGA structured to perform operations corresponding to the instructions. It should be understood that some or all of the example application upgrader circuitry 300 of FIG. 3 may, thus, be instantiated at the same or different times. Some or all of the example application upgrader circuitry 300 of FIG. 3 may be instantiated, for example, in one or more threads executing concurrently on hardware and/or in series on hardware. Moreover, in some examples, some or all of the example application upgrader circuitry 300 of FIG. 3 may be implemented by microprocessor circuitry executing instructions to implement one or more virtual machines and/or containers.

In the illustrated example of FIG. 3, the application upgrader circuitry 300 includes example resource identification circuitry 310, example resource deployment circuitry 320, example topology handler circuitry 330, example data synchronization circuitry 340, example resource decommission circuitry 350, example fault management circuitry 360, an example datastore 370, and an example bus 380. In this example, the datastore 370 stores and/or otherwise includes example protection states 372, example preemption data 374, example priority dependencies 376, and example failover rules 378.

In the illustrated example of FIG. 3, the application upgrader circuitry 300 includes the resource identification circuitry 310 to identify an HA slot in a virtual server rack to facilitate a failover of an application executing on a first virtual resource such as a VM. In some examples, the resource identification circuitry 310 is instantiated by processor circuitry executing resource identification instructions and/or configured to perform operations such as those represented by the flowcharts of FIGS. 7A, 7B, 8, 9, 10, 11, 12, and/or 13.

In some examples, the resource identification circuitry 310 can identify the virtual server rack 106 of FIGS. 1-2. In some such examples, the resource identification circuitry 310 can determine that the server host node(0) 109 is executing an application. The resource identification circuitry 310 can determine that the application is an HA application. The resource identification circuitry 310 can identify that a different server host node of the cluster 130A is an HA slot to which the application executing on the first virtual resource may failover in response to a failure or non-responsive operation of the first virtual resource.

In some examples, the resource identification circuitry 310 determines whether there is/are available resource(s) to facilitate a failover of an application executing on a resource (e.g., a different VM, a different container, etc.). For example, in response to a failure of the sever host node(0) 109, the resource identification circuitry 310 can determine whether the cluster 130A has or is associated with sufficient resources (e.g., CPU, memory, storage, etc.) to implement a failover of an application implemented by the server host node(0) 109. In some such examples, the resource identification circuitry 310 can determine a quantity of CPU, memory, storage, etc., resources and whether the determined quantities are sufficient to implement the failover.

In some examples, the resource identification circuitry 310 determines whether to upgrade an HA application executing on a first virtual resource. For example, the resource identification circuitry 310 can obtain a command, a direction, an instruction, etc., from a data center operator via an API. In some such examples, the resource identification circuitry 310 can determine that the command, the direction, the instruction, etc., indicates that the HA application (or portion(s) thereof) is to be upgraded from a first version to a second version (e.g., a first software version or build version to a second software version or build version).

In some examples, the resource identification circuitry 310 determines whether to restart an upgrade. For example, the resource identification circuitry 310 can determine that an upgrade of a HA application failed and/or otherwise did not successfully complete. In some such examples, the resource identification circuitry 310 can determine to restart the upgrade. In some examples, the resource identification circuitry 310 determine whether to continue monitoring the virtual server rack 106. For example, the resource identification circuitry 310 can monitor a network interface, a bus, etc., associated with the virtual server rack 106 for commands, instructions, etc., that indicate a change, modification, and/or upgrade of portion(s) of the virtual server rack 106.

In some examples, the resource identification circuitry 310 identifies a high availability slot in a virtual server rack, the high availability slot to facilitate a failover of an application on a first virtual machine in the virtual server rack, the first virtual machine associated with first configuration data that identifies the first virtual machine as a protected virtual machine. For example, the resource identification circuitry 310 can identify the server host node(0) 109 of the first cluster 130A as having, including, and/or otherwise instantiating an HA slot in the virtual server rack 106. For example, the resource identification circuitry 310 can determine that an HA application executing on a first VM implemented by the sever host node(0) 109 has an associated HA slot in the cluster 130A. In some examples, the resource identification circuitry 310 can identify the server host node(0) 109 of the first cluster 130A as having first configuration data that identifies a first VM executed and/or instantiated by the server host node(0) 109 as a protected VM. In some examples, the first configuration data can be stored in the datastore 370 as the protection states 372. For example, the protection state of the first VM as a protected VM can be stored in the datastore 370 as the protection states 372.

In some examples, the resource identification circuitry 310 identifies a VM, a host, etc., in the virtual server rack 106 to utilize in carrying out a migration-based upgrade. For example, after a determination that a network partition is identified between a first VM in the first cluster 130A and a second VM in the second cluster 130B, the resource identification circuitry 310 can identify a third VM in the first cluster 130A to utilize for migration of an HA application on the first VM (e.g., migrate the HA application from the first VM to the third VM). In some examples, after a determination that the network partition is resolved or no longer present in the virtual server rack 106, the resource identification circuitry 310 can identify the second VM as being available. For example, the resource identification circuitry 310 can determine that the second VM is reachable (e.g., communicatively reachable by sending a ping and receiving a ping reply) after the resolving of the network partition.

In the illustrated example of FIG. 3, the application upgrader circuitry 300 includes the resource deployment circuitry 320 to deploy a virtual resource, such as a VM or a container, in an HA slot. In some examples, the resource deployment circuitry 320 is instantiated by processor circuitry executing resource deployment instructions and/or configured to perform operations such as those represented by the flowcharts of FIGS. 7A, 7B, 8, 9, 10, 11, 12, and/or 13.

In some examples, resource identification circuitry 310 can determine that an HA application executing on a first VM implemented by the sever host node(0) 109 has an associated HA slot in the cluster 130A. In some such examples, the resource deployment circuitry 320 can deploy a second VM in the HA slot. For example, the resource deployment circuitry 320 may instantiate, spin up, etc., the second VM in the HA slot. In some such examples, the second VM is a clone, duplicate, or copy of the first VM.

In some examples, the resource deployment circuitry 320 can trigger an upgrade, such as a migration-based upgrade, of the first VM. For example, the resource deployment circuitry 320 can trigger a migration-based upgrade of the first VM by instantiating the second VM. In some examples, the resource deployment circuitry 320 can restart a first virtual resource, such as the first VM, using released resources associated with a second virtual resource, such as the second VM, to restore the virtual server rack 106. For example, in response to triggering the migration-based upgrade of the first VM, the first VM may fail during the upgrade. In some such examples, the resource decommission circuitry 350 can dismantle, spin down, shut down, and/or otherwise decommission the second VM. In some such examples, the resource deployment circuitry 320 can failover the first VM onto the second VM by restarting the HA application on the second VM and thereby restore operation of the virtual server rack 106, or portion(s) thereof. In some examples, the resource deployment circuitry 320 can failover the first VM by restarting the HA application on a third VM using available resources of the cluster 130A.

In the illustrated example of FIG. 3, the application upgrader circuitry 300 includes the topology handler circuitry 330 to identify a protection state of a virtual resource. In some examples, the topology handler circuitry 330 is instantiated by processor circuitry executing topology handler instructions and/or configured to perform operations such as those represented by the flowcharts of FIGS. 7A, 7B, 8, 9, 10, 11, 12, and/or 13.

In some examples, the topology handler circuitry 330 can identify a first protection state of a first VM executing a HA application as protected (e.g., the first VM is a protected VM) and a second protection state of a second VM spun up in an HA slot as unprotected (e.g., the second VM is an unprotected VM). In some such examples, the topology handler circuitry 330 can identify the protection states in response to a trigger of a migration-based upgrade of the HA application. For example, the topology handler circuitry 330 can identify a virtual resource as a protected virtual response in response to a determination that the virtual resource is executing a HA application, or portion(s) thereof, and thereby needs to be restarted with minimal or reduced downtime to achieve HA in response to a failure of the virtual resource. In some examples, the topology handler circuitry 330 can identify the virtual resource as an unprotected virtual resource in response to a determination that the virtual resource is not executing a HA application, or portion(s) thereof, and thereby does not need to be restarted in response to a failure of the virtual resource. In some examples, the topology handler circuitry 330 identifies a virtual resource as protected or unprotected by inspecting the protection states 372 for the protection state associated with the virtual resource.

In some examples, the topology handler circuitry 330 generates migration data in response to an initialization of a migration-based upgrade of an HA application. In some examples, the topology handler circuitry 330 generates migration data to include one or more preemption pairs. For example, a preemption pair may include a protected virtual resource and an unprotected virtual resource. In some such examples, the protected virtual resource can preempt operation or existence of the unprotected virtual resource in response to a failure of the protected virtual resource. For example, in response to a failure of the protected virtual resource, the topology handler circuitry 330 can identify the unprotected virtual resource to be decommissioned and/or otherwise cease operation to free up resource(s) of the unprotected virtual resource that may be used to restart the HA application executing on the protected virtual resource.

In some examples, the topology handler circuitry 330 modifies protection states of virtual resources in response to a successful migration-based upgrade. For example, in response to a successful transfer of data from (i) a first VM (or a first container) having a first protection state of protected to (ii) a second VM (or a second container) having a second protection state of unprotected, the topology handler circuitry 330 can modify the first and second protection states. In some such examples, the topology handler circuitry 330 can adjust the first protection state from protected to unprotected and the second protection state from unprotected to protected. For example, the topology handler circuitry 330 can change the second protection state from unprotected to protected because the second VM may gain control of the execution of the HA application from the first VM and thereby the first VM no longer needs to be protected because the first VM is no longer executing the HA application.

In some examples, the topology handler circuitry 330 generates a configuration, or configuration data, associated with a virtual resource. By way of example, a first VM can have a first configuration, which identifies the first VM was a protected VM. In some examples, the topology handler circuitry 330 can generate a second configuration, or second configuration data. For example, the topology handler circuitry 330 can generate the second configuration to identify the first VM as an unprotected VM and a second VM as a protected VM to effectuate a migration-based upgrade of an HA application from the first VM to the second VM.

In the illustrated example of FIG. 3, the application upgrader circuitry 300 includes the data synchronization circuitry 340 to transfer data from a first virtual resource, such as a first VM or a first container, to a second virtual resource, such as a second VM, during an upgrade of an HA application being executed by the first VM (or to be executed by the first VM). For example, the data synchronization circuitry 340 can transfer data associated with the HA application, which may include one or more databases, one or more programs, etc., that, when executed or invoked, may execute the HA application. In some examples, the data synchronization circuitry 340 is instantiated by processor circuitry executing data synchronization instructions and/or configured to perform operations such as those represented by the flowcharts of FIGS. 7A, 7B, 8, 9, 10, 11, 12, and/or 13.

In some examples, in response to and/or otherwise after a successful transfer of the data, the topology handler circuitry 330 can identify new protection states for the first VM (or the first container) and the second VM (or the second container). In some examples, the data synchronization circuitry 340 synchronizes the migration data associated with the virtual server rack 106 to identify the second VM as the protected VM. For example, the data synchronization circuitry 340 can synchronize the migration data by storing the migration data in the datastore 370 as at least one of the protection states 372, the preemption data 374, the priority dependencies 376, or the failover rules 378. For example, in response to the identification of the new protection states, the data synchronization circuitry 340 can store the new protection states in the datastore 370 as the protection states 372. In some such examples, the data synchronization circuitry 340 can store updates to the preemption pair(s) included in the preemption data 374. In some examples, the data synchronization circuitry 340 modifies the priority dependencies 376 to change an order of restarts of virtual resources based on the second VM being identified as the protected VM and the first VM being identified as the unprotected VM.

In some examples, the data synchronization circuitry 340 stores a first association of a first protection state and a second protection state. For example, in response to triggering a migration-based upgrade, the data synchronization circuitry 340 can identify the first protection state of the first VM as protected and the second protection state of the second VM as unprotected. In some such examples, the data synchronization circuitry 340 can generate a first association of the first protection state of the first VM and the second protection state of the second VM as a first preemption pair.

The data synchronization circuitry 340 can store the first preemption pair as the preemption data 374.

In some examples, the data synchronization circuitry 340 stores a second association of the first protection state and the second protection state. For example, in response to successfully executing the migration-based upgrade, the data synchronization circuitry 340 can identify the first protection state of the first VM as unprotected and the second protection state of the second VM as protected. In some such examples, the data synchronization circuitry 340 can generate a second association of the first protection state of the first VM and the second protection state of the second VM as a second preemption pair. The data synchronization circuitry 340 can store the second preemption pair as the preemption data 374.

In some examples, the data synchronization circuitry 340 replaces the first association with the second association. For example, the data synchronization circuitry 340 can replace the first preemption pair with the second preemption pair in the preemption data 374. In some examples, the data synchronization circuitry 340 persists the replacement within the virtual server rack 106 to synchronize the migration data. For example, the data synchronization circuitry 340 can propagate the changes to the preemption data 374 within the virtual server rack 106 to synchronize different versions of the preemption data 374 in different datastores, databases, etc., which include the different versions of the preemption data 374 to merge, converge, etc., to the same version. In some examples, the data synchronization circuitry 340 completes a migration-based upgrade. For example, in response to causing the different versions of the preemption data 374 to be synchronized, the data synchronization circuitry 340 can complete the migration-based upgrade of the HA application.

In some examples, the data synchronization circuitry 340 transmits configuration data to a virtual resource. By way of example, assume a first VM has a first configuration that identifies the first VM as a protected VM. In some examples, an HA application on the first VM is selected to be migrated to a second VM. In some examples, the data synchronization circuitry 340 can transmit a second configuration to the second VM. For example, the second configuration can identify the first VM as a nonprotected VM and the second VM as the protected VM.

In some examples, the data synchronization circuitry 340 can verify whether the second VM received the second configuration. For example, after an attempt to transmit the second configuration to the second VM, the data synchronization circuitry 340 can request the second VM to send the second configuration back to the data synchronization circuitry 340. In some examples, the data synchronization circuitry 340 can compare the received configuration from the second VM to the second configuration. If, the received configuration matches the second configuration, the data synchronization circuitry 340 can determine that the second VM has the second configuration.

In some examples, the data synchronization circuitry 340 can determine that the second VM did not receive the second configuration based on a non-responsiveness of the second VM to the request by the data synchronization circuitry 340 for the second configuration. In some examples, the data synchronization circuitry 340 can determine that the non-responsiveness of the second VM is due to a network partition between the first VM and the second VM. For example, the HMS 108, 114 can provide data to the data synchronization circuitry 340 that is representative of a failure and/or non-responsiveness of at least one of one(s) of the management switches 107, 113, one(s) of the ToR switches 110, 112, 116, 118, or one(s) of the spine switches 122.

In some examples, after a removal of a network partition associated with the first VM and the second VM, the data synchronization circuitry 340 can transmit the second configuration to the second VM to synchronize the first VM and the second VM (and/or one(s) of third VMs in the virtual server rack 106). In some examples, after a removal of a network partition associated with the first VM and the second VM, the data synchronization circuitry 340 can transfer data from the first VM to the second VM. For example, the data synchronization circuitry 340 can transfer and/or otherwise migrate the HA application from the first VM to the second VM.

In the illustrated example of FIG. 3, the application upgrader circuitry 300 includes the resource decommission circuitry 350 to spin down, shutdown, and/or otherwise decommission one or more virtual resources (e.g., one or more VMs, one or more containers, etc., and/or combination(s) thereof). In some examples, the resource decommission circuitry 350 is instantiated by processor circuitry executing resource decommission instructions and/or configured to perform operations such as those represented by the flowcharts of FIGS. 7A, 7B, 8, 9, 10, 11, 12, and/or 13.

In some examples, the resource decommission circuitry 350 triggers a shutdown of a first VM (or a first container) during a migration-based upgrade. For example, in response to a successful migration of data from the first VM to a second VM (or a second container), the resource decommission circuitry 350 can instruct the first VM to shutdown and/or otherwise cease operation. In some such examples, the resource decommission circuitry 350 can identify one or more resources (e.g., CPU, memory, storage, etc.) utilized by the first VM to be available to compose different virtual resource(s). For example, the resource decommission circuitry 350 can return the one or more resources to the shared pool of configurable computing resources of the physical racks 102, 104 of FIG. 1.

In some examples, in response to a failure of a first VM (or a first container) during a migration-based upgrade of the first VM, the resource decommission circuitry 350 can decommission a second VM (or a second container) to release resources associated with the second VM for the first VM failover. For example, in response to a determination that the first VM is a protected VM and the second VM is an unprotected VM, the resource decommission circuitry 350 can decompose or dismantle the second VM to free up resources for an HA application executed by the first VM to restart on the freed-up resources. In some examples, in response to a failure of a VM different from the protected VM and the unprotected VM during a migration-based upgrade of the protected VM, the resource decommission circuitry 350 can decommission the unprotected VM to release resources associated with the unprotected VM for the failover of the failed VM.

In the illustrated example of FIG. 3, the application upgrader circuitry 300 includes the fault management circuitry 360 to identify a failure of at least one of a first virtual resource, such as a first VM or a second container, or a second virtual resource, such as a second VM or a second container, during a migration-based upgrade of an HA application executed by the first VM. In some examples, the fault management circuitry 360 is instantiated by processor circuitry executing fault management instructions and/or configured to perform operations such as those represented by the flowcharts of FIGS. 7A, 7B, 8, 9, 10, 11, 12, and/or 13.

In some examples, the fault management circuitry 360 can identify that the first VM and/or the second VM failed during a transfer of data from the first VM to the second VM. In some examples, the fault management circuitry 360 determines that a third VM separate from the first VM and/or the second VM has failed during the migration-based upgrade. For example, the third VM can be instantiated to execute one or more portions of the HA application, execute one or more routines or workloads or computing tasks that is/are dependent on the HA application, etc., and/or any combination(s) thereof.

In some examples, in response to identifying that at least one of the first VM or the second VM failed during the migration-based upgrade, the fault management circuitry 360 restores the first VM, the second VM, and/or, more generally, the virtual server rack 106, based on one or more of the failover rules 378. In some examples, in response to a successful transfer of data from the first VM to the second VM, the fault management circuitry 360 can complete the migration-based upgrade of the HA application by updating the failover rules 378 based on the successful transfer of the data. For example, in response to identifying the first VM as an unprotected VM and the second VM as a protected VM, the fault management circuitry 360 can update one or more of the failover rules 378 based on prioritizing a failover of the second VM over unprotected virtual resources.

In some examples, the fault management circuitry 360 determines whether a first VM and/or a first container failed during a migration-based upgrade of a HA application to a second VM and/or a second container. For example, in response to a determination that the first VM failed, the fault management circuitry 360 can terminate an application executing on the second VM for the first VM failover. For example, the fault management circuitry 360 can inspect and/or otherwise analyze one or more failover rules. In some such examples, the fault management circuitry 360 can determine based on the failover rules that the second VM is unprotected and thereby the application instantiated on the second VM may be terminated. In some examples, the fault management circuitry 360 can restart the HA application on the second VM to restore the virtual server rack. For example, in response to the termination of the application on the second VM, the fault management circuitry 360 can failover the first VM by restarting the HA application on the second VM to restore the virtual server rack 106 of FIGS. 1 and/or 2.

In some examples, the fault management circuitry 360 can determine that a network partition is identified. For example, the fault management circuitry 360 can determine that a network partition is identified based on a failure of a request for configuration data from a virtual resource, such as a VM or host. In some examples, the fault management circuitry 360 can detect and/or otherwise identify a network partition between virtual resources (or physical hardware resources that instantiate the virtual resources) based on utilization data associated with a switch. For example, the fault management circuitry 360 can determine that a switch is causing a network partition based on the switch having a maximum resource utilization (e.g., a 99% or greater CPU, memory, or storage utilization in response to a software and/or firmware runtime error, an infinite code loop condition incurred, etc.). In some examples, the fault management circuitry 360 can determine that a switch is causing a network partition in response to a lack of detectable heartbeats from the switch, a lack of unreturned ping requests, etc., and/or any combination(s) thereof. In some examples, the fault management circuitry 360 can detect a network partition associated with a switch based on a watchdog timer associated with the switch no longer being updated by the switch. In some examples, the fault management circuitry 360 can detect a network partition incurred by a faulty and/or non-responsiveness switch due to a break in memory state synchronization between the faulty and/or non-responsive switch and other switch(es).

In some examples, the fault management circuitry 360 can mitigate, resolve, and/or otherwise cause removal of a network partition associated with virtual resource(s) in the virtual server rack 106. In some examples, after a determination that a network partition is identified based on a failure of a request to retrieve configuration data from a VM or host, the fault management circuitry 360 can cause removal of the network partition. For example, the fault management circuitry 360 can cause a failed and/or non-responsiveness switch (e.g., one(s) of the management switches 107, 113, one(s) of the ToR switches 110, 112, 116, 118, one(s) of the spine switches 122, etc.) to be rebooted to resolve a firmware and/or software error. In some examples, the fault management circuitry 360 can cause a reinstallation of firmware and/or software of the switch to resolve a firmware and/or software error. In some examples, the fault management circuitry 360 can generate an alert, which can be presented to a user via a graphical user interface (GUI) and/or propagated to a server or other computing or electronic system to invoke corrective action, to invoke the user and/or the server/computing system/electronic system to cause replacement of the switch with a different switch to resolve a physical failure of the switch.

In some examples, the fault management circuitry 360 causes execution of an application, such as an HA application, on a virtual resource. For example, after a migration (e.g., a successful migration) of an HA application from a first VM to a second VM, the fault management circuitry 360 can instruct the second VM to execute (e.g., resume execution, continue executing, etc.) the HA application from a last known or stored point of operation of the HA application.

In the illustrated example of FIG. 3, the application upgrader circuitry 300 includes the datastore 370 to record data. In some examples, the datastore 370 is instantiated by processor circuitry executing datastore instructions and/or configured to perform operations such as those represented by the flowcharts of FIGS. 7A, 7B, 8, 9, 10, 11, 12, and/or 13. In the illustrated example, the datastore 370 records migration data, which includes the protection states 372, the preemption data 374, the priority dependencies 376, and/or the failover rules 378. The datastore 370 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 370 may additionally or alternatively be implemented by one or more double data rate (DDR) memories, such as DDR, DDR2, DDR3, DDR4, mobile DDR (mDDR), etc. The datastore 370 may additionally or alternatively be implemented by one or more mass storage devices such as HDD(s), SSD(s), compact disk (CD) drive(s), digital versatile disk (DVD) drive(s), etc. While in the illustrated example the datastore 370 is illustrated as a single datastore, the datastore 370 may be implemented by any number and/or type(s) of datastores. Furthermore, the data stored in the datastore 370 may be in any data format such as, for example, binary data, comma delimited data, tab delimited data, structured query language (SQL) structures, numerical values, string data, etc.

In the illustrated example of FIG. 3, the resource identification circuitry 310, the resource deployment circuitry 320, the topology handler circuitry 330, the data synchronization circuitry 340, the resource decommission circuitry 350, the fault management circuitry 360, and/or the example datastore 370 are in communication with the bus 380. For example, the bus 380 can be implemented by at least one of an Inter-Integrated Circuit (I2C) bus, a Serial Peripheral Interface (SPI) bus, or a Peripheral Component Interconnect (PCI) bus. Additionally or alternatively, the bus 380 may implement any other type of computing or electrical bus.

In some examples, the apparatus includes means for identifying an HA slot in a virtual server rack. For example, the means for identifying an HA slot may be implemented by the resource identification circuitry 310. In some examples, the resource identification circuitry 310 may be instantiated by processor circuitry, which may be implemented by the example processor circuitry 1412 of FIG. 14 and/or the example microprocessor 1500 of FIG. 15 executing machine executable instructions such as that implemented by at least block 702 of FIG. 7A, blocks 732, 752 of FIG. 7B, blocks 802, 814, 820 of FIG. 8, block 902 of FIG. 9, block 1002 of FIG. 10, blocks 1102, 1112 of FIG. 11, blocks 1202, 1212 of FIG. 12, and/or blocks 1302, 1312, 1318 of FIG. 13. In some examples, the resource identification circuitry 310 may be instantiated by hardware logic circuitry, which may be implemented by an ASIC or the FPGA circuitry 1600 of FIG. 16 structured to perform operations corresponding to the machine readable instructions. Additionally or alternatively, the resource identification circuitry 310 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the means for identifying an HA slot is to identify a high availability slot in a virtual server rack, the high availability slot to facilitate a failover of an application on a first virtual machine in the virtual server rack, the first virtual machine associated with first configuration data that identifies the first virtual machine as a protected virtual machine. In some examples, the means for identifying an HA slot includes means for determining to, in response to a second identification of a failure of a third virtual machine to execute a third application, determine whether one or more first resources are available to failover the third application.

In some examples, the apparatus includes means for deploying a second VM in the HA slot. For example, the means for deploying may be implemented by the resource deployment circuitry 320. In some examples, the resource deployment circuitry 320 may be instantiated by processor circuitry, which may be implemented by the example processor circuitry 1412 of FIG. 14 and/or the example microprocessor 1500 of FIG. 15 executing machine executable instructions such as that implemented by at least block 704 of FIG. 7A, block 734 of FIG. 7B, blocks 804, 816 of FIG. 8, and/or block 904 of FIG. 9. In some examples, the resource deployment circuitry 320 may be instantiated by hardware logic circuitry, which may be implemented by an ASIC or the FPGA circuitry 1600 of FIG. 16 structured to perform operations corresponding to the machine readable instructions. Additionally or alternatively, the resource deployment circuitry 320 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the apparatus includes means for identifying the second VM as an unprotected VM. For example, the means for identifying the second VM as an unprotected VM may be implemented by the topology handler circuitry 330. In some examples, the topology handler circuitry 330 may be instantiated by processor circuitry, which may be implemented by the example processor circuitry 1412 of FIG. 14 and/or the example microprocessor 1500 of FIG. 15 executing machine executable instructions such as that implemented by at least block 736, 738 of FIG. 7B, blocks 906, 912 of FIG. 9, block 1104 of FIG. 11, block 1204 of FIG. 12, and/or block 1304 of FIG. 13. In some examples, the topology handler circuitry 330 may be instantiated by hardware logic circuitry, which may be implemented by an ASIC or the FPGA circuitry 1600 of FIG. 16 structured to perform operations corresponding to the machine readable instructions. Additionally or alternatively, the topology handler circuitry 330 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the identifying of the second VM is in response to the deployment of the second VM in the HA slot, and the second virtual machine is to not be restarted in response to a failure of the second virtual machine when identified as the unprotected virtual machine. In some examples, the means for identifying the second VM as an unprotected VM includes means for generating the migration data to include a first identification of the first virtual machine as the protected virtual machine and a second identification of the second virtual machine as the unprotected virtual machine. In some examples, the means for identifying is to, in response to the deployment of the second virtual machine in the high availability slot, identify a first protection state of the first virtual machine as protected and a second protection state of the second virtual machine as unprotected.

In some examples, the means for identifying the second VM as an unprotected VM includes means for generating a second configuration, the second configuration to identify a first VM (e.g., a first VM in a first cluster) as an unprotected VM and a second VM (e.g., a second VM in the first cluster or a second cluster) as a protected VM. In some examples, the means for identifying the second VM as an unprotected VM includes means for generating a second configuration, the second configuration to identify a first host (e.g., a first host in a first cluster) as an unprotected host and a second host (e.g., a second host in the first cluster or a second cluster) as a protected host.

In some examples, the apparatus includes means for transferring and/or means for transmitting data from the first VM to the second VM. For example, the means for transferring and/or the means for transmitting may be implemented by the data synchronization circuitry 340. In some examples, the data synchronization circuitry 340 may be instantiated by processor circuitry, which may be implemented by the example processor circuitry 1412 of FIG. 14 and/or the example microprocessor 1500 of FIG. 15 executing machine executable instructions such as that implemented by at least blocks 706, 710 of FIG. 7A, blocks 740, 748, 750 of FIG. 7B, block 822 of FIG. 8, blocks 908, 914, 916, 918, 920 of FIG. 9, blocks 1004, 1008 of FIG. 10, blocks 1106, 1108, 1114, 1116 of FIG. 11, blocks 1206, 1208, 1214, 1216 of FIG. 12, and/or blocks 1306, 1308, 1314, 1318, 1322 of FIG. 13. In some examples, the data synchronization circuitry 340 may be instantiated by hardware logic circuitry, which may be implemented by an ASIC or the FPGA circuitry 1600 of FIG. 16 structured to perform operations corresponding to the machine readable instructions. Additionally or alternatively, the data synchronization circuitry 340 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate. In some examples, the means for transferring includes means for synchronizing migration data associated with the virtual server rack to identify the second VM as the protected VM.

In some examples, the means for transferring and/or the means for transmitting include(s) means for storing in a datastore a first association of (i) the first protection state of the first virtual machine and (ii) the second protection state of the second virtual machine. In some examples, the means for storing is to, in response to the trigger of the shutdown of the first virtual machine, store in the datastore a second association of (i) the first protection state of the first virtual machine as unprotected and (ii) the second protection state of the second virtual machine as protected. In some examples, the means for storing is to replace the first association with the second association to synchronize the migration data.

In some examples, the means for transferring and/or the means for transmitting transmit second configuration data to a second virtual machine, the second configuration data to identify a first VM as a nonprotected VM and a second virtual machine as the protected VM. In some examples, after a removal of a network partition, the means for transferring and/or the means for transmitting transfer data from the first VM to the second VM. In some examples, the means for transferring and/or the means for transmitting transmit configuration data to virtual resource(s) to synchronize the virtual resource(s). In some examples, the means for transferring and/or the means for transmitting include means for requesting retrieval of configuration data from a virtual resource, such as a VM, a container, etc. In some examples, the means for transferring and/or the means for transmitting include means for migration an application (e.g., an HA application) from a first VM to a second VM.

In some examples, the apparatus includes means for triggering a shutdown of the first VM. For example, the means for triggering may be implemented by the resource decommission circuitry 350. In some examples, the resource decommission circuitry 350 may be instantiated by processor circuitry, which may be implemented by the example processor circuitry 1412 of FIG. 14 and/or the example processor circuitry 1500 of FIG. 15 executing machine executable instructions such as that implemented by at least block 708 of FIG. 7A, block 746 of FIG. 7B, block 818 of FIG. 8, and/or block 910 of FIG. 9. In some examples, the resource decommission circuitry 350 may be instantiated by hardware logic circuitry, which may be implemented by an ASIC or the FPGA circuitry 1600 of FIG. 16 structured to perform operations corresponding to the machine readable instructions. Additionally or alternatively, the resource decommission circuitry 350 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the apparatus includes means for terminating an HA application on the second VM for a first VM failover. For example, the means for terminating may be implemented by the fault management circuitry 360. In some examples, the fault management circuitry 360 may be instantiated by processor circuitry, which may be implemented by the example processor circuitry 1412 of FIG. 14 and/or the example processor circuitry 1500 of FIG. 15 executing machine executable instructions such as that implemented by at least blocks 742, 744 of FIG. 7B, blocks 806, 808, 810, 812, 816, 818, 820 of FIG. 8, block 920 of FIG. 9, block 1006 of FIG. 10, blocks 1110, 1118 of FIG. 11, blocks 1210, 1218 of FIG. 12, and/or blocks 1310, 1316, 1324 of FIG. 13. In some examples, the fault management circuitry 360 may be instantiated by hardware logic circuitry, which may be implemented by an ASIC or the FPGA circuitry 1600 of FIG. 16 structured to perform operations corresponding to the machine readable instructions. Additionally or alternatively, the fault management circuitry 360 may be instantiated by any other combination of hardware, software, and/or firmware, which may be implemented by at least one or more hardware circuits (e.g., processor circuitry, discrete and/or integrated analog and/or digital circuitry, a comparator, an operational-amplifier (op-amp), a logic circuit, etc.) structured to execute the machine readable instructions and/or perform the corresponding operations without executing software or firmware, but other structures are likewise appropriate.

In some examples, the means for terminating includes means for restarting the first application on the second virtual machine in the high availability slot to restore the virtual server rack. In some examples, the means for restarting is to, in response to a second identification of a failure of the first virtual machine prior to the deployment of the second virtual machine, restart the first application on a third virtual machine in the high availability slot.

In some examples, the means for terminating is to, in response to a third identification of the failure of the first virtual machine after the deployment of the second virtual machine, terminate a second application on the second virtual machine. In some examples, the means for restarting is to restart the first application on the second virtual machine in the high availability slot.

In some examples, the means for terminating includes means for determining that a network partition is identified based on a failure of a request to retrieve a configuration (e.g., configuration data) from a virtual resource, such as a VM or container. In some examples, the means for terminating includes means for causing removal of a network partition. For example, after a determination that a network partition is identified based on a failure of a request to retrieve configuration data from a VM, the means for causing is to cause removal of the network partition. In some examples, the means for terminating includes means for causing execution of an application on a virtual resource, such as a VM or container.

While an example manner of implementing the application upgrader 214 of FIG. 2 is illustrated in connection with the application upgrader circuitry 300 of FIG. 3, one or more of the elements, processes, and/or devices illustrated in FIG. 3 may be combined, divided, re-arranged, omitted, eliminated, and/or implemented in any other way. Further, the example resource identification circuitry 310, the example resource deployment circuitry 320, the example topology handler circuitry 330, the example data synchronization circuitry 340, the example resource decommission circuitry 350, the example fault management circuitry 360, the example datastore 370, the example protection states 372, the example preemption data 374, the example priority dependencies 376, the example failover rules 378, the example bus 380, and/or, more generally, the example application upgrader 214 of FIG. 2, may be implemented by hardware alone or by hardware in combination with software and/or firmware. Thus, for example, any of the example resource identification circuitry 310, the example resource deployment circuitry 320, the example topology handler circuitry 330, the example data synchronization circuitry 340, the example resource decommission circuitry 350, the example fault management circuitry 360, the example datastore 370, the example protection states 372, the example preemption data 374, the example priority dependencies 376, the example failover rules 378, the example bus 380, and/or, more generally, the example application upgrader 214, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example application upgrader 214 of FIG. 2 may include one or more elements, processes, and/or devices in addition to, or instead of, those illustrated in FIG. 3, and/or may include more than one of any or all of the illustrated elements, processes and devices.

Figure 4A:
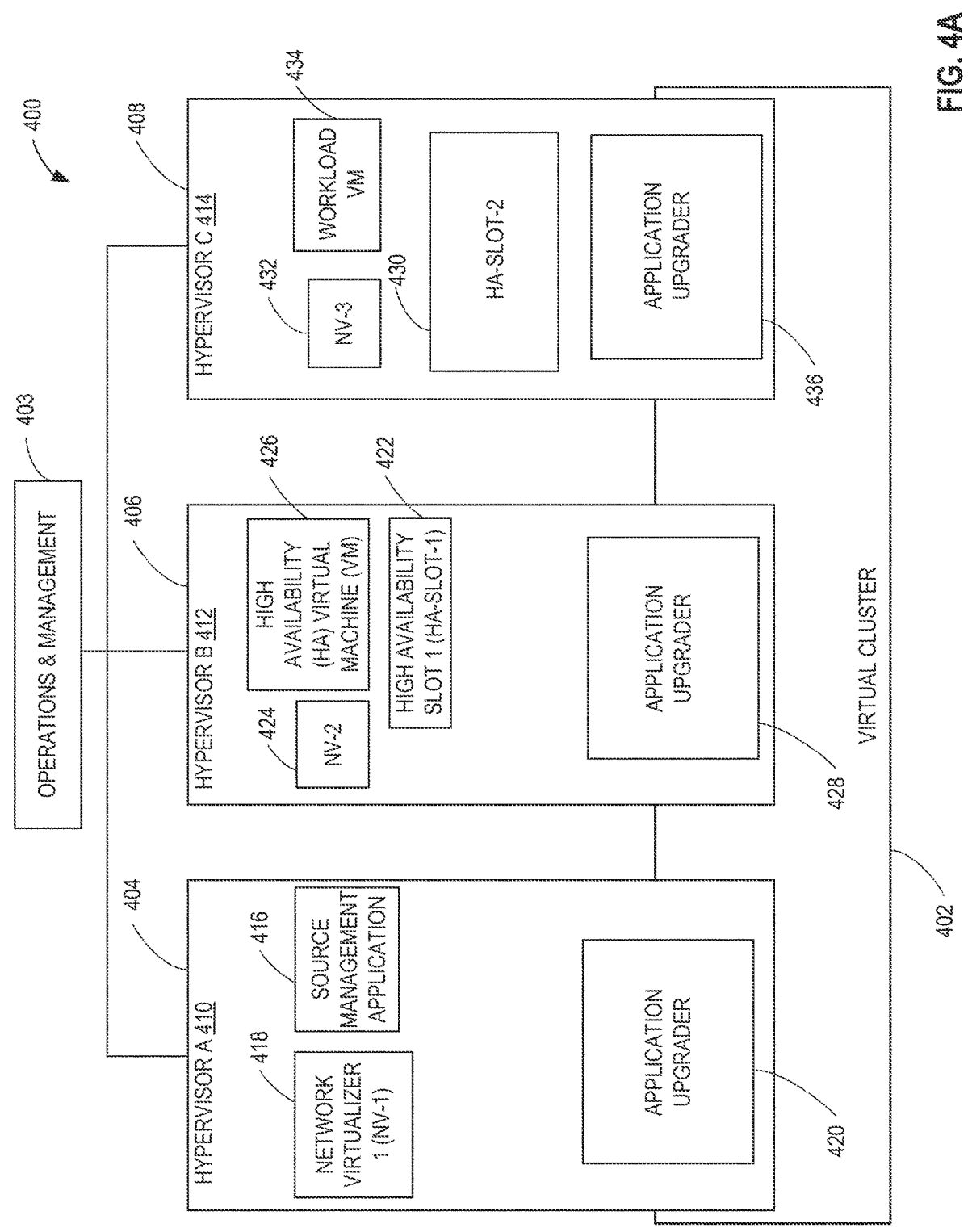
FIG. 4A is a block diagram of an example implementation of an example three node cluster.

FIG. 4A is a block diagram of an example implementation of a virtualized environment 400 including an example cluster 402 (identified as VIRTUAL CLUSTER) in communication with an example operations and management layer 403. For example, the operations and management layer 403 can be implemented by the operations and management layer 206 of FIG. 2. In some examples, the cluster 402 can implement the cluster 130A, 130B of FIG. 1. For example, the cluster 402 can implement a VMWARE® ESXI™ cluster. In this example, the cluster 402 implements and/or otherwise includes three example nodes 404, 406, 408. For example, the cluster 402 of FIG. 4A can implement a three-node virtual cluster.

The nodes 404, 406, 408 include a first example node 404, a second example node 406, and a third example node 408. In this example, the nodes 404, 406, 408 are implemented by respective example hypervisors 410, 412, 414 including a first example hypervisor 410, a second example hypervisor 412, and a third example hypervisor 414. For example, the hypervisors 410, 412, 414 can implement ESXI™ hypervisors.

The first hypervisor 410 of the illustrated example instantiates and/or otherwise includes an example source management application 416, a first example network virtualizer 418 (identified by NV-1), and a first example application upgrader 420. The second hypervisor 412 of the illustrated example instantiates and/or otherwise includes a first example high available slot 422 (identified by HA-SLOT-1), a second example network virtualizer 424 (identified by NV-2), an example high availability (HA) virtual machine (VM) 426, and a second example application upgrader 428. The third hypervisor 414 of the illustrated example instantiates and/or otherwise includes a second example high availability slot 430 (identified by HA-SLOT-2), a third example network virtualizer 432 (identified by NV-3), an example workload VM 434, and a third example application upgrader 436.

In the illustrated example, the source management application 416 is executing on a VM. For example, the first hypervisor 410 can instantiate a VM and install the source management application 416 on the VM. In some examples, the source management application 416 is a collection of components that setup and manage the cluster 402. For example, the source management application 416 can be implemented by the VMWARE® VSPHERE® virtualization suite, or portion(s) thereof. Alternatively, the source management application 416 can be implemented by any other type of virtualization software.

In the illustrated example, the first network virtualizer 418, the second network virtualizer 424, and/or the third network virtualizer 432 may each be executing on a VM. For example, the first hypervisor 410 may instantiate a VM and install the first network virtualizer 418 on the VM. In some examples, the second hypervisor 412 may instantiate a VM and install the second network virtualizer 424 on the VM. In some examples, the third hypervisor 414 may instantiate a VM and install the third network virtualizer 432 on the VM.

The first network virtualizer 418, the second network virtualizer 424, and/or the third network virtualizer 432 deploy and manage virtualized network resources across the cluster 402. For example, the first network virtualizer 418, the second network virtualizer 424, and/or the third network virtualizer 432 may be implemented by the network virtualizer 212 of FIG. 2. In some such examples, the first network virtualizer 418, the second network virtualizer 424, and/or the third network virtualizer 432 may be implemented using a VMWARE® NSX™ network virtualization platform that includes a number of components including a VMWARE® NSX™ network virtualization manager.

The workload VM 434 is a VM that is executing a workload, such as function(s), routine(s), etc., associated with an application. HA-SLOT-1 422 and HA-SLOT-2 430 are reserved slots that may be idle in preparation for a failover event from a virtual resource, such as a VM or container, executing a HA application. The HA VM 426 is a VM instantiated to execute in an HA mode configuration. For example, the HA VM 426 can execute an HA application, or portion(s) thereof. In some such examples, in response to a failure of the HA VM 426, the second application upgrader 428 may failover the HA VM 426 by spinning up an instance of the HA VM 426 in the HA-SLOT-1 and restarting the HA application on the instance of the HA VM 426 in the HA-SLOT-1.

In the illustrated example, the first application upgrader 420, the second application upgrader 428, and the third application upgrader 436 are instances of each other. For example, the first application upgrader 420, the second application upgrader 428, and the third application upgrader 436 can be implemented by the application upgrader 214 of FIG. 2 and/or the application upgrader circuitry 300 of FIG. 3. Alternatively, one or more of the first application upgrader 420, the second application upgrader 428, and/or the third application upgrader 436 may be different from each other.

Figure 4B:
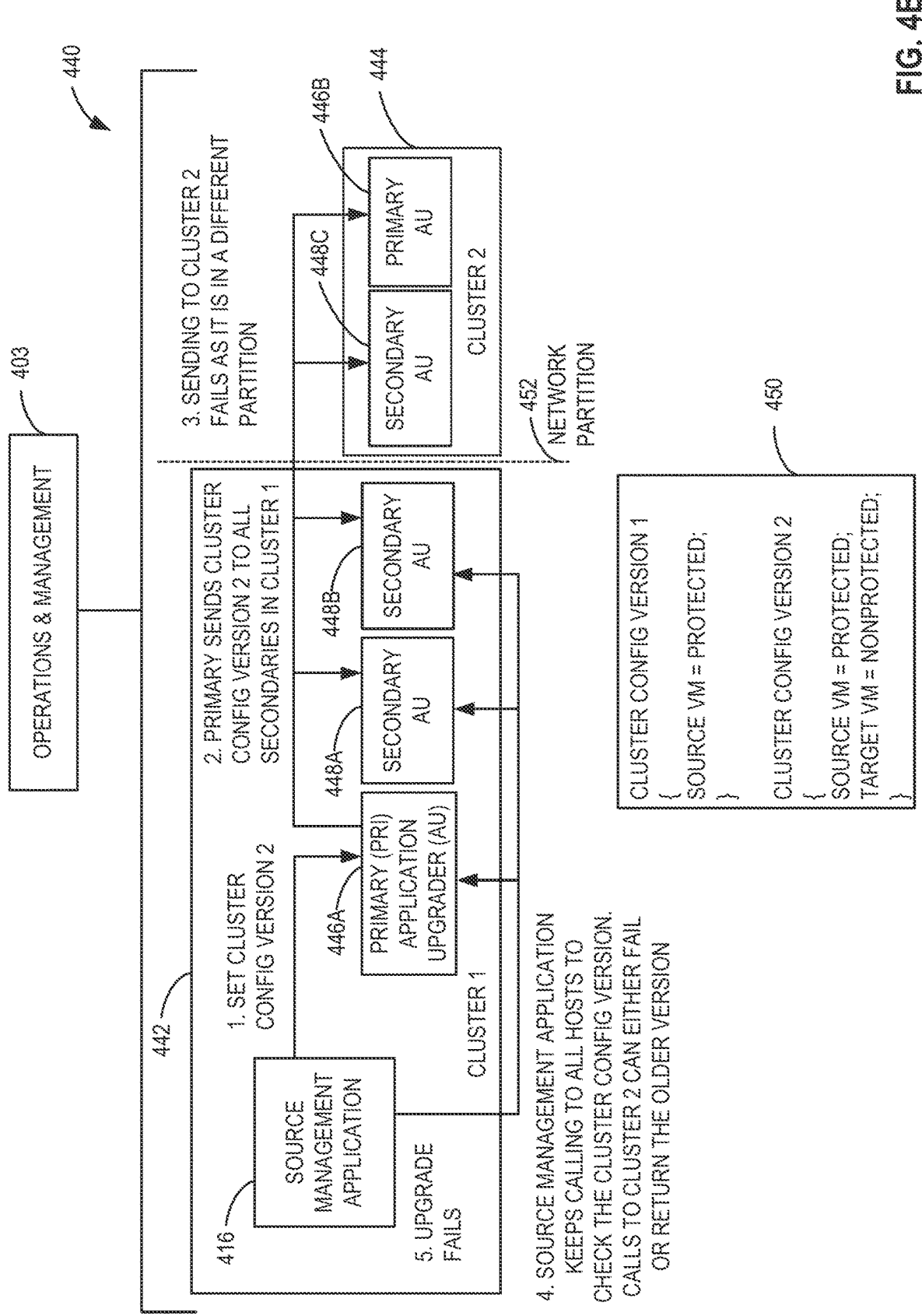
FIG. 4B is a block diagram of an example network partition in an example virtual server rack deployment during an initialization phase of a migration-based upgrade.

FIG. 4B is a block diagram of another example implementation of a virtualized environment 440. The virtualized environment 440 of the illustrated example can be in an initialization phase of a migration-based upgrade. The virtualized environment 440 includes the operations and management layer 403 of FIG. 4A. The virtualized environment 440 of the illustrated example includes a first example cluster 442 and a second example cluster 444. The first example cluster 442 includes the source management application 416, a first example primary application upgrader (AU) 446A, a first example secondary application upgrader 448A, and a second example secondary application upgrader 448B. The second example cluster 444 includes a second example primary application upgrader 446B and a third example secondary application upgrader 448C. In some examples, the first primary application upgrader 446A, the first secondary application upgrader 448A, the second secondary application upgrader 448B, the second primary application upgrader 446B, and/or the third secondary application upgrader 448C can be implemented by the application upgrader 214 of FIG. 2 and/or the application upgrader circuitry 300 of FIG. 3.

In the illustrated example, the first primary application upgrader 446A, the first secondary application upgrader 448A, the second secondary application upgrader 448B, the second primary application upgrader 446B, and/or the third secondary application upgrader 448C can be respectively instantiated by a respective virtual resource, such as a VM or a container. For example, the first primary application upgrader 446A can be instantiated by a first VM, the first secondary application upgrader 448A can be instantiated by a second VM, etc.

In the illustrated example, the source management application 416 can effectuate a migration-based upgrade, such as migrating an HA application from a first VM (e.g., a first VM that instantiates the first primary application upgrader 446A) in the first cluster 442 to a second VM (e.g., a second VM that instantiates the second primary application upgrader 446B) in the second cluster 444. In example operation, before the start of the migration-based upgrade, an example configuration 450 (identified by CLUSTER CONFIG or CONFIG) associated with the virtualized environment 440 is a first version (e.g., a first configuration version). The first version of the configuration 450 of the illustrated example can be representative of the first VM being a protected VM and the second VM being a nonprotected VM. The example configuration 450 is stored by each of the application upgraders 446A, 446B, 448A, 448B, 448C. For example, the configuration 450 can be stored in the datastore 370 of FIG. 3 as the protection states 372.

After triggering the migration-based upgrade, the example source management application 416 generates and distributes a second version of the configuration 450 (e.g., a second configuration version) to the application upgraders 446A, 446B, 448A, 448B, 448C. The second version of the configuration 450 of the illustrated example can be representative of the first VM being a nonprotected VM and the second VM being a protected VM, which can take effect after a successful migration-based upgrade. In the illustrated example, an example network partition 452 is depicted to represent a break in communication between the first cluster 442 and the second cluster 444. Due to the network partition 452, the second version of the configuration 450 is stored by the application upgraders 446A, 448A, 448B in the first cluster 442 but not by the application upgraders 446B, 448C in the second cluster 444.

In example operation, the source management application 416 can request each of the application upgraders 446A, 446B, 448A, 448B, 448C for their respective copy of the configuration 450 to ensure that they are storing the latest or newest version of the configuration 450. Due to the network partition 452, the source management application 416 cannot communicate with the second cluster 444. In some examples, after one or more attempts (e.g., 1 attempt, 3 attempts, etc.) to query the second primary application upgrader 446B and/or the third secondary application upgrader 448C, the example source management application 416 can detect the existence of the network partition 452.

In some examples, the upgrade fails in the initialization phase due to a failure of a source host. By way of example, assume an HA application is to be migrated from a source VM to a target VM. In some examples, if the source VM is instantiated by a host in the second cluster 444, and the source VM fails in the initialization phase, then the upgrade fails and/or is otherwise terminated. In some examples, if the source VM is instantiated by a host in the first cluster 442, and the source VM fails in the initialization phase, then the upgrade fails.

In some examples, the upgrade fails in the initialization phase due to a failure of a target host. By way of example, assume an HA application is to be migrated from a source VM to a target VM. In some examples, if the target VM is instantiated by a host in the second cluster 444, and the target VM fails in the initialization phase, then the upgrade fails and/or is otherwise terminated. In some examples, if the target VM is instantiated by a host in the first cluster 442, and the target VM fails in the initialization phase, then the upgrade fails.

In some examples, the upgrade fails in the initialization phase due to a failure of a different host from a source or target host. By way of example, assume an HA application is to be migrated from a source VM to a target VM. By way of example, assume there is also a management VM in the same virtualized environment as the source VM and the target VM. By way of example, assume the management VM has a higher failover or restart priority than the target VM. In some examples, if the management VM fails in the initialization phase and there are insufficient virtual resources in the virtualized environment that can be used to failover the management VM, then the upgrade fails. In some examples, if the management VM fails in the initialization phase and there are sufficient virtual resources in the virtualized environment that can be used to failover the management VM, then the upgrade continues.

Figure 4C:
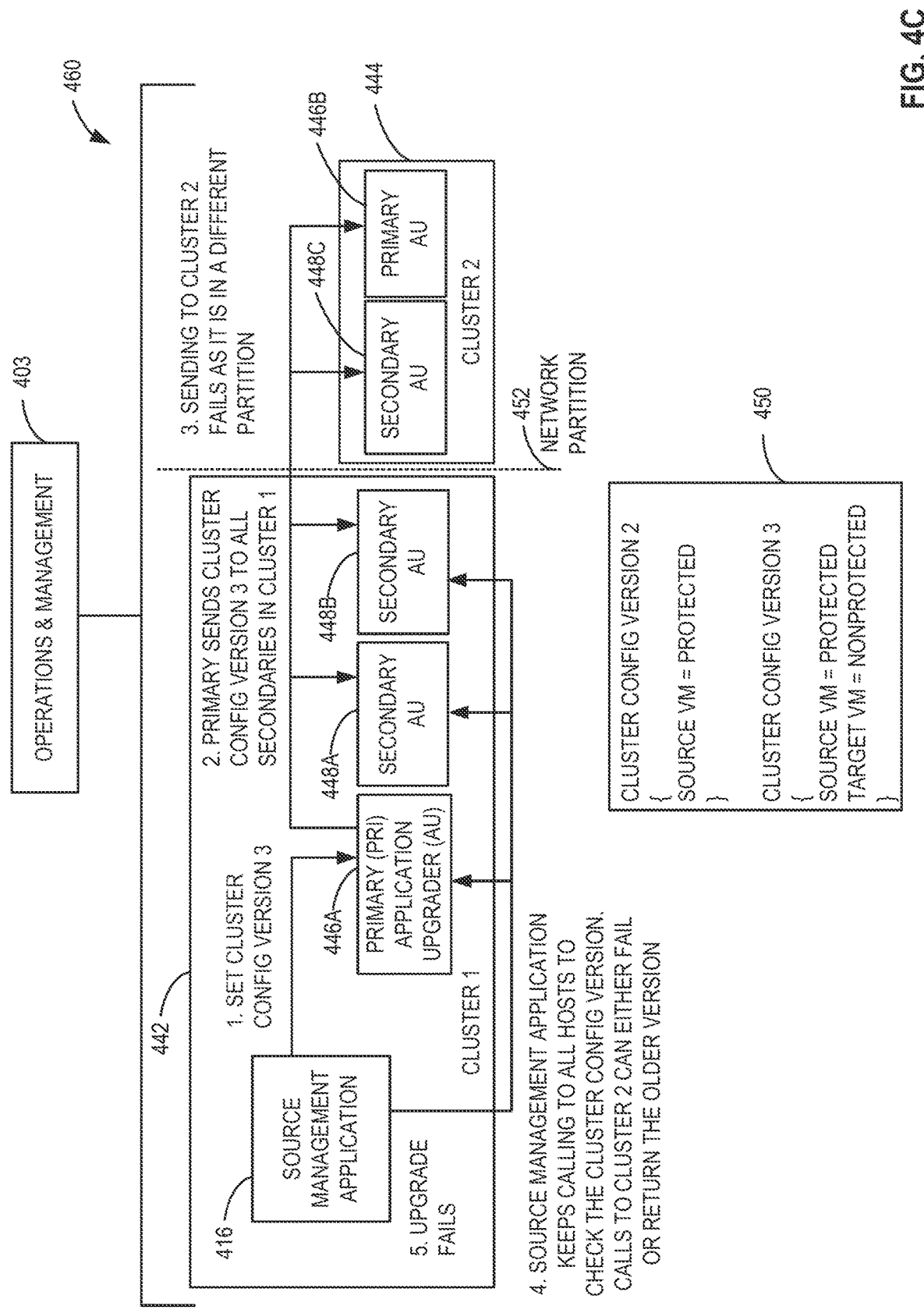
FIG. 4C is a block diagram of an example network partition in an example virtual server rack deployment during a switchover phase of a migration-based upgrade.

FIG. 4C is a block diagram of an example implementation of a virtualized environment 460. The example virtualized environment 460 can correspond to the virtualized environment 440 of FIG. 4B. The virtualized environment 460 of the illustrated example of FIG. 4C can be in a switchover phase of a migration-based upgrade. For example, the switchover phase of a migration-based upgrade can correspond to the portion of the migration-based upgrade after an application and/or data associated thereof is/are transferred from a source VM to a target VM and prior to the target VM resuming execution of the application. The virtualized environment 460 of the illustrated example includes the operations and management layer 403 of FIGS. 4A and/or 4B. The virtualized environment 460 of the illustrated example includes the first cluster 442, the second cluster 444, the first primary application upgrader 446A, the first secondary application upgrader 448A, the second secondary application upgrader 448B, the second primary application upgrader 446B, and the third secondary application upgrader 448C of FIG. 4B.

In example operation, at the beginning of the switchover phase, the configuration 450 associated with the virtualized environment 460 is a second version (e.g., a second configuration version). The second version of the configuration 450 of the illustrated example can be representative of the first VM being a protected VM and the second VM being a nonprotected VM. The example configuration 450 is stored by each of the application upgraders 446A, 446B, 448A, 448B, 448C. For example, the configuration 450 can be stored in the datastore 370 of FIG. 3 as the protection states 372.

In example operation, during the switchover phase, the source management application 416 generates and distributes a third version of the configuration 450 (e.g., a third configuration version) to the application upgraders 446A, 446B, 448A, 448B, 448C. The third version of the configuration 450 of the illustrated example can be representative of the first VM being a nonprotected VM and the second VM being a protected VM, which can take effect after a successful migration-based upgrade. In the illustrated example, the network partition 452 is depicted to represent a break in communication between the first cluster 442 and the second cluster 444. For example, the network partition 452 can occur after an initialization phase and before the end of the switchover phase. Due to the network partition 452, the third version of the example configuration 450 is stored by the application upgraders 446A, 448A, 448B in the first cluster 442 but not by the application upgraders 446B, 448C in the second cluster 444.

In example operation, the source management application 416 can request each of the application upgraders 446A, 446B, 448A, 448B, 448C for their respective copy of the configuration 450 to ensure that they are storing the latest or newest version of the configuration 450. Due to the network partition 452, the example source management application 416 cannot communicate with the second cluster 444. In some examples, after one or more attempts (e.g., 1 attempt, 3 attempts, etc.) to query the second primary application upgrader 446B and/or the third secondary application upgrader 448C, the source management application 416 can detect the existence of the network partition 452.

In some examples, the upgrade fails in the switchover phase due to a failure of a source host. By way of example, assume an HA application is to be migrated from a source VM to a target VM. In some examples, if the source VM is instantiated by a host in the second cluster 444, and the source VM fails in the switchover phase, then the upgrade fails and/or is otherwise terminated because the source VM did not receive the third version of the configuration 450. For example, the source VM can have the second version of the configuration 450 that identifies the target VM as nonprotected, which causes the failed source VM to failover to the target VM.

In some examples, the upgrade completes in the switchover phase after a failure of a source host. For example, if the source VM is instantiated by a host in the first cluster 442, and the source VM fails in the switchover phase, then the upgrade completes because the source VM received the third version of the configuration 450. For example, the source VM can have the third version of the configuration 450 that identifies the source VM as nonprotected, which causes the source VM to shutdown and allow the target VM to take control of the first cluster 442.

In some examples, the upgrade fails in the switchover phase due to a failure of a target host. By way of example, assume an HA application is to be migrated from a source VM to a target VM. In some examples, if the target VM is instantiated by a host in the second cluster 444, and the target VM fails, then the upgrade fails and/or is otherwise terminated because the target VM did not receive the third version of the configuration 450. For example, the target VM can have the second version of the configuration 450 that identifies the target VM as nonprotected, which causes the target VM to shutdown.

In some examples, the upgrade completes in the switchover phase after a failure of a target host. For example, if the target VM is instantiated by a host in the first cluster 442, and the target VM fails in the switchover phase, then the upgrade completes because the target VM received the third version of the configuration 450. For example, the target VM can have the third version of the configuration 450 that identifies the target VM as protected, which causes the target VM to failover to another VM and take control of the first cluster 442.

In some examples, the upgrade fails in the switchover phase due to a failure of a different host from a source or target host. By way of example, assume an HA application is to be migrated from a source VM to a target VM. By way of example, assume there is also a management VM in the same virtualized environment as the source VM and the target VM. By way of example, assume the management VM has a higher failover or restart priority than the target VM. In some examples, if the management VM fails in the switchover phase and there are insufficient virtual resources in the virtualized environment that can be used to failover the management VM, then the upgrade fails. In some examples, if the management VM fails in the switchover phase and there are sufficient virtual resources in the virtualized environment that can be used to failover the management VM, then the upgrade continues.

Figure 5A:
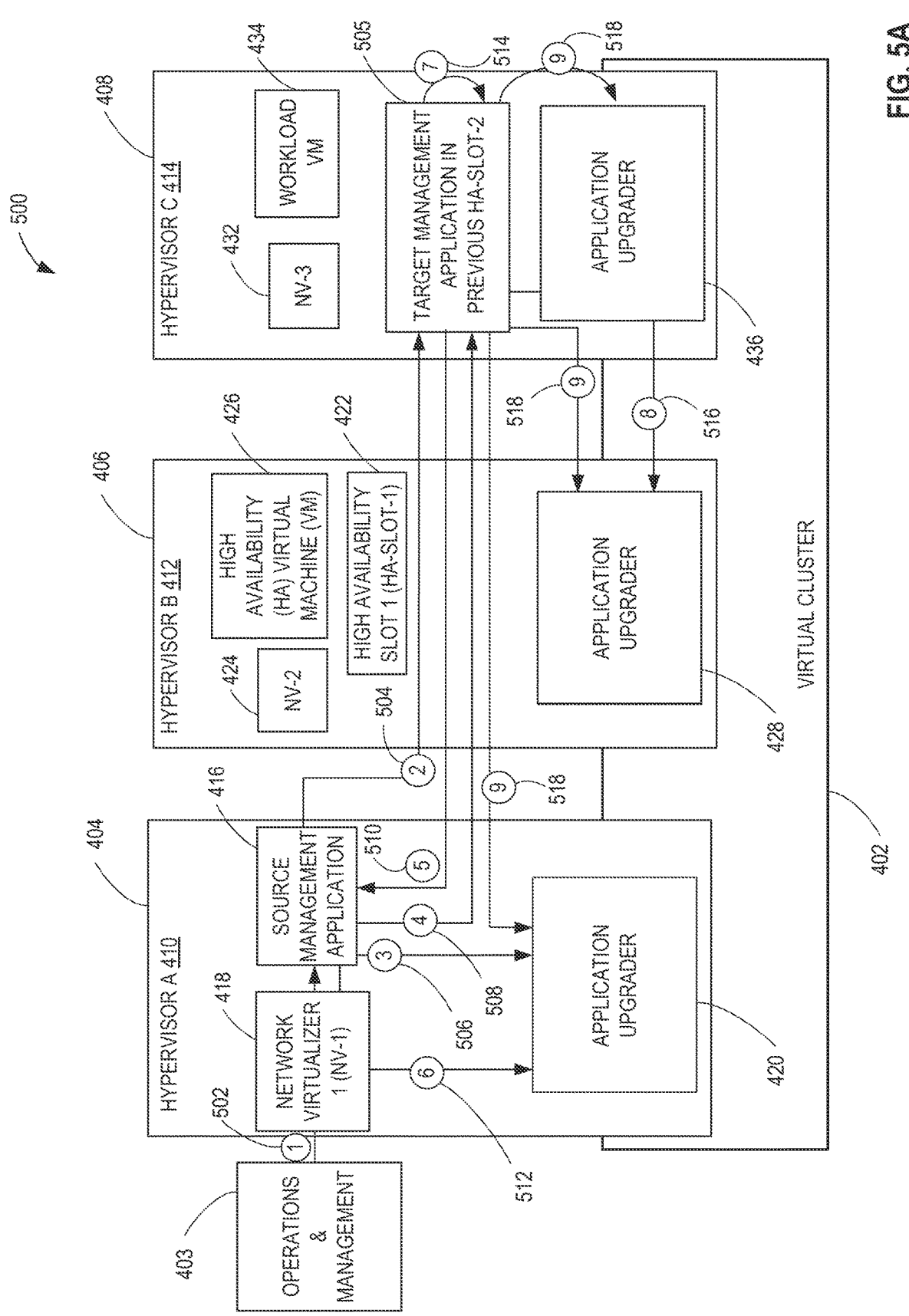
FIG. 5A is a first example workflow corresponding to example operations of the example three node cluster of FIG. 4A.

FIG. 5A is a first example workflow 500 corresponding to example operation of the cluster 402 of FIG. 4A. During a first example operation 502, the operations and management layer 403 initiates, initializes, triggers, and/or otherwise invokes a migration-based upgrade of a HA application, such as the source management application 416. For example, a user, a computing device associated with the user, etc., may generate and transmit a command through the first network virtualizer 418 to the source management application 416. In some such examples, the command can indicate and/or otherwise instruct the source management application 416 to begin a migration-based upgrade of the source management application 416 from a first version to a second version. In some examples, the resource identification circuitry 310 may receive the command and initiate the migration-based upgrade based on the command.

During a second example operation 504, the source management application 416 deploys an example target management application 505 in the HA-SLOT-2 430 of FIG. 4A. For example, the target management application 505 can be an upgraded or newer version of the source management application 416. In some such examples, the source management application 416 may be an application having a first version and the target management application 505 may be the application having a second version, which may be newer than the first version.

Prior to the second operation 504, the HA-SLOT-2 430 may be utilized to failover the source management application 416 from the first node 404 to the third node 408. During the second operation 504, the source management application 416 may identify a first protections state of the source management application 416 as protected and a second protection state of the target management application 505 as unprotected. In some examples, the resource deployment circuitry 320 may deploy the target management application 505 in the HA-SLOT-2 430. In some examples, the topology handler circuitry 330 may identify a first protections state of the source management application 416 as protected and a second protection state of the target management application 505 as unprotected.

During a third example operation 506, the source management application 416 stores migration data in the first application upgrader 420. For example, the source management application 416 may store migration data including the first protection state and the second protection state in the first application upgrader 420. In some such examples, the source management application 416 may store migration data including a preemption pair of the source management application 416 and the target management application 505 in the first application upgrader 420. In some examples, the topology handler circuitry 330 may store the first protection state and the second protection state in the datastore 370 as the protection states 372. In some such examples, the topology handler circuitry 330 may store migration data including a preemption pair of the source management application 416 and the target management application 505 in the first application upgrader 420 as the preemption data 374.

During a fourth example operation 508, the target management application 505 triggers a synchronization of data from the source management application 416. For example, the target management application 505 may alert the source management application 416 that the target management application 505 is instantiated and ready to receive a transfer of application data from the source management application 416. In some examples, the data synchronization circuitry 340 may trigger a transfer of data from the source management application 416 to the target management application 505.

During a fifth example operation 510, the target management application 505 triggers a shutdown sequence of the source management application 416. In some examples, the triggering of the shutdown sequence of the source management application 416 may implement an atomic switchover point at which the target management application 505 becomes the management application in charge of managing the cluster 402. For example, the atomic switchover point may be a time during the first workflow 500 at which the protection states of the source management application 416 and the target management application 505 are changed to identify the transition of control of the cluster 402 from the source management application 416 to the target management application 505. In the illustrated example, in response to a successful transfer of application data from the source management application 416 to the target management application 505, the target management application 505 may instruct the source management application 416 to shutdown and release its resources (e.g., hardware, software, and/or firmware resources, physical and/or virtual resources, etc.) for other computational purposes. In some examples, the resource decommission circuitry 350 may trigger the shutdown sequence of the source management application 416.

During a sixth example operation 512, the source management application 416 updates the migration data stored by the first application upgrader 420. For example, the source management application 416 may update the first protection state of the source management application 416 to unprotected and the second protection state of the target management application 505 to protected. In some examples, the topology handler circuitry 330 may update the migration data in the datastore 370.

During a seventh example operation 514, the target management application 505 completes the migration-based upgrade. For example, the target management application 505 may update the migration data stored in the third application upgrader 436. In some such examples, the target management application 505 may update the first protection state of the source management application 416 to unprotected and the second protection state of the target management application 505 to protected. In some examples, the topology handler circuitry 330 may update at least one of the protection states 372, the preemption data 374, the priority dependencies 376, or the failover rules 378 in the datastore 370.

During an eighth example operation 516, the target management application 505 may trigger a cleanup operation of migration-based upgrade data to indicate an end to the migration-based upgrade. For example, the target management application 505 may delete extraneous information associated with the migration-based upgrade stored by the second application upgrader 428. In some examples, the data synchronization circuitry 340 may execute the cleanup operation of the migration-based upgrade data.

During a ninth example operation 518, the target management application 505 synchronizes data across the first application upgrader 420, the second application upgrader 428, and the third application upgrader 436. For example, the target management application 505 may push migration data stored in the third application upgrader 436 to at least one of the first application upgrader 420 or the second application upgrader 428. In some examples, the data synchronization circuitry 340 may transmit update(s) to at least one of the protection states 372, the preemption data 374, the priority dependencies 376, or the failover rules 378 based on the completion of the migration-based upgrade of the HA application from the first version to the second version. In some such examples, the topology handler circuitry 330 may push updates to at least one of the protection states 372, the preemption data 374, the priority dependencies 376, or the failover rules 378 in the datastore 370 to one or more different datastores to synchronize the migration data stored by the datastore 370 and the one or more different datastores. In response to completion of the ninth operation 518, the first workflow 500 concludes. In some examples, in response to another command from the operations and management layer 403, the first workflow 500 may be re-executed to update another HA application in the cluster 402.

Figure 5B:
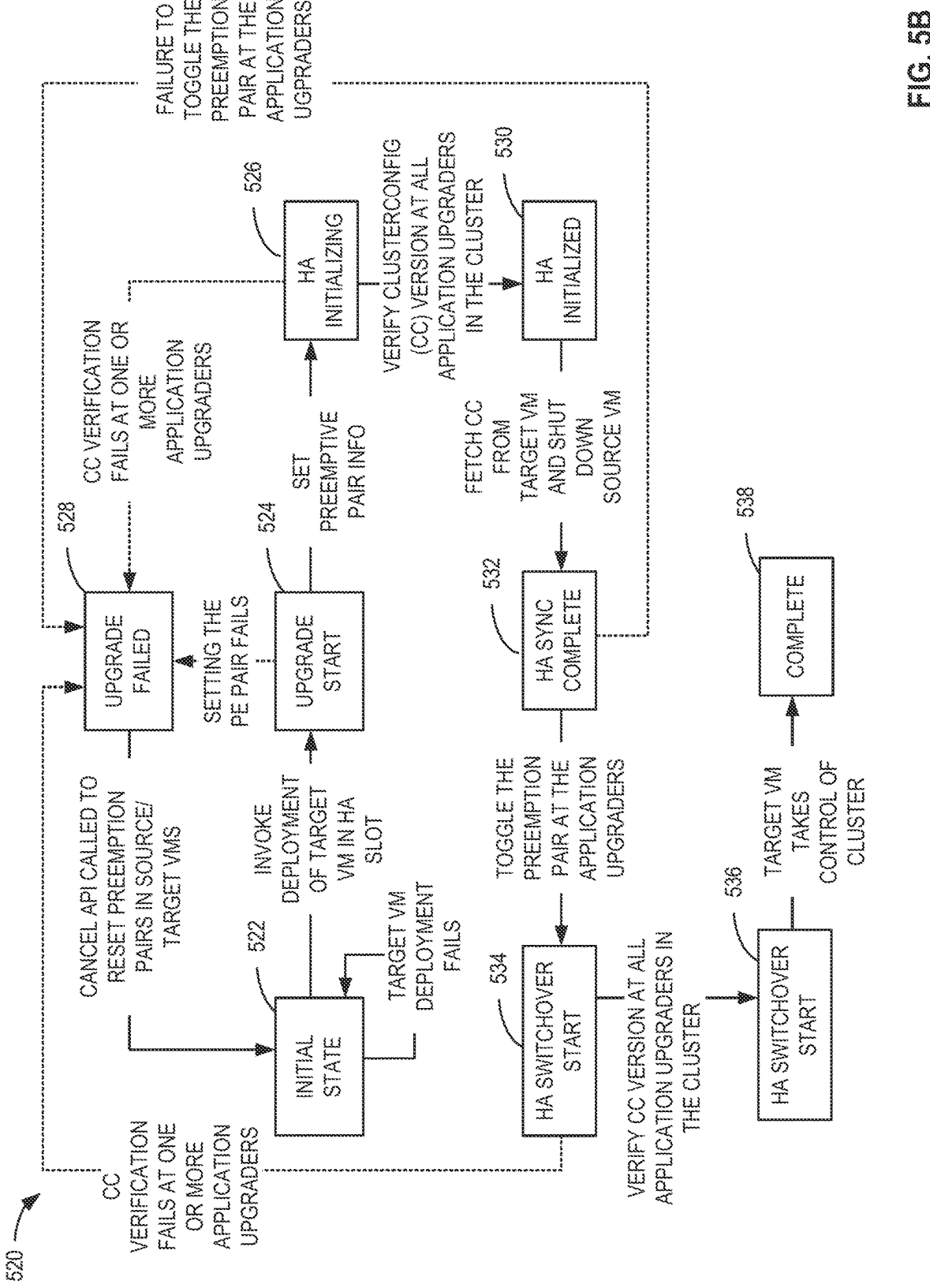
FIG. 5B is a second example workflow to effectuate an example upgrade.

FIG. 5B is a second example workflow 520 to effectuate an example upgrade. In some examples, the second workflow 520 can be representative of a state machine that can be executed, instantiated, and/or otherwise implemented by the application upgrader 214 of FIG. 2, the application upgrader circuitry 300 of FIG. 3, one(s) of the application upgraders 420, 428, 436 of FIG. 4A, the source management application 416 of FIGS. 4B and/or 4C, and/or the source management application 416 of FIG. 5A.

The second example workflow 520 begins at an initial state 522. For example, the source management application 416 can invoke deployment of a target VM in an HA slot to transition to an example upgrade start state 524. In some examples, the second workflow 520 can remain at the initial state 522 in response to the target VM deployment failing. At the upgrade start state 524, the source management application 416 can transition to an example HA initializing state 526 by setting the preemptive pair information, such as associating the source VM and the target VM as a preemptive pair with the source VM as a protected VM and the target VM as a nonprotected VM. Alternatively, the second workflow 520 can transition to an example upgrade failed state 528 if setting the PE pair fails. The second example workflow 520 from the upgrade failed state 528 to the initial state 522 via a cancel API call that resets the preemption pair in the source and/or target VMs.

At the HA initializing state 526, the second workflow 520 can proceed to an example HA initialized state 530 by verifying the cluster configuration version at all application upgraders in the cluster. For example, the source management application 416 can verify whether the second version of the configuration 450 in FIG. 4B has been distributed to the application upgraders 446A, 448A, 448B in the first cluster 442. Alternatively, the second workflow 520 can transition to the upgrade failed state 528 if the verification fails.

At the HA initialized state 530, the second workflow 520 can proceed to an example HA sync complete state 532 by fetching the cluster configuration from the target VM and shutting down the source VM. The second example workflow 520 can transition to the upgrade failed state 528 if a failure to toggle the preemption pair at the application upgraders 446A, 448A, 448B occurs.

At the HA sync complete state 532, the second workflow 520 can proceed to an example HA switchover start state 534 by toggling the preemption pair at the application upgraders 446A, 448A, 448B. For example, the preemption pair can be changed at the application upgraders 446A, 448A, 448B to set forth the source VM as a nonprotected VM and the target VM as a protected VM. The second example workflow 520 can transition to the upgrade failed state 528 if the verification of the preemption pair data fails.

At the HA switchover start state 534, the second workflow 520 can proceed to an example HA switchover complete state 536 by verifying the preemption pair data of the cluster configuration. At the HA complete state 536, the second workflow 520 can proceed to an example complete state 538 by instructing the target VM to take control of the cluster and execute one or more applications, workloads, computing tasks, etc.

Figure 5C:
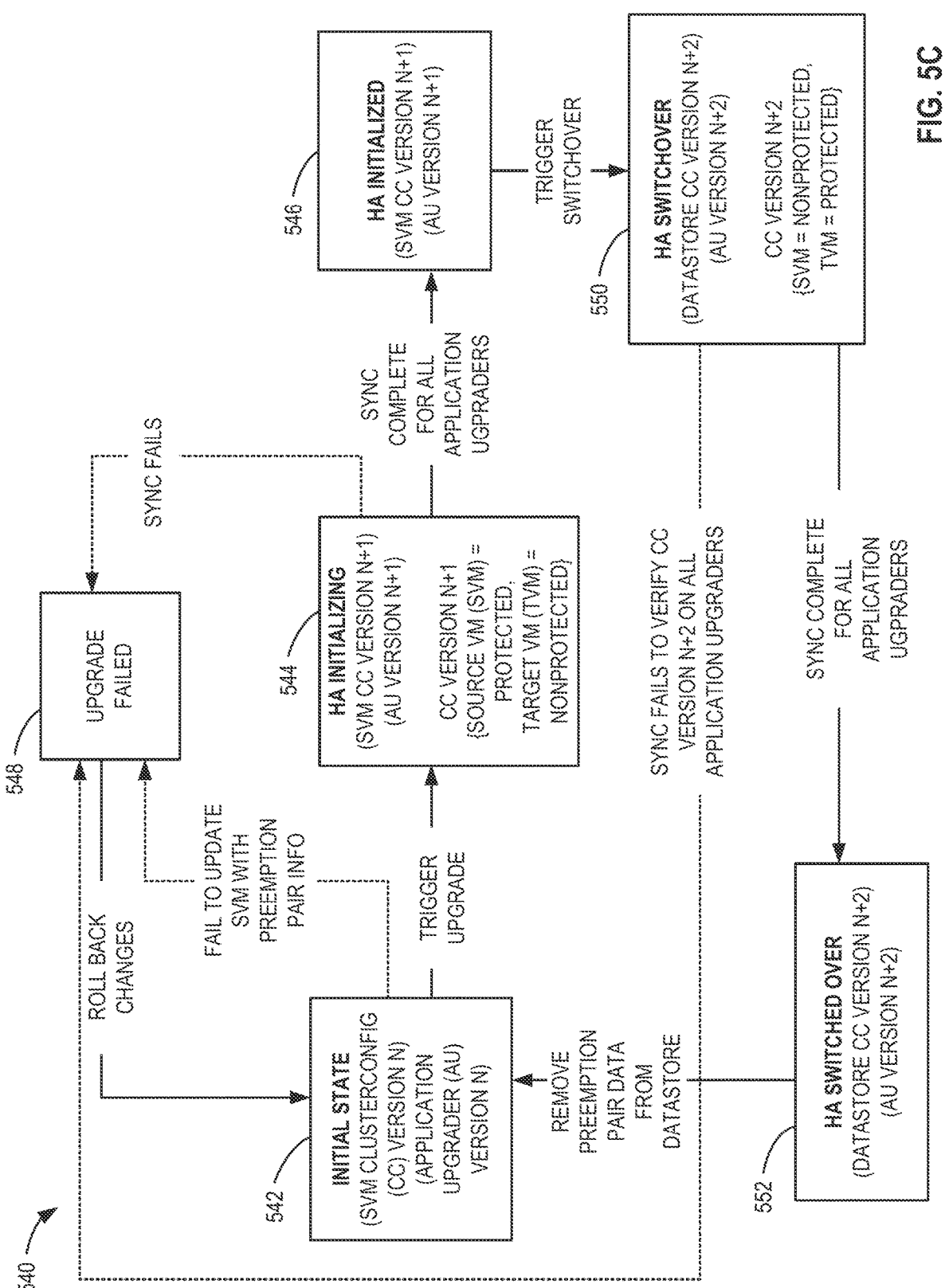
FIG. 5C is a third example workflow to effectuate an example upgrade.

FIG. 5C is a third example workflow 540 to effectuate an example upgrade. For example, the third workflow 540 can be utilized to implement an upgrade of an HA application from a source VM to a target VM based on changing versions of a cluster configuration (CC). In some examples, the cluster configuration can include data representative of the protection states 372, the preemption data 374, the priority dependencies 376, and/or the failover rules 378 of FIG. 3. In some examples, the third workflow 540 can be representative of a state machine that can be executed, instantiated, and/or otherwise implemented by the application upgrader 214 of FIG. 2, the application upgrader circuitry 300 of FIG. 3, one(s) of the application upgraders 420, 428, 436 of FIG. 4A, the source management application 416 of FIGS. 4B and/or 4C, and/or one(s) of the source management application 416 of FIG. 5A.

The third workflow 540 begins at an example initial state 542 at which the cluster configuration stored in a source VM, such as a VM that instantiates the source management application 416 of FIG. 4A, and stored in an application upgrader, such as the third application upgrader 436 of FIG. 4A, is version N. As used herein, version N means a specified version of the configuration data. For example, version N include data representative of the source VM having a protected VM state. The third workflow 540 transitions from the initial state 542 to an example HA initializing state 544 by triggering an upgrade (e.g., an upgrade of an application from a first version to a second version). For example, the upgrade can include pushing version N+1 of the cluster configuration to the source VM and the application upgraders. In some examples, version N+1 can include data representative of the source VM having a protected VM state and the target VM having a nonprotected VM state.

The third workflow 540 moves from the HA initializing state 544 to an example HA initialized state 546 by synchronizing the cluster configurations amongst the application upgraders (e.g., the application upgraders 420, 428, 436 of FIG. 4A). Alternatively, the third workflow 540 can move to an example upgrade failed state 548 if the cluster configuration synchronization fails. For example, the cluster configuration synchronization can fail if a network partition is present in the virtualized environment. The third example workflow 540 can proceed from the upgrade failed state 548 back to the initial state 542 to roll back any changes.

The third workflow 540 can proceed from the HA initialized state 546 to an example HA switchover state 550 by triggering a switchover. At the example HA switchover state 550, a new version (identified by VERSION N+2) of the cluster configuration is distributed to the application upgraders and to a persistent datastore in the virtualized environment. For example, the new version of the cluster configuration can include data representative of the source VM having a nonprotected state and the target VM having a protected state.

The third workflow 540 can proceed from the HA switchover state 550 to an example HA switched over state 552 by ensuring that all of the application upgraders are synchronized in having the cluster configuration version of N+2. Alternatively, the third example workflow 540 can proceed from the HA switchover state 550 to the upgrade failed state 548 if the synchronization fails.

The third example workflow 540 can transition from the HA switched over state 552 to the initial state 542 by removing protected pair data from the persistent datastore. For example, the source VM can be shut down and thereby its protection state may not need to be stored.

Figure 5D:
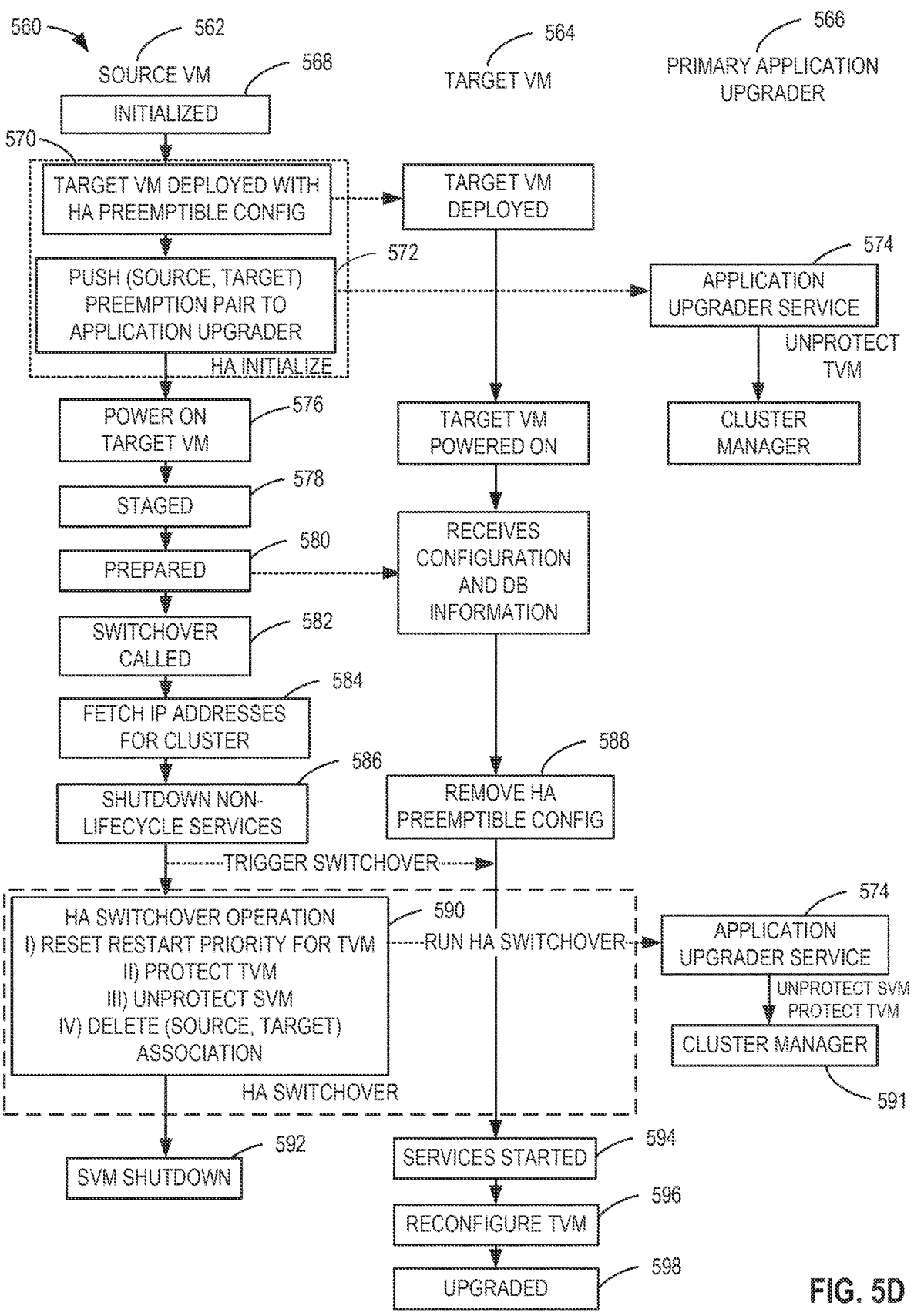
FIG. 5D is a fourth example workflow to effectuate an example upgrade.

FIG. 5D is a fourth example workflow 560 to effectuate an example upgrade. For example, the fourth workflow 560 can be utilized to implement an upgrade of an HA application from a source VM to a target VM. In some examples, the fourth workflow 560 can be representative of a state machine that can be executed, instantiated, and/or otherwise implemented by the application upgrader 214 of FIG. 2, the application upgrader circuitry 300 of FIG. 3, one(s) of the application upgraders 420, 428, 436 of FIG. 4A, the source management application 416 of FIGS. 4B and/or 4C, and/or the source management application 416 of FIG. 5A.

The fourth workflow 560 includes an example source VM 562, an example target VM 564, and an example primary application upgrader 566. For example, the source VM 562 can correspond to a VM that instantiates the source management application 416 of FIGS. 4A and/or 5A. In some examples, the target VM 564 can correspond to a VM that instantiates the target management application in previous HA-SLOT-2 of FIG. 5A. In some examples, the primary application upgrader 566 can correspond to the first application upgrader 420 of FIGS. 4A and/or 5A.

At a first example operation 568, the source VM 562 is initialized. At a second example operation 570 of an HA initialize state, the source VM 562 deploys the target VM 564. For example, the source management application 416 can deploy and/or otherwise instantiate the target management application in the HA-SLOT-2 430 of FIG. 4A.

At a third example operation 572 of the HA initialize state, the source VM 562 pushes a preemption pair to an application upgrader service 574 of the primary application upgrader 566. The preemption pair can include data representative of the source VM 562 as a protected VM and the target VM 564 as nonprotected VM (and thereby the target VM 564 is unprotected).

At a fourth example operation 576, the source VM 562 powers on the target VM 564. At a fifth example operation 578, the source VM 562 stages a configuration of the target VM 564. At a sixth example operation 580, the source VM 562 prepares the target VM 564 by transmitting configuration information (e.g., VM configuration information, application configuration information, etc.) and database (DB) information.

At a seventh example operation 582, the source VM 562 calls a switchover for the target VM 564 to execute the application in place of the source VM 562. At an eighth example operation 584, the source VM 562 fetches IP addresses for VMs of the cluster, such as the IP address of the target VM 564 and/or other VMs to facilitate the execution of the application by the target VM 564. At a ninth example operation 586, the source VM 562 shuts down non-lifecycle services executed and/or instantiated by the source VM 562.

At a tenth example operation 588, the target VM 564 removes the HA preemptible configuration from the target VM 564 and/or elsewhere from a virtualized environment that includes the target VM 564. At an eleventh example operation 590, the source VM 562 executes an HA switchover operation by resetting a restart priority for the target VM 564, protecting the target VM 564 (e.g., by enforcing the protected VM protection state for the target VM 564), unprotecting the source VM 562 (e.g., by enforcing the nonprotected VM protection state for the source VM 562), and by deleting the data association between the source VM 562 and the target VM 564. For example, the source VM 562 can trigger the application upgrader service 574 to inform a cluster manager 591 to unprotect the source VM 562 and protect the target VM 564.

At a twelfth example operation 592, the source VM 562 shuts down and/or otherwise is decommissioned or ceases operation. At a thirteenth example operation 594, the target VM 564 starts services, such as resuming execution of the application previously executed by the source VM 562. At a fourteenth example operation 596, the target VM 564 reconfigures itself to support the started services. At a fifteenth operation 598, the migration-based upgrade of the application is complete.

FIG. 6 is an illustration of a first example datastore 602, a second example datastore 604, and a third example datastore 606. In some examples, the first datastore 602, the second datastore 604, and/or the third datastore 606 may be an example implementation of the datastore 370 of FIG. 3. For example, the protection states included in the first datastore 602, the second datastore 604, and/or the third datastore 606 may be example implementation(s) of the protection states 372 of FIG. 3. In some examples, the preemption data included in the first datastore 602, the second datastore 604, and/or the third datastore 606 may be example implementation(s) of the preemption data 374 of FIG. 3. In some examples, the priority dependencies included in the first datastore 602, the second datastore 604, and/or the third datastore 606 may be example implementation(s) of the priority dependencies 376 of FIG. 3. In some examples, the failover rules included in the first datastore 602, the second datastore 604, and/or the third datastore 606 may be example implementation(s) of the failover rules 378 of FIG. 3.

The first datastore 602 of the illustrated example may implement a datastore before an upgrade trigger (e.g., a trigger of a migration-based upgrade) is generated. For example, the first datastore 602 may be representative of data stored in at least one of the first application upgrader 420, the second application upgrader 428, or the third application upgrader 436 prior to the first operation 502 of FIG. 5A. In some such examples, prior to the first operation 502, the protection state of a source VM, which may execute the source management application 416, is protected and the protection state of the workload VM 434 is unprotected. In the illustrated example, the priority dependencies identify that the source VM is to be started (or restarted) prior to the HA VM 426, and the HA VM 426 is to be started (or restarted) prior to the workload VM 434. In the illustrated example, the failover rules indicate that in response to a failure of the source VM, the source management application 416 is to be restarted on a VM in the HA-2-SLOT 430.

The second datastore 604 of the illustrated example may implement a datastore after the upgrade trigger is generated and before an atomic switchover event. For example, the second datastore 604 may be representative of data stored in at least one of the first application upgrader 420, the second application upgrader 428, or the third application upgrader 436 prior to the fifth operation 510 of FIG. 5A. In some such examples, after the first operation 502 and prior to the fifth operation 510, the protection state of the source VM and the HA VM 426 is protected and the protection state of a target VM, which may be instantiated in the HA-SLOT-2 430 to implement the target management application 505 of FIG. 5A, is unprotected. In the illustrated example, the preemption data includes a preemption pair of the source VM and the target VM. In the illustrated example, the priority dependencies identify that the source VM is to be started (or restarted) prior to the HA VM 426, and the HA VM is to be started (or restarted) prior to the workload VM 434.

In the illustrated example, the failover rules indicate that in response to a failure (e.g., a failure during a migration-based upgrade) of the source VM, a determination is to be made whether the target management application 505 on the target VM is powered off or on. For example, the fault management circuitry 360 may failover the source VM to the target VM in response to a determination that the target management application 505 is powered off and/or otherwise has not been instantiated. In some examples, the fault management circuitry 360 may terminate the target management application 505 to free up resources to failover the source VM to the target VM in response to a determination that the target management application 505 is powered on and/or otherwise instantiated. In some examples, the fault management circuitry 360 may allow the target VM to fail in response to an identification of the protection state of the target VM as unprotected.

In the illustrated example, the fault management circuitry 360 may execute failover operations in response to a failure (e.g., a failure during a migration-based upgrade) of the HA VM 426 based on the failover rules in the second datastore 604. For example, in response to the failure of the HA VM 426, the fault management circuitry 360 may invoke the resource identification circuitry 310 to identify available resources for the failover of the HA VM 426. In some such examples, in response to a determination that there are insufficient available resources for the failover of the HA VM 426, the fault management circuitry 360 may instruct the resource decommission circuitry 350 to decommission the target VM to free resources for the failover of the HA VM 426 because the target VM is unprotected.

In the illustrated example, the fault management circuitry 360 may execute failover operations in response to a failure (e.g., a failure during a migration-based upgrade) of the workload VM 434 based on the failover rules in the second datastore 604. For example, in response to the failure of the workload VM 434, the fault management circuitry 360 may invoke the resource identification circuitry 310 to identify available resources for the failover of the workload VM 434. In some such examples, in response to a determination that there are insufficient available resources for the failover of the workload VM 434, the fault management circuitry 360 may instruct the resource deployment circuitry 320 to add resources to the cluster 402 to effectuate the failover of the workload VM 434.

The third datastore 606 of the illustrated example may implement a datastore after the upgrade trigger is generated and after the atomic switchover event. For example, the third datastore 606 may be representative of data stored in at least one of the first application upgrader 420, the second application upgrader 428, or the third application upgrader 436 after the fifth operation 510 of FIG. 5A. In some such examples, after the fifth operation 510, the protection state of the target VM and the HA VM 426 is protected and the protection state of the source VM is unprotected. In the illustrated example, the preemption data includes an update to the preemption pair of the second datastore 604 by switching the placements of the source VM and the target VM to indicate that the source VM is unprotected and the target VM is protected. In the illustrated example, the priority dependencies identify that the target VM is to be started (or restarted) prior to the HA VM 426, and the HA VM is to be started (or restarted) prior to the workload VM 434.

In the illustrated example, the failover rules indicate that in response to a failure (e.g., a failure during a migration-based upgrade) of the source VM, the fault management circuitry 360 may allow the source VM to fail in response to an identification of the protection state of the source VM as unprotected.

In the illustrated example, the fault management circuitry 360 may execute failover operations in response to a failure (e.g., a failure during a migration-based upgrade) of the target VM based on the failover rules in the third datastore 606. For example, in response to a failure of the target VM, the fault management circuitry 360 may attempt to restart the target VM and, if not successful, may failover the target VM to the source VM because the source VM is unprotected.

In the illustrated example, the fault management circuitry 360 may execute failover operations in response to a failure (e.g., a failure during a migration-based upgrade) of the HA VM 426 based on the failover rules in the third datastore 606. For example, in response to the failure of the HA VM 426, the fault management circuitry 360 may invoke the resource identification circuitry 310 to identify available resources for the failover of the HA VM 426. In some such examples, in response to a determination that there are insufficient available resources for the failover of the HA VM 426, the fault management circuitry 360 may instruct the resource decommission circuitry 350 to decommission the source VM to free resources for the failover of the HA VM 426 because the source VM is unprotected.

In the illustrated example, the fault management circuitry 360 may execute failover operations in response to a failure (e.g., a failure during a migration-based upgrade) of the workload VM 434 based on the failover rules in the second datastore 604. For example, in response to the failure of the workload VM 434, the fault management circuitry 360 may invoke the resource identification circuitry 310 to identify available resources for the failover of the workload VM 434. In some such examples, in response to a determination that there are insufficient available resources for the failover of the workload VM 434, the fault management circuitry 360 may instruct the resource deployment circuitry 320 to add resources to the cluster 402 to effectuate the failover of the workload VM 434.

Flowcharts representative of example machine readable instructions, which may be executed to configure processor circuitry to implement the application upgrader 214 of FIG. 2, the application upgrader circuitry 300 of FIG. 3, the first application upgrader 420 of FIGS. 4A and/or 5A, the second application upgrader 428 of FIGS. 4A and/or 5A, and/or the third application upgrader 436 of FIGS. 4A and/or 5A are shown in FIGS. 7A-13. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, an HDD, an SSD, a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7A-13, many other methods of implementing the application upgrader 214 of FIG. 2, the application upgrader circuitry 300 of FIG. 3, the first application upgrader 420 of FIGS. 4A and/or 5A, the second application upgrader 428 of FIGS. 4A and/or 5A, and/or the third application upgrader 436 of FIGS. 4A and/or 5A may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7A-13 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7A is a flowchart representative of example machine readable instructions and/or example operations 700 that may be executed and/or instantiated by processor circuitry to achieve high availability virtual resource migration. For example, the machine readable instructions and/or example operations 700 that may be executed and/or instantiated by processor circuitry to achieve high availability virtual resource migration of an application that is distributed in one or more VMs, one or more containers, etc., and/or combination(s) thereof. The machine readable instructions and/or the operations 700 of FIG. 7A begin at block 702, at which the application upgrader 214 identifies a high availability (HA) slot in a virtual server rack to facilitate a failover of an application executing on a first virtual machine (VM) in the virtual server rack, the first VM identified as a protected VM. For example, the resource identification circuitry 310 (FIG. 3) may identify a first VM (or a first container) operating in a HA mode configuration. In some such examples, the resource identification circuitry 310 may determine that the first VM is to execute the source management application 416. In some such examples, the resource identification circuitry 310 may determine that the HA-SLOT-2 430 of FIG. 4A is reserved to receive a failover of the first VM. Additionally or alternatively, the resource identification circuitry 310 may determine that the HA-SLOT-2 4230 is reserved to receive a failover of a container.

At block 704, the application upgrader 214 deploys a second VM in the HA slot. For example, the resource deployment circuitry 320 (FIG. 3) may instantiate a second VM (or a second container) in the HA-SLOT-2 and provision the target management application 505 to the second VM. In some such examples, the target management application 505 may be an upgraded or newer version of the source management application 416.

At block 706, the application upgrader 214 transfers data from the first VM to the second VM. For example, the data synchronization circuitry 340 (FIG. 3) may initiate a transfer of application data associated with the source management application 416 from the first VM to the target management application 505 on the second VM.

At block 708, in response to not identifying a failure of at least one of the first VM or the second VM during the transfer of data, the application upgrader 214 triggers a shutdown of the first VM. For example, the resource decommission circuitry (350) FIG. 3 may trigger a shutdown sequence of the first VM.

At block 710, the application upgrader 214 synchronizes migration data associated with the virtual server rack to identify the second VM as the protected VM. For example, the data synchronization circuitry 340 may change the first protection state of the first VM from protected to unprotected and the second protection state of the second VM from unprotected to protected. In some such examples, the data synchronization circuitry 340 may store the changes to the protection states 372 and/or the preemption data 374 in the datastore 370. In response to synchronizing the migration data associated with the virtual server rack to identify the second VM as the protected VM at block 710, the machine readable instructions and/or the operations 730 conclude.

Figure 7B:
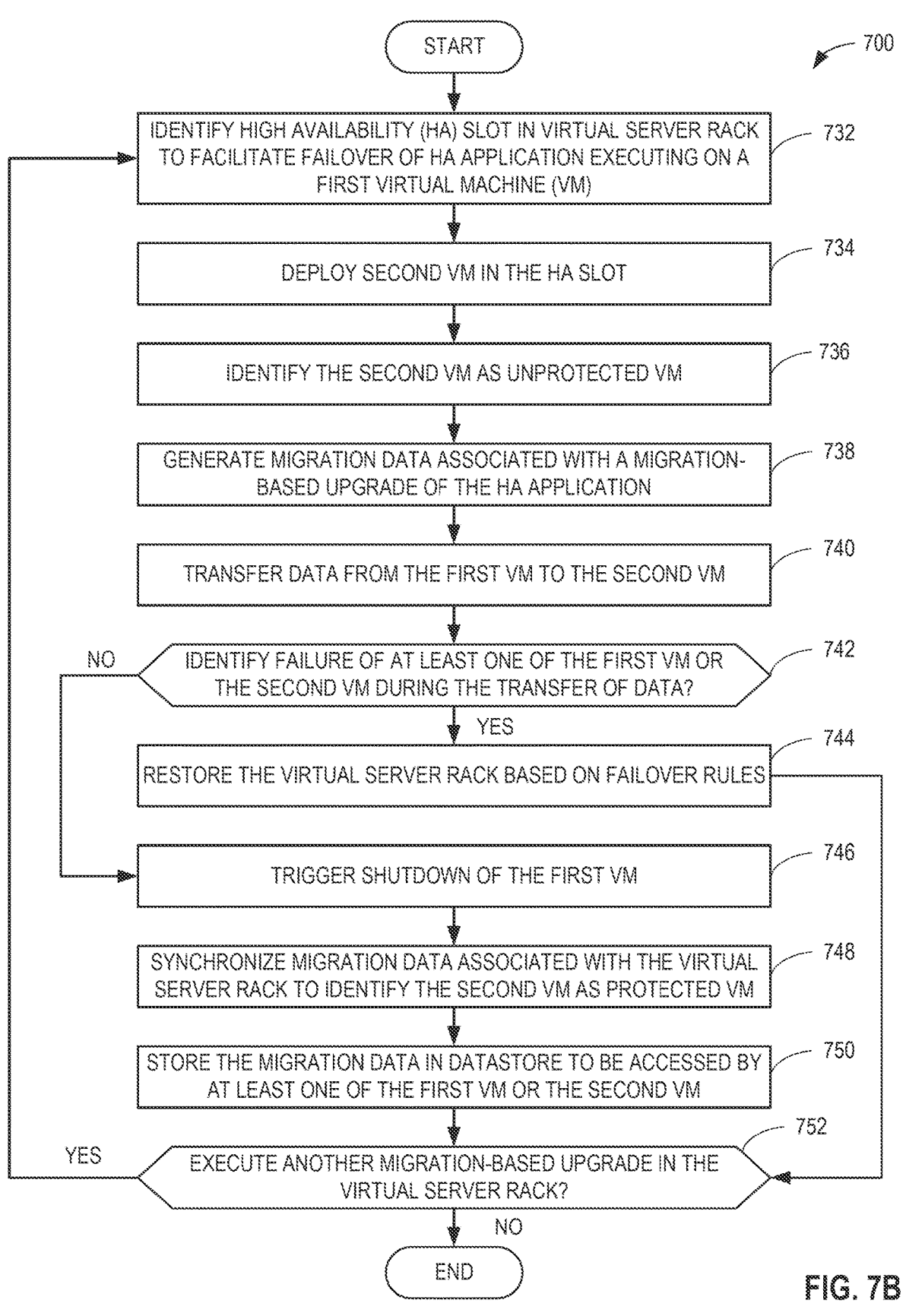
FIG. 7B is another flowchart representative of example machine readable instructions and/or example operations that may be executed and/or instantiated by example processor circuitry to achieve high availability virtual resource migration.

FIG. 7B is a flowchart representative of example machine readable instructions and/or example operations 730 that may be executed and/or instantiated by processor circuitry to achieve high availability virtual resource migration. For example, the machine readable instructions and/or example operations 730 that may be executed and/or instantiated by processor circuitry to achieve high availability virtual resource migration of an application that is distributed in one or more VMs, one or more containers, etc., and/or combination(s) thereof. The machine readable instructions and/or the operations 730 of FIG. 7B begin at block 732, at which the application upgrader 214 identifies a high availability (HA) slot in a virtual server rack to facilitate a failover of an application executing on a first virtual machine (VM). For example, the resource identification circuitry 310 (FIG. 3) may identify a first VM (or a first container) operating in a HA mode configuration. In some such examples, the resource identification circuitry 310 may determine that the first VM is to execute the source management application 416. In some such examples, the resource identification circuitry 310 may determine that the HA-SLOT-2 430 of FIG. 4A is reserved to receive a failover of the first VM. Additionally or alternatively, the resource identification circuitry 310 may determine that the HA-SLOT-2 4230 is reserved to receive a failover of a container.

At block 734, the application upgrader 214 deploys a second VM in the HA slot. For example, the resource deployment circuitry 320 (FIG. 3) may instantiate a second VM (or a second container) in the HA-SLOT-2 and provision the target management application 505 to the second VM. In some such examples, the target management application 505 may be an upgraded or newer version of the source management application 416.

At block 736, the application upgrader 214 identifies the second VM as an unprotected VM. For example, the topology handler circuitry 330 (FIG. 3) may identify a first protection state of the first VM as protected and a second protection state of the second VM as unprotected.

At block 738, the application upgrader 214 generates migration data associated with a migration-based upgrade of the HA application. For example, the topology handler circuitry 330 may generate the migration data associated with upgrading the source management application 416. In some such examples, the topology handler circuitry 330 may generate the migration data to include at least one of the protection states 372, the preemption data 374, the priority dependencies 376, or the failover rules 378. In some such examples, the topology handler circuitry 330 may store the migration data in the datastore 370 (FIG. 3).

At block 740, the application upgrader 214 transfers data from the first VM to the second VM. For example, the data synchronization circuitry 340 (FIG. 3) may initiate a transfer of application data associated with the source management application 416 from the first VM to the target management application 505 on the second VM.

At block 742, the application upgrader 214 identifies whether a failure of at least one of the first VM or the second VM during the transfer of data has occurred. For example, the fault management circuitry 360 (FIG. 3) may determine whether at least one of the first VM, the source management application 416, the second VM, or the target management application 505 has failed during the migration-based upgrade of the source management application 416.

If, at block 742, the application upgrader 214 identifies a failure of at least one of the first VM or the second VM during the transfer of data, then, at block 744, the application upgrader 214 restores the virtual server rack based on failover rules. For example, the fault management circuitry 360 may terminate the target management application 505 based on the failover rules 378 (FIG. 3). In some such examples, the fault management circuitry 360 may determine to terminate the target management application 505 based on the failover rules included in the second datastore 604 of FIG. 6. In some such examples, in response to the termination, the fault management circuitry 360 may failover the first VM to the second VM. For example, the fault management circuitry 360 may cause the source management application 416 to restart on the second VM. In response to restoring the virtual server rack based on the failover rules at block 744, control proceeds to block 752 to determine whether to continue monitoring the virtual server rack.

If, at block 742, the application upgrader 214 does not identify a failure of at least one of the first VM or the second VM during the transfer of data, control proceeds to block 746 to trigger a shutdown of the first VM. For example, the resource decommission circuitry (350) FIG. 3 may trigger a shutdown sequence of the first VM.

At block 748, the application upgrader 214 synchronizes migration data associated with the virtual server rack to identify the second VM as a protected VM. For example, the data synchronization circuitry 340 may change the first protection state of the first VM from protected to unprotected and the second protection state of the second VM from unprotected to protected. In some such examples, the data synchronization circuitry 340 may store the changes to the protection states 372 and/or the preemption data 374 in the datastore 370.

At block 750, the application upgrader 214 stores the migration data in a datastore to be accessed by at least one of the first VM or the second VM. For example, the data synchronization circuitry 340 may store the changes to the protection states 372 and/or the preemption data 374 in the datastore 370. In some examples, the data synchronization circuitry 340 may store the changes to the protection states 372 and/or the preemption data 374 in a first datastore of the first application upgrader 420, a second datastore of the second application upgrader 428, a third datastore of the third application upgrader 436, or any other datastore to which the first VM and/or the second VM have access.

At block 752, the application upgrader 214 determines whether to execute another migration-based upgrade in the virtual server rack. For example, the resource identification circuitry 310 may determine that another migration-based upgrade is to be executed based on a command, an instruction, etc., obtained from an operations and management layer, such as the operations and management layer 206 of FIG. 2, the operations and management layer 403 of FIGS. 4A and/or 5A, etc.

If, at block 752, the application upgrader 214 determines to execute another migration-based upgrade in the virtual server rack, control returns to block 732, otherwise the machine readable instructions and/or the operations 730 conclude.

Figure 8:
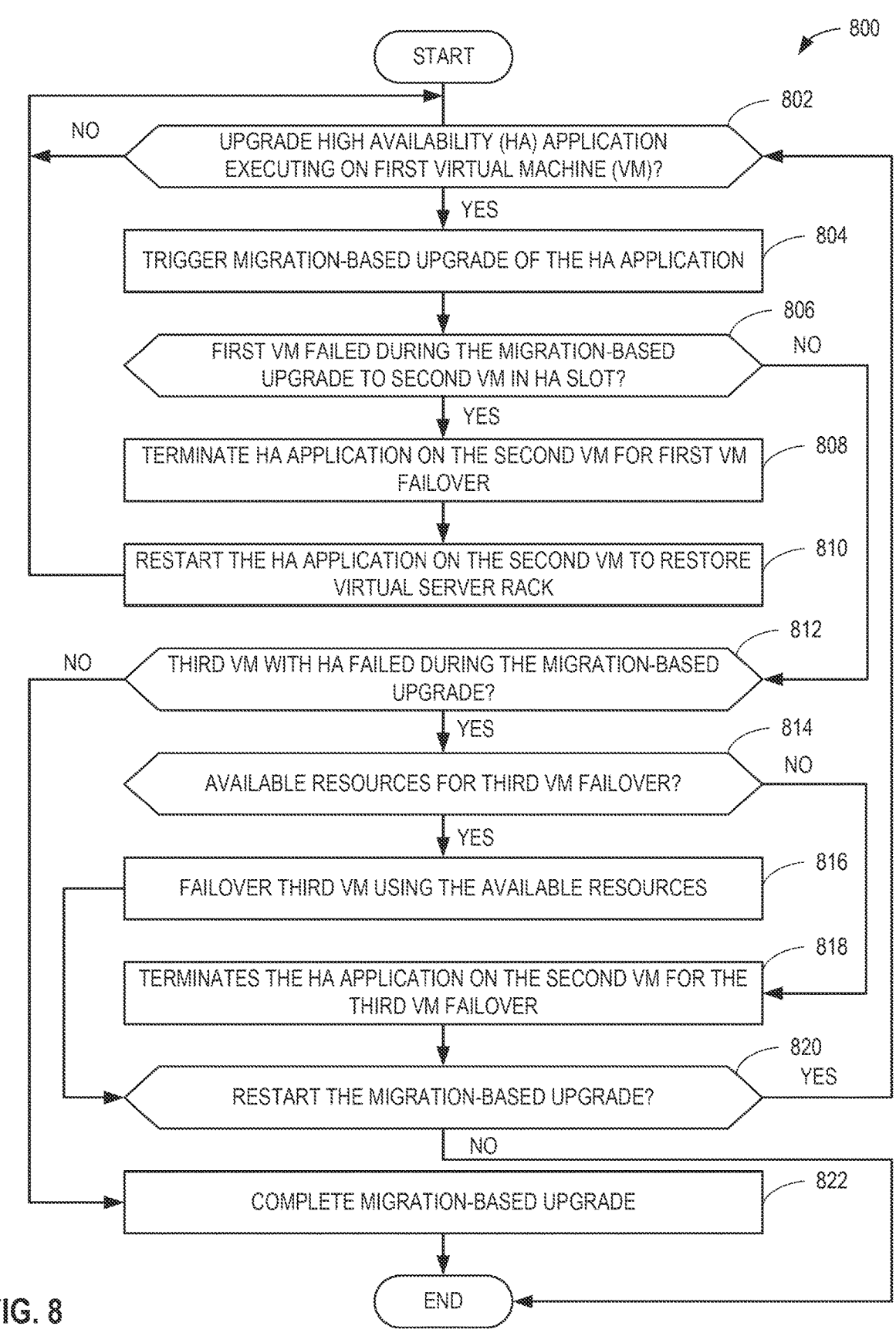
FIG. 8 is a flowchart representative of example machine readable instructions and/or example operations that may be executed and/or instantiated by example processor circuitry to high availability virtual resource migration based on example failover rules.

FIG. 8 is a flowchart representative of example machine readable instructions and/or example operations 800 that may be executed and/or instantiated by processor circuitry to achieve high availability virtual resource migration based on example failover rules. The machine readable instructions and/or the operations 800 of FIG. 8 begin at block 802, at which the application upgrader 214 determines whether to upgrade a high availability (HA) application executing on a first virtual machine (VM). For example, the resource identification circuitry 310 (FIG. 3) may obtain a command from the operations and management layer 206 of FIG. 2, the operations and management layer 403 of FIGS. 4A and/or 5A, etc. In some such examples, the resource identification circuitry 310 may determine that the command is to invoke and/or otherwise set in motion a migration-based upgrade of an HA application executing on a first VM or a first container, such as the source management application 416 of FIG. 4A executing on a first VM of the first hypervisor 410.

If, at block 802, the application upgrader 214 determines not to upgrade the HA application executing on the first VM, control waits until an indication to upgrade the HA application is received. If, at block 802, the application upgrader 214 determines to upgrade the HA application executing on the first VM, then, at block 804, the application upgrader 214 triggers a migration-based upgrade of the HA application. For example, the resource deployment circuitry 320 (FIG. 3) may trigger the migration-based upgrade of the source management application 416 by instantiating a second VM or a second container in the HA-SLOT-2 430. In some such examples, the resource deployment circuitry 320 may instantiate the target management application 505, which may be an upgraded version of the source management application 416.

At block 806, the application upgrader 214 determines whether the first VM failed during the migration-based upgrade to a second VM in an HA slot. For example, the fault management circuitry 360 (FIG. 3) may determine that at least one of the first VM or the source management application 416 failed during the migration-based upgrade.

If, at block 806, the application upgrader 214 determines that the first VM did not fail during the migration-based upgrade to the second VM in the HA slot, control proceeds to block 812 to determine whether a third VM with HA failed during the migration-based upgrade. For example, in response to identifying a non-failure of the first VM during the migration-based upgrade to the second VM in the HA slot, control proceeds to block 812.

If, at block 806, the application upgrader 214 determines that the first VM failed during the migration-based upgrade to the second VM in the HA slot, then, at block 808, the application upgrader 214 terminates a HA application on the second VM for the first VM failover. For example, the fault management circuitry 360 may inspect and/or otherwise analyze the failover rules of the second datastore 604 of FIG. 6. In some such examples, the fault management circuitry 360 may determine based on the failover rules that the second VM is unprotected and thereby the target management application 505 instantiated on the second VM may be terminated.

At block 810, the application upgrader 214 restarts the HA application on the second VM to restore the virtual server rack. For example, in response to the termination, the fault management circuitry 360 may failover the first VM by restarting the source management application 416 on the second VM to restore the cluster 402, and/or, more generally, the virtual server rack 106 of FIGS. 1 and/or 2.

At block 812, the application upgrader 214 determines whether a third VM with HA failed during the migration-based upgrade. For example, the fault management circuitry 360 may determine that the HA VM 426 of FIG. 4A failed during the migration-based upgrade. In some such examples, the fault management circuitry 360 may determine that a virtual resource, such as the HA VM 426, failed because the virtual resource did not response to a ping, a request to execute a computing task, etc., failed to update a timer (e.g., a watch dog timer), etc., and/or a combination thereof.

If, at block 812, the application upgrader 214 determines that the third VM with HA did not fail during the migration-based upgrade, control proceeds to block 822 to complete the migration-based upgrade. For example, the data synchronization circuitry 340 (FIG. 3) may transfer the application data associated with the source management application 416 from the first VM to the second VM. In response to completing the migration-based upgrade at block 822, the example machine readable instructions and/or the example operations 800 conclude.

If, at block 812, the application upgrader 214 determines that the third VM with HA failed during the migration-based upgrade, then, at block 814, the application upgrader 214 determines whether there are available resources for the third VM failover. For example, the resource identification circuitry 310 may determine whether there is an HA slot associated with the HA VM 426. In some such examples, the resource identification circuitry 310 may identify that the HA-SLOT-1 422 is associated with the HA VM 426 and thereby determine that there are sufficient resources to facilitate the failover of the HA VM 426. In some examples, the resource identification circuitry 310 may determine whether the cluster 402 of FIG. 4A has sufficient resources that are not allocated to a workload domain that may be used to compose a VM to which the workload VM 434 may failover. For example, the resource identification circuitry 310 may determine whether the first cluster 402 has one or more resources available to failover an application executing on the workload VM 434.

If, at block 814, the application upgrader 214 determines that there are available resources for the third VM failover, then, at block 816, the application upgrader 214 failovers the third VM using the available resources. For example, the fault management circuitry 360 may failover the HA VM 426 to the HA-SLOT-1 422. In some examples, the resource deployment circuitry 320 may spin up a VM using available, non-allocated, etc., resources of the cluster 402. In some such examples, the fault management circuitry 360 may failover the HA VM 426 by restarting an application executed by the HA VM 426 on the newly spun up VM. In response to the failover of the third VM using the available resources at block 816, control proceeds to block 820 to determine whether to restart the migration-based upgrade.

If, at block 814, the application upgrader 214 determines that there are not available resources for the third VM failover, then, at block 818, the application upgrader 214 terminates the HA application on the second VM for the third VM failover. For example, the resource decommission circuitry 350 may terminate the target management application 505 in the HA-SLOT-2 430 because the second VM is unprotected. In some such examples, in response to the termination, the fault management circuitry 360 may restart the application, which is executing on the HA VM 426, on the second VM. In response to terminating the HA application on the second VM for the third VM failover at block 818, the application upgrader 214 determines whether to restart the migration-based upgrade at block 820. For example, the resource identification circuitry 310 may determine whether to restart the migration-based upgrade. In some such examples, the fault management circuitry 360 may transmit an alert to the operations and management layer 206, the operations and management layer 403, etc. In some such examples, the fault management circuitry 360 may generate the alert to indicate that the migration-based upgrade failed because one or more virtual resources failed. In some examples, in response to the transmission of the alert, the resource identification circuitry 310 may receive another command from the operations and management layer 206, the operations and management layer 403, etc., instructing the resource identification circuitry 310 to restart the migration-based upgrade.

If, at block 820, the application upgrader 214 determines to restart the migration-based upgrade, control returns to block 802 to upgrade the HA application executing on the first VM, otherwise the machine readable instructions and/or the operations 800 conclude.

Figure 9:
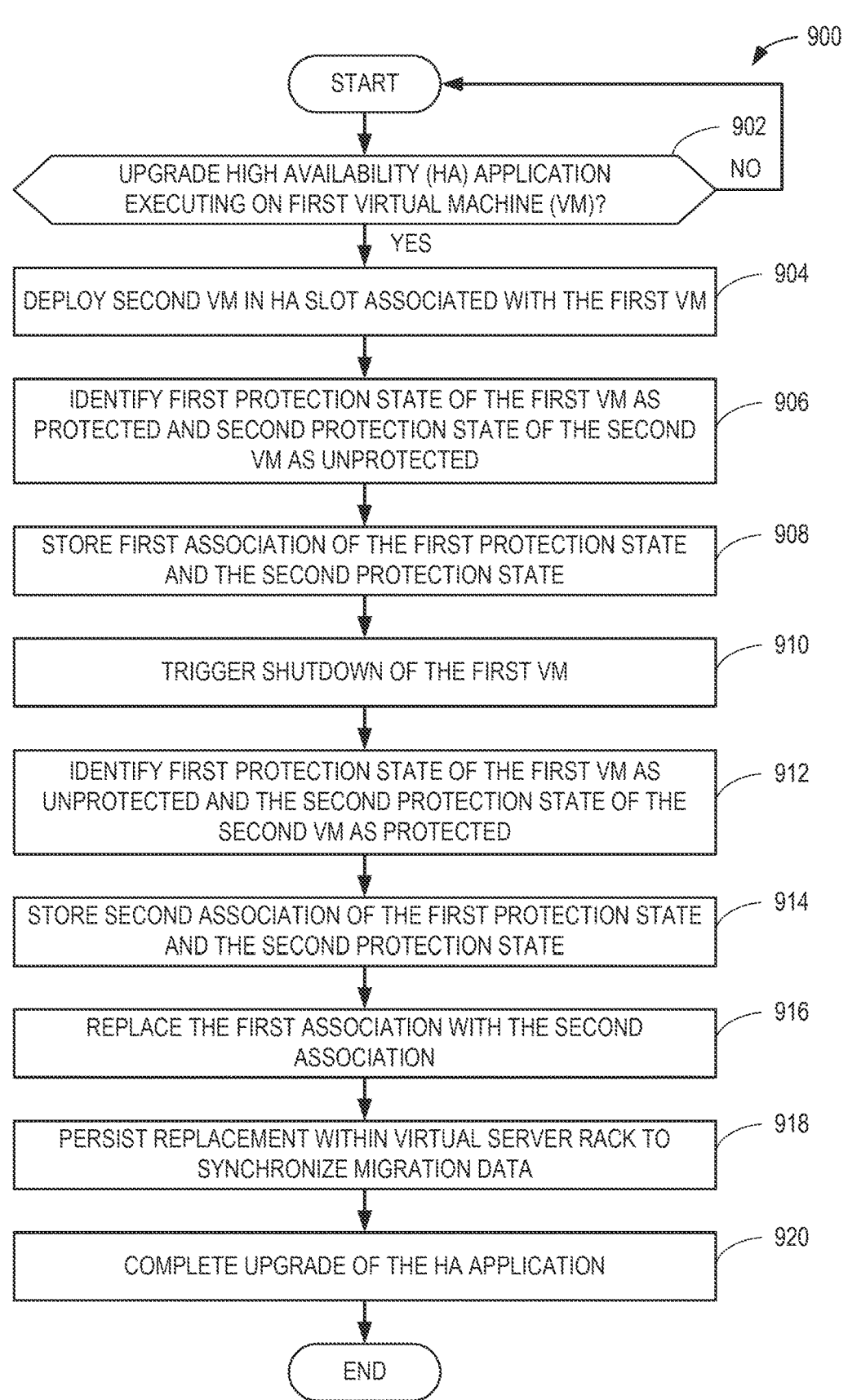
FIG. 9 is a flowchart representative of example machine readable instructions and/or example operations that may be executed and/or instantiated by example processor circuitry to synchronize migration data to achieve high availability virtual resource migration.

FIG. 9 is a flowchart representative of example machine readable instructions and/or example operations 900 that may be executed and/or instantiated by processor circuitry to synchronize migration data to achieve high availability virtual resource migration. The machine readable instructions and/or the operations 900 of FIG. 9 begin at block 902, at which the application upgrader 214 determines whether to upgrade a high availability (HA) application executing on a first virtual machine (VM). For example, the resource identification circuitry 310 (FIG. 3) may obtain a command from the operations and management layer 206 of FIG. 2, the operations and management layer 403 of FIGS. 4A and/or 5A, etc. In some such examples, the resource identification circuitry 310 may determine that the command is to invoke and/or otherwise set in motion a migration-based upgrade of an HA application executing on a first VM or a first container, such as the source management application 416 of FIG. 4A executing on a first VM or a first container of the first hypervisor 410.

If, at block 902, the application upgrader 214 determines not to upgrade the HA application executing on the first VM, control waits until an indication to upgrade the HA application is received. If, at block 902, the application upgrader 214 determines to upgrade the HA application executing on the first VM, then, at block 904, the application upgrader 214 deploys a second VM in an HA slot associated with the first VM. For example, the resource deployment circuitry 320 (FIG. 3) may launch a second VM in the HA-SLOT-2 430 that is associated with the first VM executing the source management application 416. In some such examples, the resource deployment circuitry 320 may instantiate the target management application 505, which may be an upgraded version of the source management application 416, on the second VM.

At block 906, the application upgrader 214 identifies a first protection state of the first VM as protected and a second protection state of the second VM as unprotected. For example, the topology handler circuitry 330 (FIG. 3) may identify the first protection state of the first VM executing the source management application 416 as protected and the second protection state of the second VM to execute the target management application 505 as unprotected.

At block 908, the application upgrader 214 stores a first association of the first protection state and the second protection state. For example, the data synchronization circuitry 340 (FIG. 3) may store a first association of the first protection state and the second protection state in the datastore 370 (FIG. 3) as at least one of the protection states 372 (FIG. 3) or the preemption data 374 (FIG. 3).

At block 910, the application upgrader 214 triggers a shutdown of the first VM. For example, the resource decommission circuitry 350 (FIG. 3) may terminate the source management application 416 and initiate the shutdown of the first VM.

At block 912, the application upgrader 214 identifies the first protection state of the first VM as unprotected and the second protection state of the second VM as protected. For example, in response to the triggering of the shutdown of the first VM, the topology handler circuitry 330 may determine that the second VM is to execute the upgraded version of the source management application 416 and thereby control the cluster 402. In some such examples, the topology handler circuitry 330 may identify the first protection state of the first VM to be shutdown as unprotected and the second protection state of the second VM to execute the target management application 505 as protected.

At block 914, the application upgrader 214 stores a second association of the first protection state and the second protection state. For example, the data synchronization circuitry 340 may store the second association of the first protection state and the second protection state in the datastore 370 as at least one of the protection states 372 or the preemption data 374.

At block 916, the application upgrader 214 replaces the first association with the second association. For example, the data synchronization circuitry 340 may replace the first association with the second association in the datastore 370 to improve storage utilization of the datastore 370.

At block 918, the application upgrader 214 persists the replacement within a virtual server rack to synchronize migration data. For example, the data synchronization circuitry 340 may synchronize the migration data stored by at least one of the first application upgrader 420, the second application upgrader 428, or the third application upgrader 436 of FIG. 4A.

At block 920, the application upgrader 214 completes the upgrade of the HA application. For example, the fault management circuitry 360 (FIG. 3) may complete the upgrade of the source management application 416 from a first version to a second version by updating at least one of the priority dependencies 376 or the failover rules 378 in the datastore 370 based on the upgrade. In some such examples, the data synchronization circuitry 340 may synchronize the priority dependencies 376 and/or the failover rules 378 stored by at least one of the first application upgrader 420, the second application upgrader 428, or the third application upgrader 436 of FIG. 4A. In response to completing the upgrade of the HA application at block 920, the machine readable instructions and/or the operations 900 of FIG. 9 conclude.

Figure 10:
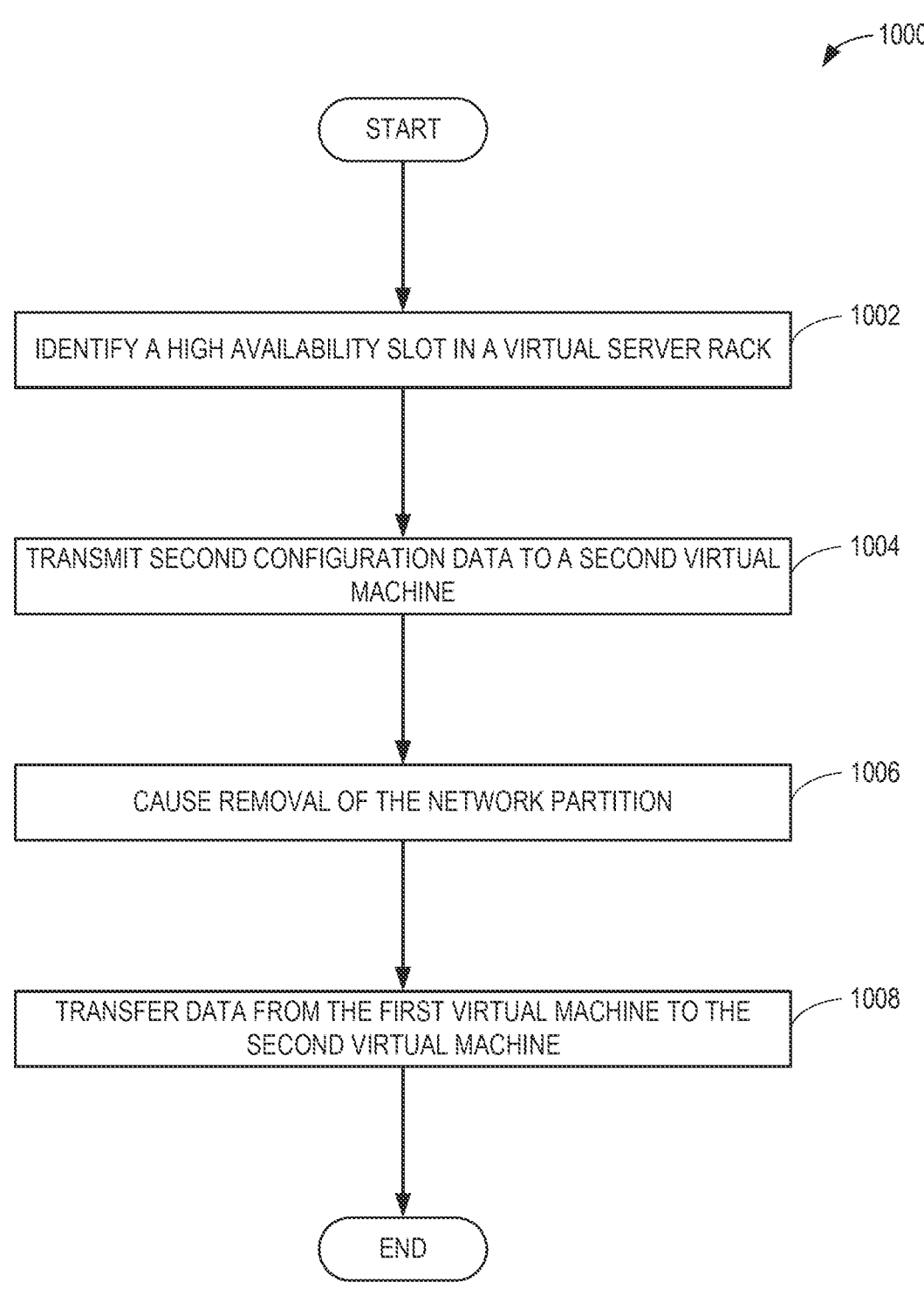
FIG. 10 is a flowchart representative of example machine readable instructions and/or example operations that may be executed and/or instantiated by example processor circuitry to transfer data after a removal of a network partition.

FIG. 10 is a flowchart representative of example machine readable instructions and/or example operations 1000 that may be executed and/or instantiated by processor circuitry to transfer data after a removal of a network partition (e.g., the network partition 452 of FIGS. 4B and/or 4C. The example machine readable instructions and/or the example operations 1000 of FIG. 10 begin at block 1002, at which the example application upgrader 214 identifies a high availability slot in a virtual server rack. In example FIG. 10, the high availability slot is to facilitate a failover of an application on a first virtual machine in the virtual server rack, the first virtual machine associated with first configuration data that identifies the first virtual machine as a protected virtual machine. For example, the resource identification circuitry 310 (FIG. 3) can identify the HA-SLOT-2 430 of FIG. 4A. In some examples, the HA-SLOT-2 can be utilized to failover the source management application 416 from the first node 404 to the third node 408 of FIGS. 4A and/or 5A. In some examples, the source management application 416 can be associated with first configuration data (e.g., a cluster configuration, cluster configuration data, etc.) that identifies a first VM that instantiates the source management application 416 as a protected VM.

At block 1004, the example application upgrader 214 transmits second configuration data to a second virtual machine. In example FIG. 10, the second configuration data is to identify the first virtual machine as a nonprotected virtual machine and the second virtual machine as the protected virtual machine. For example, after a deployment of a second VM in the HA-SLOT-2 430, the data synchronization circuitry 340 (FIG. 3) can transmit second configuration data to the second VM. In some examples, the second VM can be associated with second configuration data (e.g., a cluster configuration, cluster configuration data, etc.) that identifies the first VM as a nonprotected VM and the second VM as a protected VM.

At block 1006, the example application upgrader 214 causes removal of a network partition. In example FIG. 10, the application upgrader 214 causes the removal of the network partition after a determination that the network partition is identified based on a failure of a request to retrieve the second configuration data from the second virtual machine. For example, the fault management circuitry 360 (FIG. 3) can request the second VM for its copy of the second configuration data to confirm that the second VM received the second configuration data. In some examples, the fault management circuitry 360 can identify a network partition between the first VM and the second VM based on not receiving the second configuration data from the second VM. In some examples, the fault management circuitry 360 can remove the network partition by restarting one or more switches utilized to connect the first and second VMs. In some examples, the fault management circuitry 360 can generate an alert to cause the one or more switches to be replaced to resolve the network partition.

At block 1008, the example application upgrader 214 transfers data from the first virtual machine to the second virtual machine. In example FIG. 10, the application upgrader 214 transfers the data after the removal of the network partition. For example, the data synchronization circuitry 340 can transfer the source management application 416 (and/or associated data) from the first VM to the second VM after the removal of the network partition between the first and second VMs. In response to transferring the data from the first virtual machine to the second virtual machine at block 1008, the example machine readable instructions and/or the example operations 1000 of FIG. 10 conclude.

FIG. 11 is a flowchart representative of example machine readable instructions and/or example operations 1100 that may be executed and/or instantiated by processor circuitry to migrate an application after a removal of a network partition. The example machine readable instructions and/or the example operations 1100 of FIG. 11 begin at block 1102, at which the application upgrader 214 identifies a high availability (HA) application on first virtual machine (VM) in a first cluster to upgrade. In example FIG. 11, the first VM is to have a first configuration (e.g., the configuration 450 of FIGS. 4B and/or 4C) that identifies the first VM as a protected VM. For example, the resource identification circuitry 310 (FIG. 3) can identify the source management application 416 of FIGS. 4A, 4B, and/or 4C as an HA application instantiated on a first VM in the first cluster 442 of FIGS. 4B and/or 4C. In some examples, the resource identification circuitry 310 can determine that the first VM is associated with a first configuration (e.g., a cluster configuration) that identifies the first VM as a protected VM. In some examples, the first configuration can be stored in the datastore 370 (FIG. 3) as the protection states 372 (FIG. 3).

At block 1104, the example application upgrader 214 generates a second configuration. In example FIG. 11, the second configuration is to identify the first VM as an unprotected VM and a second VM in the first cluster as a protected VM. For example, the topology handler circuitry 330 (FIG. 3) can generate a second configuration (e.g., a cluster configuration) that identifies the first VM as a nonprotected VM and a second VM as a protected VM. For example, the second VM can be a VM that instantiates the first primary application upgrader 446A of FIGS. 4B and/or 4C. In some examples, the second configuration can be stored in the datastore 370 as the protection states 372.

At block 1106, the example application upgrader 214 transmits the second configuration to the second VM in the first cluster and a third VM in second cluster. For example, the data synchronization circuitry 340 (FIG. 3) can transmit the second configuration to the second VM and a third VM in the first cluster 442. In some examples, the third VM can be a VM that instantiates the first secondary application upgrader 448A of FIGS. 4B and/or 4C.

At block 1108, the example application upgrader 214 requests to retrieve the second configuration from the third VM. For example, the data synchronization circuitry 340 can request the second VM and the third VM to send the source management application 416 their respective copies of the second configuration data.

At block 1110, the example application upgrader 214 determines whether a network partition is identified based on a failure of the request. For example, the fault management circuitry 360 (FIG. 3) can determine that there is not a network partition between (i) the first VM and (ii) the second VM and/or the third VM based on a determination that the first primary application upgrader 446A and the first secondary application upgrader 448A sent their respective copies of the second configuration to the source management application 416. In some examples, the fault management circuitry 360 can determine that there is a network partition between (i) the first VM and (ii) the second VM and/or the third VM based on a determination that the first primary application upgrader 446A and/or the first secondary application upgrader 448A did not send their respective copies of the second configuration to the source management application 416.

If, at block 1110, the example application upgrader 214 determines that a network partition is not identified based on a failure of the request, control proceeds to block 1116. Otherwise, control proceeds to block 1112.

At block 1112, the example application upgrader 214 determines whether the third VM is available. For example, after a determination that a network partition is identified between the first VM and the third VM, the resource identification circuitry 310 can determine whether communication between the first VM and the third VM is reestablished via removal of the network partition. For example, the resource identification circuitry 310 can ping (e.g., periodically ping) the third VM to ascertain whether the first VM can communicate with the third VM.

If, at block 1112, the example application upgrader 214 determines that the third VM is not available, control waits at block 1112, such as waiting for a period of time to elapse before making another determination whether the third VM is available.

If, at block 1112, the example application upgrader 214 determines that the third VM is available, control proceeds to block 1114. At block 1114, the application upgrader 214 transmits the second configuration to the third VM to synchronize at least one of the first VM, the second VM, or the third VM. For example, the data synchronization circuitry 340 can transmit the second configuration to the third VM to synchronize the first VM, the second VM, and/or the third VM as having the second configuration.

At block 1116, the example application upgrader 214 migrates the HA application from the first VM to the second VM. For example, the data synchronization circuitry 340 can migrate the source management application 416 from the first VM to the second VM.

At block 1118, the example application upgrader 214 causes execution of the HA application on the second VM. For example, the fault management circuitry 360 can shutdown the first VM and invoke the second VM to resume execution of the source management application 416. After causing execution of the HA application on the second VM at block 1118, the example machine readable instructions and/or the example operations 1100 of FIG. 11 conclude.

Figure 12:
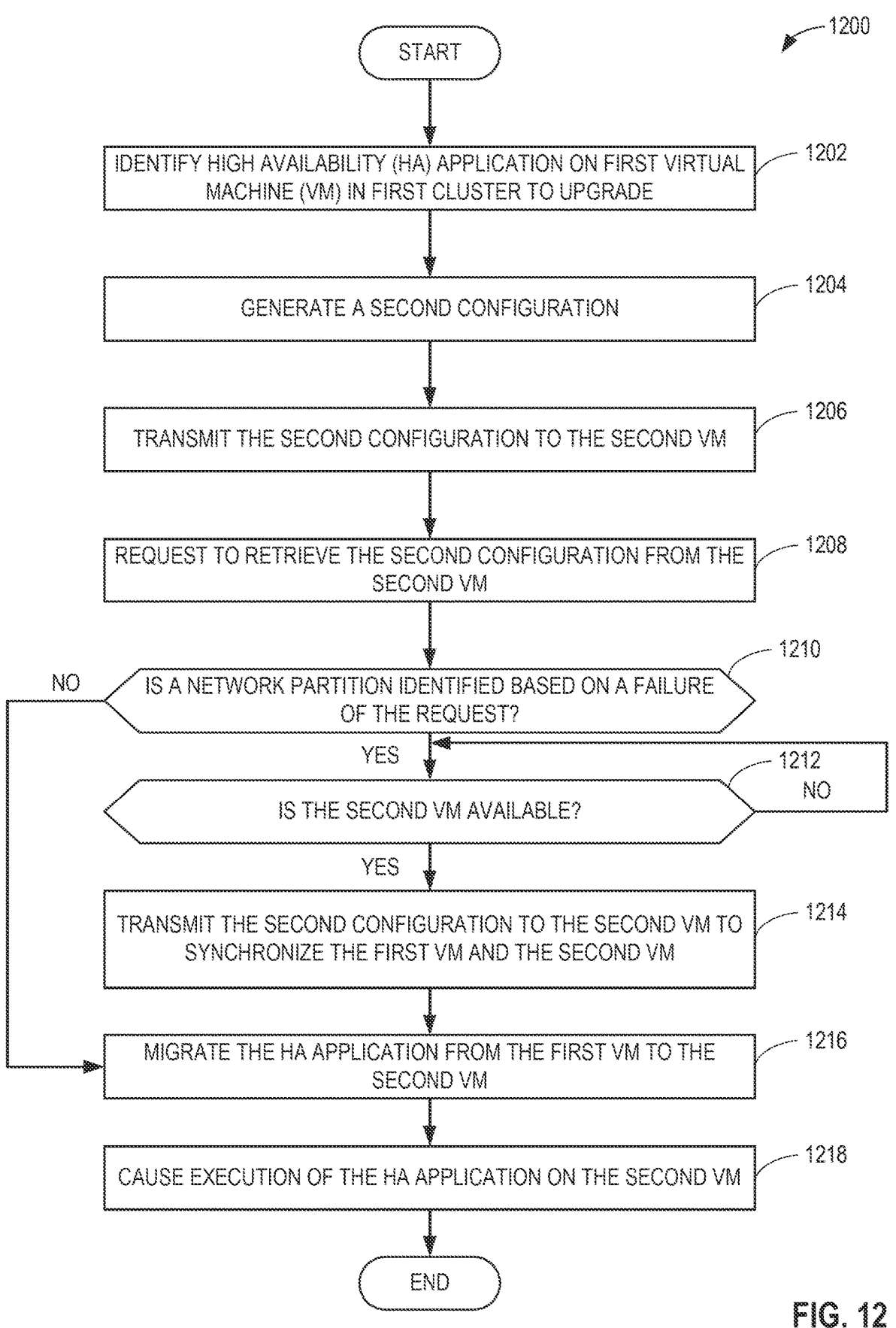
FIG. 12 is another flowchart representative of example machine readable instructions and/or example operations that may be executed and/or instantiated by example processor circuitry to migrate an application after a removal of a network partition.

FIG. 12 is a flowchart representative of example machine readable instructions and/or example operations 1200 that may be executed and/or instantiated by processor circuitry to migrate an application after a removal of a network partition (e.g., the network partition 452 of FIGS. 4B and/or 4C). The example machine readable instructions and/or the example operations 1200 of FIG. 12 begin at block 1202, at which the application upgrader 214 identifies a high availability (HA) application on a first virtual machine (VM) in a first cluster to upgrade. In example FIG. 12, the first VM is to have a first configuration (e.g., the configuration 450 of FIGS. 4B and/or 4C) that identifies the first VM as a protected VM. For example, the resource identification circuitry 310 (FIG. 3) can identify the source management application 416 of FIGS. 4A, 4B, and/or 4C as an HA application instantiated on a first VM in the first cluster 442 of FIGS. 4B and/or 4C. In some examples, the resource identification circuitry 310 can determine that the first VM is associated with a first configuration (e.g., a cluster configuration) that identifies the first VM as a protected VM. In some examples, the first configuration can be stored in the datastore 370 (FIG. 3) as the protection states 372 (FIG. 3).

At block 1204, the example application upgrader 214 generates a second configuration. In example FIG. 12, the second configuration is to identify the first VM as an unprotected VM and a second VM in a second cluster as a protected VM. For example, the topology handler circuitry 330 (FIG. 3) can generate a second configuration (e.g., a cluster configuration) that identifies the first VM as a non-protected VM and a second VM as a protected VM. In some examples, the second VM can be a VM that instantiates the second primary application upgrader 446B of FIGS. 4B and/or 4C in the second cluster 444 of FIGS. 4B and/or 4C. In some examples, the second configuration can be stored in the datastore 370 as the protection states 372.

At block 1206, the example application upgrader 214 transmits the second configuration to the second VM. For example, the data synchronization circuitry 340 (FIG. 3) can transmit the second configuration to the second VM in the second cluster 444.

At block 1208, the example application upgrader 214 requests to retrieve the second configuration from the second VM. For example, the data synchronization circuitry 340 can request the second VM to send the source management application 416 its stored instance of the second configuration data.

At block 1210, the example application upgrader 214 determines whether a network partition is identified based on a failure of the request. For example, the fault management circuitry 360 (FIG. 3) can determine that there is not a network partition between the first VM and the second VM based on a determination that the second primary application upgrader 446B sent its stored instance of the second configuration to the source management application 416. In some examples, the fault management circuitry 360 can determine that there is a network partition (e.g., the network partition 452 of FIGS. 4B and/or 4C) between the first VM and the second VM based on a determination that the second primary application upgrader 446B did not send its stored instance of the second configuration to the source management application 416.

If, at block 1210, the example application upgrader 214 determines that a network partition is not identified based on a failure of the request, control proceeds to block 1216. Otherwise, control proceeds to block 1212.

At block 1212, the example application upgrader 214 determines whether the second VM is available. For example, after a determination that a network partition is identified between the first VM and the second VM, the resource identification circuitry 310 can determine whether communication between the first VM and the second VM is reestablished via removal of the network partition. For example, the resource identification circuitry 310 can ping (e.g., periodically ping) the second VM to ascertain whether the first VM can communicate with the second VM.

If, at block 1212, the example application upgrader 214 determines that the second VM is not available, control waits at block 1212, such as waiting for a period of time to elapse before making another determination whether the second VM is available.

If, at block 1212, the example application upgrader 214 determines that the second VM is available, control proceeds to block 1214. At block 1214, the example application upgrader 214 transmits the second configuration to the second VM to synchronize the first VM and the second VM. For example, the data synchronization circuitry 340 can transmit the second configuration to the second VM to synchronize the first VM and the second VM as having the same instance of the second configuration.

At block 1216, the example application upgrader 214 migrates the HA application from the first VM to the second VM. For example, the data synchronization circuitry 340 can migrate the source management application 416 from the first VM to the second VM.

At block 1218, the example application upgrader 214 causes execution of the HA application on the second VM. For example, the fault management circuitry 360 can shutdown the first VM and invoke the second VM to resume execution of the source management application 416. After causing execution of the HA application on the second VM at block 1218, the example machine readable instructions and/or the example operations 1200 of FIG. 12 conclude.

Figure 13:
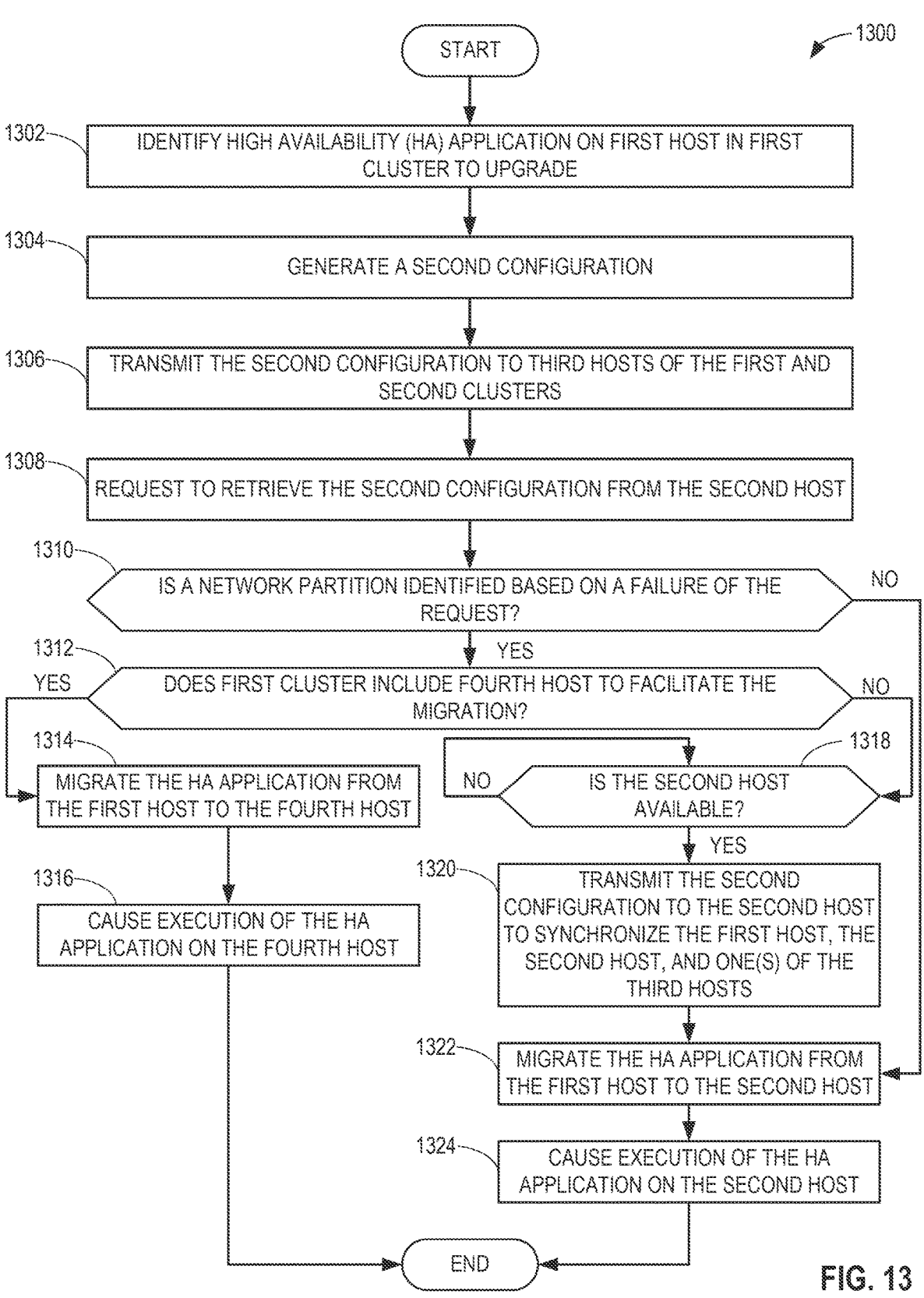
FIG. 13 is yet another flowchart representative of example machine readable instructions and/or example operations that may be executed and/or instantiated by example processor circuitry to migrate an application after a removal of a network partition.

FIG. 13 is a flowchart representative of example machine readable instructions and/or example operations 1300 that may be executed and/or instantiated by processor circuitry to migrate an application after a removal of a network partition (e.g., the network partition 452 of FIGS. 4B and/or 4C). The example machine readable instructions and/or the example operations 1300 of FIG. 13 begin at block 1302, at which the application upgrader 214 identifies a high availability (HA) application on a first host in a first cluster to upgrade. In example FIG. 13, the first host is to have a first configuration (e.g., the configuration 450 of FIGS. 4B and/or 4C) that identifies the first host as a protected host. For example, the resource identification circuitry 310 (FIG. 3) can identify the source management application 416 of FIGS. 4A, 4B, and/or 4C as an HA application instantiated on and/or by a first host in the first cluster 442 of FIGS. 4B and/or 4C. In some examples, the resource identification circuitry 310 can determine that the first host is associated with a first configuration (e.g., a cluster configuration) that identifies the first host as a protected host. In some examples, the first configuration can be stored in the datastore 370 (FIG. 3) as the protection states 372 (FIG. 3).

At block 1304, the example application upgrader 214 generates a second configuration. In example FIG. 13, the second configuration is to identify the first host as an unprotected host and a second host in a second cluster as a protected host. For example, the topology handler circuitry 330 (FIG. 3) can generate a second configuration (e.g., a cluster configuration) that identifies the first host as a nonprotected host and a second host as a protected host. In some examples, the second host can be a host that instantiates the second primary application upgrader 446B of FIGS. 4B and/or 4C in the second cluster 444 of FIGS. 4B and/or 4C. In some examples, the second configuration can be stored in the datastore 370 as the protection states 372.

At block 1306, the example application upgrader 214 transmits the second configuration to third hosts of the first and second clusters. In example FIG. 13, the third hosts include the second host. For example, the data synchronization circuitry 340 (FIG. 3) can transmit the second configuration to hosts of the first cluster 442 and the second cluster 444 that respectively instantiate the first primary application upgrader 446A, the first secondary application upgrader 448A, the second secondary application upgrader 448B, the second primary application upgrader 446B, and the third secondary application upgrader 448C.

At block 1308, the example application upgrader 214 requests to retrieve the second configuration from the second host. For example, the data synchronization circuitry 340 can request the first primary application upgrader 446A, the first secondary application upgrader 448A, the second secondary application upgrader 448B, the second primary application upgrader 446B, and the third secondary application upgrader 448C to transmit their stored instances of the second configuration data to the source management application 416.

At block 1310, the example application upgrader 214 determines whether a network partition is identified based on a failure of the request. For example, the fault management circuitry 360 (FIG. 3) can determine that there is not a network partition between the first host and the second host based on a determination that the second primary application upgrader 446B sent its stored instance of the second configuration to the source management application 416. In some examples, the fault management circuitry 360 can determine that there is a network partition between the first host and the second host based on a determination that the second primary application upgrader 446B did not send its stored instance of the second configuration to the source management application 416.

If, at block 1310, the example application upgrader 214 determines that a network partition is not identified based on a failure of the request, control proceeds to block 1322.

If, at block 1310, the example application upgrader 214 determines that a network partition is identified based on a failure of the request, control proceeds to block 1312.

At block 1312, the example application upgrader 214 determines whether the first cluster includes a fourth host to facilitate the migration. For example, after a determination that the network partition 452 of FIGS. 4B and/or 4C isolates the second host from the first host, the resource identification circuitry 310 can identify a different host in the first cluster 442 that is not isolated from the first to complete the upgrade. In some examples, the different host can be a fourth host that instantiates the first secondary application upgrader 448A in the first cluster 442.

If, at block 1312, the example application upgrader 214 determines that the first cluster includes a fourth host to facilitate the migration, control proceeds to block 1314.

At block 1314, the example application upgrader 214 migrates the HA application from the first host to the fourth host. For example, the data synchronization circuitry 340 can migrate the source management application 416 from the first host to the fourth host.

At block 1316, the example application upgrader 214 causes execution of the HA application on the fourth host. For example, the fault management circuitry 360 can shutdown the first host and invoke the fourth host to resume execution of the source management application 416. After causing execution of the HA application on the fourth host at block 1316, the example machine readable instructions and/or the example operations 1300 of FIG. 13 conclude.

If, at block 1312, the example application upgrader 214 determines that the first cluster does not include a fourth host to facilitate the migration, control proceeds to block 1318.

At block 1318, the example application upgrader 214 determines whether the second host is available. For example, after a first determination that a network partition is identified between the first host and the second host and a second determination that the first cluster 442 does not have sufficient resources to complete the migration, the resource identification circuitry 310 can determine whether communication between the first host and the second host is reestablished by way of removal of the network partition 452. For example, the resource identification circuitry 310 can ping (e.g., periodically ping) the second host to ascertain whether the first host can communicate with the second host.

If, at block 1318, the example application upgrader 214 determines that the second host is not available, control waits at block 1318, such as waiting for a period of time to elapse before making another determination whether the second host is available.

If, at block 1318, the example application upgrader 214 determines that the second host is available, control proceeds to block 1320. At block 1320, the example application upgrader 214 transmits the second configuration to the second host to synchronize the first host, the second host, and one(s) of the third hosts. For example, the data synchronization circuitry 340 can transmit the second configuration to hosts of the second cluster 444 that were previously isolated from the first cluster 442 due to the network partition 452. For example, the data synchronization circuitry 340 can transmit the second configuration to the second primary application upgrader 446B and the third secondary application upgrader 448C to synchronize the hosts of the first cluster 442 and the second cluster 444 to ensure that they have the same instance of the second configuration.

At block 1322, the example application upgrader 214 migrates the HA application from the first host to the second host. For example, the data synchronization circuitry 340 can migrate the source management application 416 from the first host to the second host.

At block 1324, the example application upgrader 214 causes execution of the HA application on the second host. For example, the fault management circuitry 360 can shutdown the first host and invoke the second host to resume execution of the source management application 416. After causing execution of the HA application on the second host at block 1324, the example machine readable instructions and/or the example operations 1300 of FIG. 13 conclude.

Figure 14:
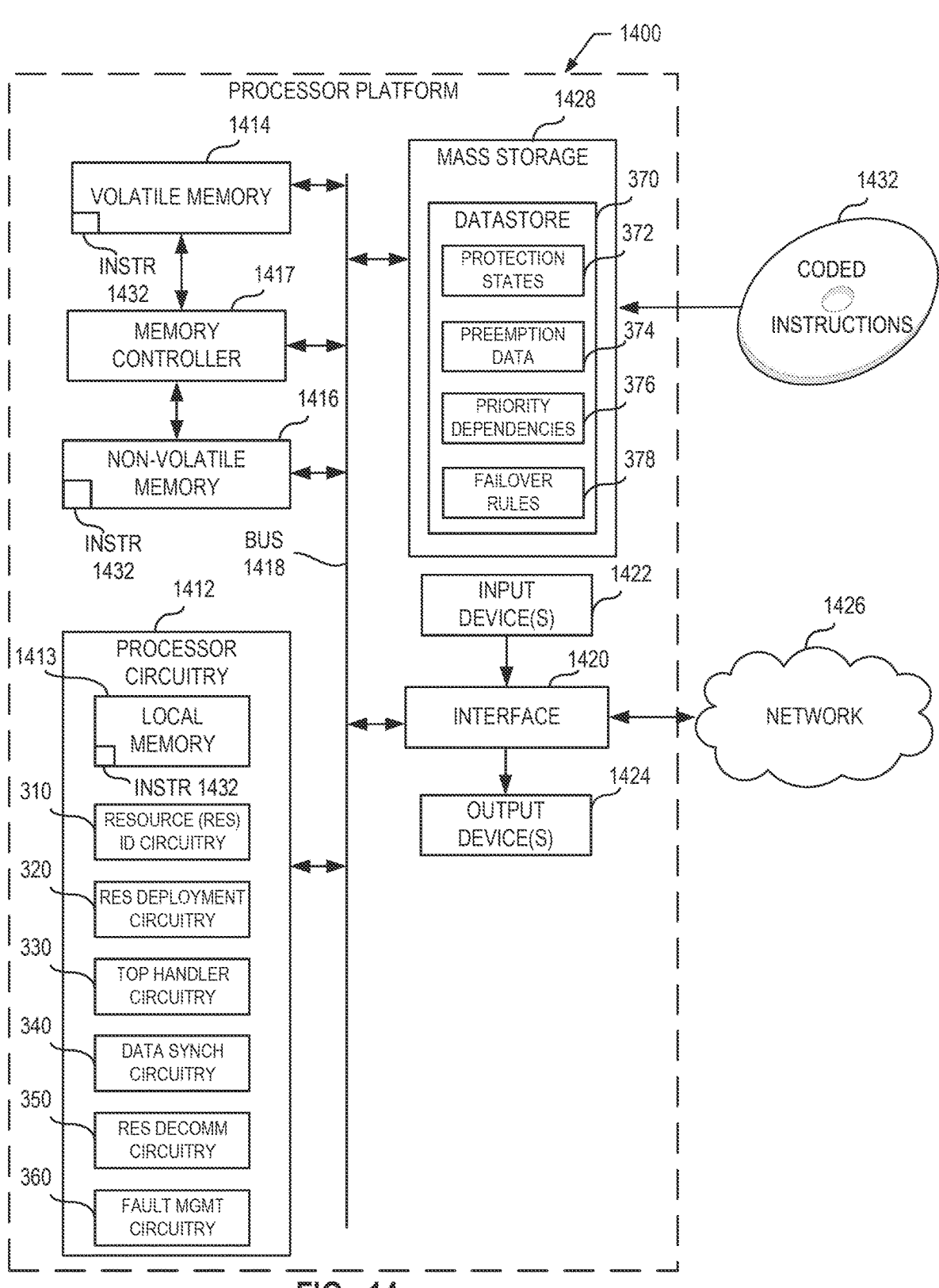
FIG. 14 is a block diagram of an example processing platform including processor circuitry structured to execute the example machine readable instructions of FIGS. 7A-13 to implement the example application upgrader of FIGS. 2 and/or 3.

FIG. 14 is a block diagram of an example processor platform 1400 structured to execute and/or instantiate the machine readable instructions and/or the operations of FIGS. 7A-13 to implement the application upgrader circuitry 300 of FIG. 3. The processor platform 1400 can be, for example, a server, a personal computer, a workstation, a self-learning machine (e.g., a neural network), or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the resource identification circuitry 310 (identified by RESOURCE (RES) ID CIRCUITRY), the resource deployment circuitry 320 (identified by RES DEPLOYMENT CIRCUITRY), the topology handler circuitry 330 (identified by TOP HANDLER CIRCUITRY), the data synchronization circuitry 340 (identified by DATA SYNCH CIRCUITRY), the resource decommission circuitry 350 (identified by RES DECOMM CIRCUITRY), and the fault management circuitry 360 (identified by FAULT MGMT CIRCUITRY) of FIG. 3.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. In this example, the bus 1418 implements the bus 380 of FIG. 3. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives. In this example, the one or more mass storage devices 1428 implement the datastore 370 of FIG. 3, which includes the protection states 372, the preemption data 374, the priority dependencies 376, and the failover rules 378 of FIG. 3.

The machine executable instructions 1432, which may be implemented by the machine readable instructions of FIGS. 7A-13, may be stored in the mass storage device 1428, in the volatile memory 1414, in the non-volatile memory 1416, and/or on a removable non-transitory computer readable storage medium such as a CD or DVD.

Figure 15:
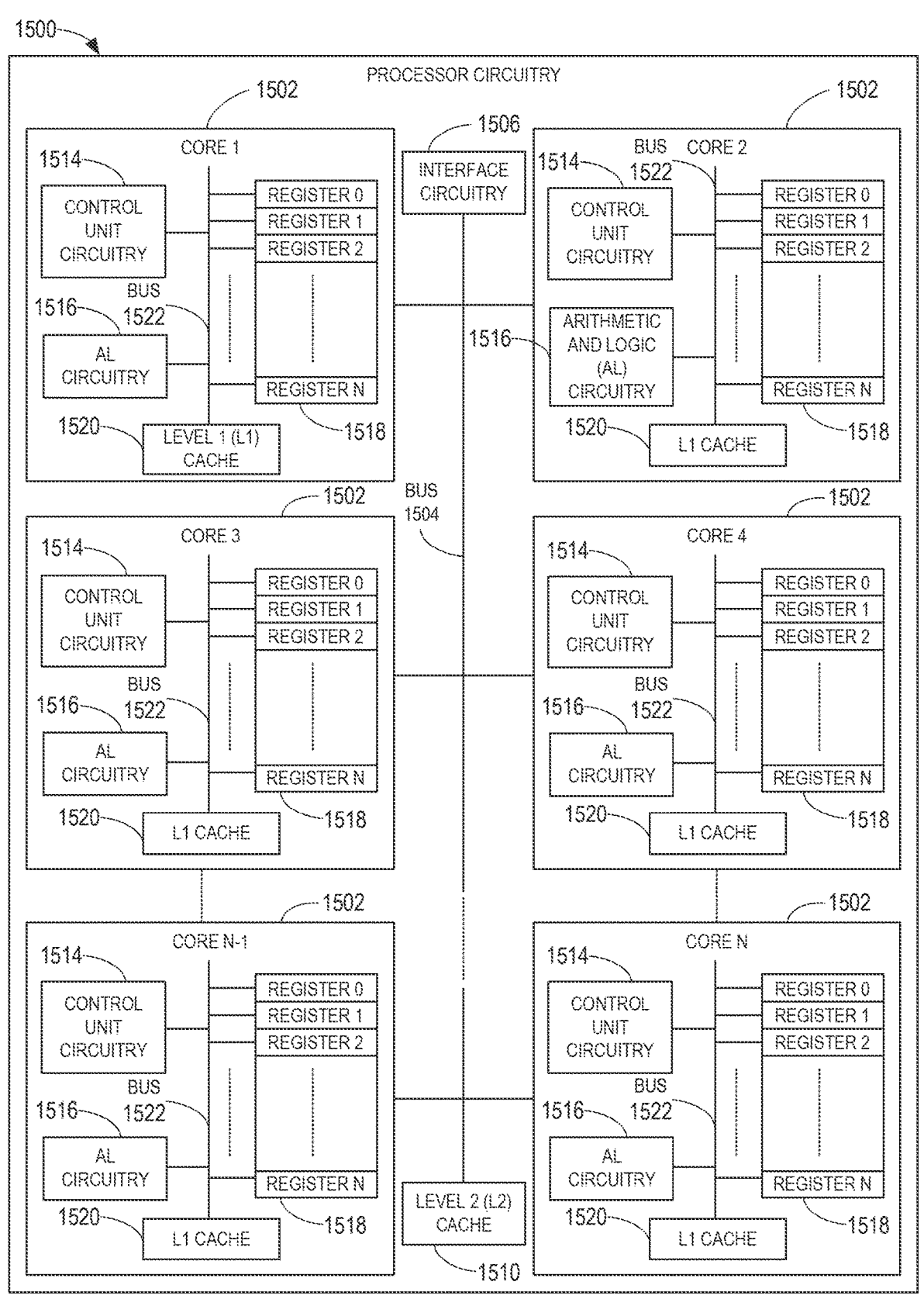
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or the operations represented by the flowcharts of FIGS. 7A-13.

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
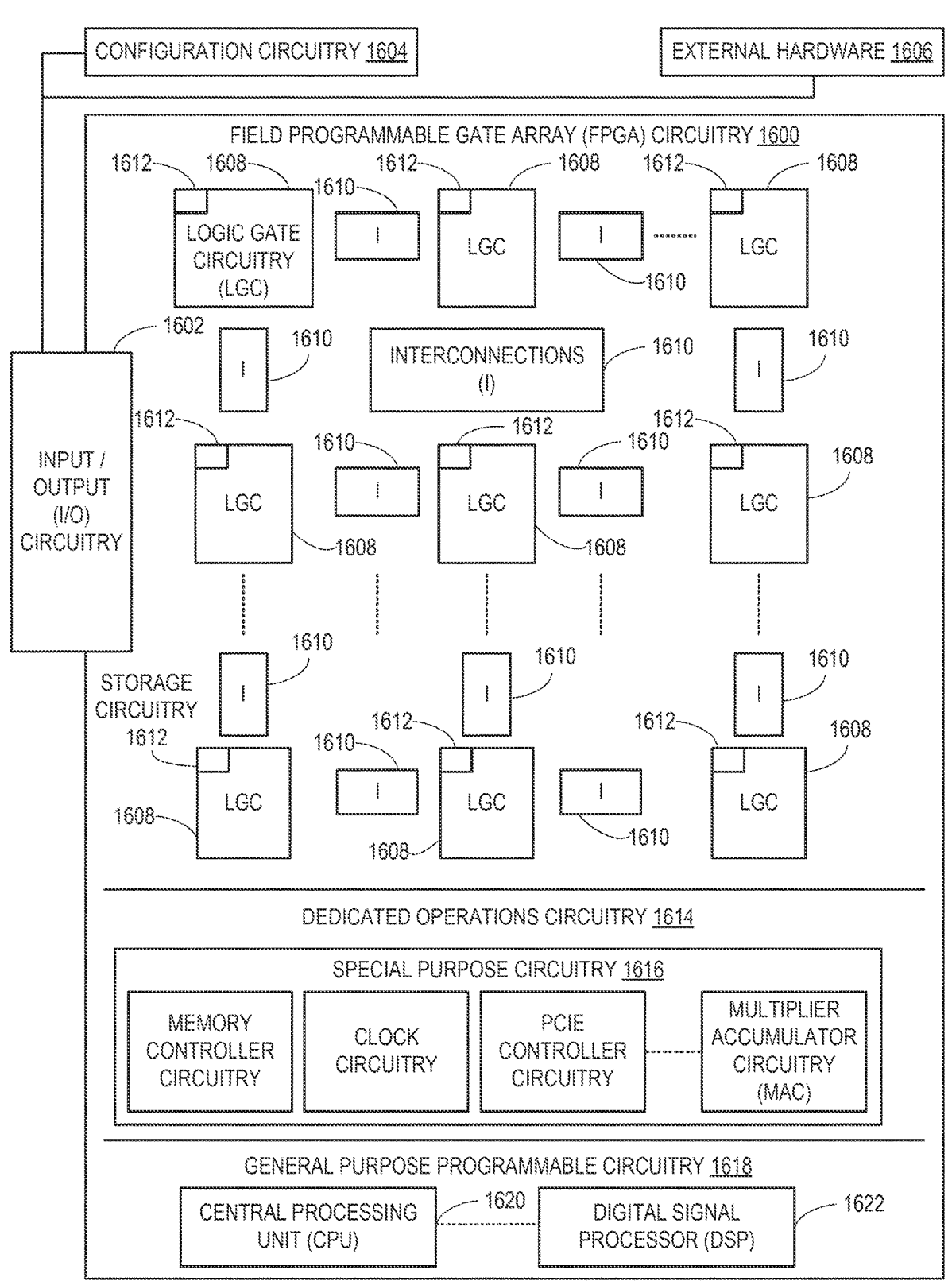
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 7A-13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 7A-13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 7A-13. As such, the FPGA circuitry 1600 may be structured to effectively instantiate some or all of the machine readable instructions of the flowcharts of FIGS. 7A-13 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 7A-13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 7A-13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 7A-13 may be executed by one or more of the cores 1502 of FIG. 15 and a second portion of the machine readable instructions represented by the flowcharts of FIGS. 7A-13 may be executed by the FPGA circuitry 1600 of FIG. 16.

In some examples, the processor circuitry 1412 of FIG. 14 may be in one or more packages. For example, the microprocessor 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
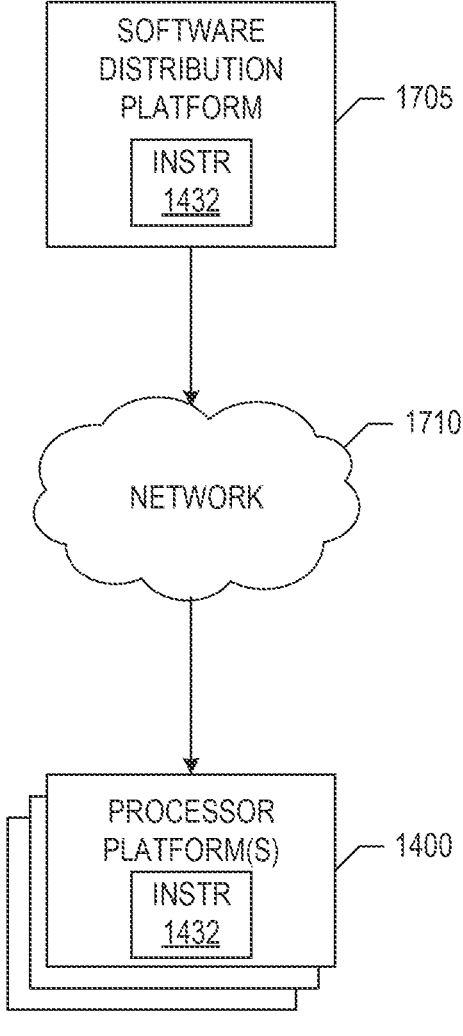
FIG. 17 is a block diagram of an example software distribution platform to distribute software to client devices associated with end users and/or consumers, and/or original equipment manufacturers (OEMs).

FIG. 17 is a block diagram of an example software distribution platform 1705, which may be implemented by one or more servers, to distribute software (e.g., software corresponding to the example machine readable instructions and/or the example operations of FIGS. 7A-13) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers). For example, the software distribution platform 1705 may distribute software such as the example machine readable instructions 1432 of FIG. 14 to hardware devices owned and/or operated by third parties. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1432, which may correspond to the example machine readable instructions and/or the example operations 700, 730, 800, 900, 1000, 1100, 1200, 1300 of FIGS. 7A-13, as described above. The one or more servers of the example software distribution platform 1705 are in communication with a network 1710, which may correspond to any one or more of the Internet and/or any of the example networks 1426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1432 from the software distribution platform 1705. For example, the software, which may correspond to the example machine readable instructions and/or the example operations 700, 730, 800, 900, 1000, 1100, 1200, 1300 of FIGS. 7A-13, may be downloaded to the example processor platform 1400, which is to execute the machine readable instructions 1432 to implement the example application upgrader circuitry 300 of FIG. 3. In some example, one or more servers of the software distribution platform 1705 periodically offer, transmit, and/or force updates to the software (e.g., the example machine readable instructions 1432 of FIG. 14) to ensure improvements, patches, updates, etc., are distributed and applied to the software at the end user devices.

From the foregoing, it will be appreciated that example systems, methods, apparatus, and articles of manufacture have been disclosed for high availability application migration in virtualized environments. Disclosed systems, methods, apparatus, and articles of manufacture can implement high availability application migration in virtualized environments that include a network partition. Disclosed systems, methods, apparatus, and articles of manufacture improve the efficiency of using a computing device by using reserved slots for the deployment of target virtual resources (e.g., VMs, containers, etc.) and thereby achieving high availability application migration without requiring additional resources (e.g., CPU, storage, memory, etc.). Disclosed systems, methods, apparatus, and articles of manufacture improve the efficiency of using a computing device by executing operations to complete a migration-based upgrade in virtualized environments that include a network partition to ensure state convergence of virtual resources. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for state convergence associated with high availability virtual resource migration in a virtualized environment are disclosed herein. Further examples and combinations thereof include the following:

Example 1 includes an apparatus for state convergence associated with high availability application migration in a virtualized environment, the apparatus comprising at least one memory, machine readable instructions in the apparatus, and processor circuitry to at least one of execute or instantiate the machine readable instructions to identify a high availability slot in a virtual server rack, the high availability slot to facilitate a failover of an application on a first virtual machine in the virtual server rack, the first virtual machine associated with first configuration data that identifies the first virtual machine as a protected virtual machine, transmit second configuration data to a second virtual machine, the second configuration data to identify the first virtual machine as a nonprotected virtual machine and the second virtual machine as the protected virtual machine, after a determination that a network partition is identified based on a failure of a request to retrieve the second configuration data from the second virtual machine, cause removal of the network partition, and after the removal of the network partition, transfer data from the first virtual machine to the second virtual machine.

Example 2 includes the apparatus of example 1, wherein the data is a high availability application, and the transfer of the data from the first virtual machine to the second virtual machine is a migration of the high availability application from the first virtual machine to the second virtual machine.

Example 3 includes the apparatus of example 1, wherein the first virtual machine and the second virtual machine are in a first cluster, the determination is a first determination, the failure is a first failure, the request is a first request, and the processor circuitry is to transmit the second configuration data to a third virtual machine in a second cluster, after a second determination that the network partition is identified based on a second failure of a second request to retrieve the second configuration data from the third virtual machine, cause removal of the network partition, and after the removal of the network partition, transmit the second configuration data to the third virtual machine to synchronize at least one of the first virtual machine, the second virtual machine, or the third virtual machine.

Example 4 includes the apparatus of example 1, wherein the first virtual machine is in a first cluster, the second virtual machine is in a second cluster, and the processor circuitry is to determine that the network partition is between the first cluster and the second cluster, and after the network partition between the first cluster and the second cluster is removed, transmit the second configuration data to the second virtual machine.

Example 5 includes the apparatus of example 4, wherein the processor circuitry is to determine that the network partition is caused by a fault of a network switch associated with the first cluster and the second cluster.

Example 6 includes the apparatus of example 1, wherein the first virtual machine is in a first cluster, the second virtual machine is in a second cluster, and the processor circuitry is to determine that the first cluster includes a third virtual machine, and transfer the data from the first virtual machine to the third virtual machine.

Example 7 includes the apparatus of example 6, wherein the determination is a first determination, and the processor circuitry is to, after a second determination that virtual resources of the third virtual machine do not satisfy a threshold, transmit the data from the first virtual machine to the second virtual machine.

Example 8 includes at least one non-transitory computer readable storage medium comprising instructions that, when executed, cause processor circuitry to at least detect a high availability slot in a virtual server rack, the high availability slot to facilitate a failover of an application on a first virtual machine in the virtual server rack, the first virtual machine associated with first configuration data that identifies the first virtual machine as a protected virtual machine, send second configuration data to a second virtual machine, the second configuration data to identify the first virtual machine as a nonprotected virtual machine and the second virtual machine as the protected virtual machine, after a determination that a network partition is identified based on a failure of a request to retrieve the second configuration data from the second virtual machine, cause removal of the network partition, and after the removal of the network partition, move data from the first virtual machine to the second virtual machine.

Example 9 includes the at least one non-transitory computer readable storage medium of example 8, wherein the data is a high availability application, and the moving of the data from the first virtual machine to the second virtual machine is a migration of the high availability application from the first virtual machine to the second virtual machine.

Example 10 includes the at least one non-transitory computer readable storage medium of example 8, wherein the first virtual machine and the second virtual machine are in a first cluster, the determination is a first determination, the failure is a first failure, the request is a first request, and the instructions, when executed, cause the processor circuitry to send the second configuration data to a third virtual machine in a second cluster, after a second determination that the network partition is identified based on a second failure of a second request to retrieve the second configuration data from the third virtual machine, cause removal of the network partition, and after the removal of the network partition, send the second configuration data to the third virtual machine to synchronize at least one of the first virtual machine, the second virtual machine, or the third virtual machine.

Example 11 includes the at least one non-transitory computer readable storage medium of example 8, wherein the first virtual machine is in a first cluster, the second virtual machine is in a second cluster, and the instructions, when executed, cause the processor circuitry to determine that the network partition is between the first cluster and the second cluster, and after the network partition between the first cluster and the second cluster is removed, send the second configuration data to the second virtual machine.

Example 12 includes the at least one non-transitory computer readable storage medium of example 11, wherein the instructions, when executed, cause the processor circuitry to determine that the network partition is caused by a failure of a network switch associated with the first cluster and the second cluster.

Example 13 includes the at least one non-transitory computer readable storage medium of example 8, wherein the first virtual machine is in a first cluster, the second virtual machine is in a second cluster, and the instructions, when executed, cause the processor circuitry to determine that the first cluster includes a third virtual machine, and move the data from the first virtual machine to the third virtual machine.

Example 14 includes the at least one non-transitory computer readable storage medium of example 13, wherein the determination is a first determination, and the instructions, when executed, cause the processor circuitry to, after a second determination that virtual resources of the third virtual machine do not satisfy a threshold, send the data from the first virtual machine to the second virtual machine.

Example 15 includes a method for state convergence associated with high availability application migration in a virtualized environment, the method comprising identifying a high availability slot in a virtual server rack, the high availability slot to facilitate a failover of an application on a first virtual machine in the virtual server rack, the first virtual machine associated with first configuration data that identifies the first virtual machine as a protected virtual machine, transmitting second configuration data to a second virtual machine, the second configuration data to identify the first virtual machine as a nonprotected virtual machine and the second virtual machine as the protected virtual machine, after a determination that a network partition is identified based on a failure of a request to retrieve the second configuration data from the second virtual machine, causing removal of the network partition, and after the removal of the network partition, transferring data from the first virtual machine to the second virtual machine.

Example 16 includes the method of example 15, wherein the data is a high availability application, and the transfer of the data from the first virtual machine to the second virtual machine is a migration of the high availability application from the first virtual machine to the second virtual machine.

Example 17 includes the method of example 15, wherein the first virtual machine and the second virtual machine are in a first cluster, the determination is a first determination, the failure is a first failure, the request is a first request, and the method further including transmitting the second configuration data to a third virtual machine in a second cluster, after a second determination that the network partition is identified based on a second failure of a second request to retrieve the second configuration data from the third virtual machine, causing removal of the network partition, and after the removal of the network partition, transmitting the second configuration data to the third virtual machine to synchronize at least one of the first virtual machine, the second virtual machine, or the third virtual machine.

Example 18 includes the method of example 15, wherein the first virtual machine is in a first cluster, the second virtual machine is in a second cluster, and the method further including determining that the network partition is between the first cluster and the second cluster, and after the network partition between the first cluster and the second cluster is removed, transmitting the second configuration data to the second virtual machine.

Example 19 includes the method of example 18, wherein the determining that the network partition is caused by a fault of a network switch associated with the first cluster and the second cluster.

Example 20 includes the method of example 15, wherein the first virtual machine is in a first cluster, the second virtual machine is in a second cluster, and the method further including determining that the first cluster includes a third virtual machine, and transferring the data from the first virtual machine to the third virtual machine.

Example 21 includes the method of example 20, wherein the determination is a first determination, and the method further including, after a second determination that virtual resources of the third virtual machine do not satisfy a threshold, transmitting the data from the first virtual machine to the second virtual machine.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for state convergence associated with high availability application migration in a virtualized environment, the apparatus comprising:
   at least one memory;
   machine readable instructions in the apparatus; and
   processor circuitry to at least one of execute or instantiate the machine readable instructions to:
   identify a high availability slot in a virtual server rack, the high availability slot to facilitate a failover of an application on a first virtual machine in the virtual server rack, the first virtual machine associated with first configuration data that identifies the first virtual machine as a protected virtual machine;
   transmit second configuration data to a second virtual machine, the second configuration data to identify the first virtual machine as a nonprotected virtual machine and the second virtual machine as the protected virtual machine;
   after a determination that a network partition is identified based on a failure of a request to retrieve the second configuration data from the second virtual machine, cause removal of the network partition; and
   after the removal of the network partition, transfer data from the first virtual machine to the second virtual machine.

2. The apparatus of claim 1, wherein the data is a high availability application, and the transfer of the data from the first virtual machine to the second virtual machine is a migration of the high availability application from the first virtual machine to the second virtual machine.

3. The apparatus of claim 1, wherein the first virtual machine and the second virtual machine are in a first cluster, the determination is a first determination, the failure is a first failure, the request is a first request, and the processor circuitry is to:

transmit the second configuration data to a third virtual machine in a second cluster;

after a second determination that the network partition is identified based on a second failure of a second request to retrieve the second configuration data from the third virtual machine, cause removal of the network partition; and after the removal of the network partition, transmit the second configuration data to the third virtual machine to synchronize at least one of the first virtual machine, the second virtual machine, or the third virtual machine.

4. The apparatus of claim 1, wherein the first virtual machine is in a first cluster, the second virtual machine is in a second cluster, and the processor circuitry is to:

determine that the network partition is between the first cluster and the second cluster; and after the network partition between the first cluster and the second cluster is removed, transmit the second configuration data to the second virtual machine.

5. The apparatus of claim 4, wherein the processor circuitry is to determine that the network partition is caused by a fault of a network switch associated with the first cluster and the second cluster.

6. The apparatus of claim 1, wherein the first virtual machine is in a first cluster, the second virtual machine is in a second cluster, and the processor circuitry is to:

determine that the first cluster includes a third virtual machine; and transfer the data from the first virtual machine to the third virtual machine.

7. The apparatus of claim 6, wherein the determination is a first determination, and the processor circuitry is to, after a second determination that virtual resources of the third virtual machine do not satisfy a threshold, transmit the data from the first virtual machine to the second virtual machine.

8. At least one non-transitory computer readable storage medium comprising instructions that, when executed, cause processor circuitry to at least:

detect a high availability slot in a virtual server rack, the high availability slot to facilitate a failover of an application on a first virtual machine in the virtual server rack, the first virtual machine associated with first configuration data that identifies the first virtual machine as a protected virtual machine;

send second configuration data to a second virtual machine, the second configuration data to identify the first virtual machine as a nonprotected virtual machine and the second virtual machine as the protected virtual machine;

after a determination that a network partition is identified based on a failure of a request to retrieve the second configuration data from the second virtual machine, cause removal of the network partition; and after the removal of the network partition, move data from the first virtual machine to the second virtual machine.

9. The at least one non-transitory computer readable storage medium of claim 8, wherein the data is a high availability application, and the moving of the data from the first virtual machine to the second virtual machine is a migration of the high availability application from the first virtual machine to the second virtual machine.

10. The at least one non-transitory computer readable storage medium of claim 8, wherein the first virtual machine and the second virtual machine are in a first cluster, the determination is a first determination, the failure is a first failure, the request is a first request, and the instructions, when executed, cause the processor circuitry to:

send the second configuration data to a third virtual machine in a second cluster;

after a second determination that the network partition is identified based on a second failure of a second request to retrieve the second configuration data from the third virtual machine, cause removal of the network partition; and after the removal of the network partition, send the second configuration data to the third virtual machine to synchronize at least one of the first virtual machine, the second virtual machine, or the third virtual machine.

11. The at least one non-transitory computer readable storage medium of claim 8, wherein the first virtual machine is in a first cluster, the second virtual machine is in a second cluster, and the instructions, when executed, cause the processor circuitry to:

determine that the network partition is between the first cluster and the second cluster; and after the network partition between the first cluster and the second cluster is removed, send the second configuration data to the second virtual machine.

12. The at least one non-transitory computer readable storage medium of claim 11, wherein the instructions, when executed, cause the processor circuitry to determine that the network partition is caused by a failure of a network switch associated with the first cluster and the second cluster.

13. The at least one non-transitory computer readable storage medium of claim 8, wherein the first virtual machine is in a first cluster, the second virtual machine is in a second cluster, and the instructions, when executed, cause the processor circuitry to:

determine that the first cluster includes a third virtual machine; and move the data from the first virtual machine to the third virtual machine.

14. The at least one non-transitory computer readable storage medium of claim 13, wherein the determination is a first determination, and the instructions, when executed, cause the processor circuitry to, after a second determination that virtual resources of the third virtual machine do not satisfy a threshold, send the data from the first virtual machine to the second virtual machine.

15. A method for state convergence associated with high availability application migration in a virtualized environment, the method comprising:

identifying a high availability slot in a virtual server rack, the high availability slot to facilitate a failover of an application on a first virtual machine in the virtual server rack, the first virtual machine associated with first configuration data that identifies the first virtual machine as a protected virtual machine;

transmitting second configuration data to a second virtual machine, the second configuration data to identify the first virtual machine as a nonprotected virtual machine and the second virtual machine as the protected virtual machine;

after a determination that a network partition is identified based on a failure of a request to retrieve the second configuration data from the second virtual machine, causing removal of the network partition; and after the removal of the network partition, transferring data from the first virtual machine to the second virtual machine.

16. The method of claim 15, wherein the data is a high availability application, and the transfer of the data from the first virtual machine to the second virtual machine is a migration of the high availability application from the first virtual machine to the second virtual machine.

17. The method of claim 15, wherein the first virtual machine and the second virtual machine are in a first cluster, the determination is a first determination, the failure is a first failure, the request is a first request, and the method further including:

transmitting the second configuration data to a third virtual machine in a second cluster;

after a second determination that the network partition is identified based on a second failure of a second request to retrieve the second configuration data from the third virtual machine, causing removal of the network partition; and after the removal of the network partition, transmitting the second configuration data to the third virtual machine to synchronize at least one of the first virtual machine, the second virtual machine, or the third virtual machine.

18. The method of claim 15, wherein the first virtual machine is in a first cluster, the second virtual machine is in a second cluster, and the method further including:

determining that the network partition is between the first cluster and the second cluster; and after the network partition between the first cluster and the second cluster is removed, transmitting the second configuration data to the second virtual machine.

19. The method of claim 18, wherein the determining that the network partition is caused by a fault of a network switch associated with the first cluster and the second cluster.

20. The method of claim 15, wherein the first virtual machine is in a first cluster, the second virtual machine is in a second cluster, and the method further including:

determining that the first cluster includes a third virtual machine; and transferring the data from the first virtual machine to the third virtual machine.

21. The method of claim 20, wherein the determination is a first determination, and the method further including, after a second determination that virtual resources of the third virtual machine do not satisfy a threshold, transmitting the data from the first virtual machine to the second virtual machine.

* * * * *